US010243187B2

(12) United States Patent
l'Abee et al.

(10) Patent No.: US 10,243,187 B2
(45) Date of Patent: Mar. 26, 2019

(54) PROCESS OF MAKING BATTERY SEPARATORS VIA SPINNING

(71) Applicant: SABIC Global Technologies B.V., Bergen op Zoom (NL)

(72) Inventors: Roy Martinus Adrianus l'Abee, Veldhoven (NL); Richard Peters, Hinsdale, MA (US); Erich Otto Teutsch, Richmond, MA (US); Huiqing Wu, Shanghai (CN); Yanju Wang, Shanghai (CN); Qunjian Huang, Shanghai (CN); Wujun Rong, Shanghai (CN); Jacob Scott LaBelle, Pittsfield, MA (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 157 days.

(21) Appl. No.: 15/232,290

(22) Filed: Aug. 9, 2016

(65) Prior Publication Data
US 2016/0348281 A1 Dec. 1, 2016

Related U.S. Application Data

(63) Continuation of application No. 14/132,718, filed on Dec. 18, 2013, now Pat. No. 9,577,235.

(60) Provisional application No. 61/738,810, filed on Dec. 18, 2012, provisional application No. 61/808,924, filed on Apr. 5, 2013, provisional application No. 61/808,927, filed on Apr. 5, 2013.

(51) Int. Cl.
| *H01M 2/14* | (2006.01) |
| *D01D 5/00* | (2006.01) |
| *D01D 5/06* | (2006.01) |
| *D01D 5/40* | (2006.01) |
| *D01D 5/18* | (2006.01) |
| *D01F 6/74* | (2006.01) |
| *H01M 2/16* | (2006.01) |
| *B29C 47/00* | (2006.01) |
| *B29C 71/00* | (2006.01) |
| *B29C 71/02* | (2006.01) |
| *B29K 79/00* | (2006.01) |
| *B29L 31/34* | (2006.01) |
| *B29L 31/00* | (2006.01) |

(52) U.S. Cl.
CPC ......... *H01M 2/145* (2013.01); *B29C 47/0076* (2013.01); *B29C 71/00* (2013.01); *B29C 71/02* (2013.01); *D01D 5/003* (2013.01); *D01D 5/0007* (2013.01); *D01D 5/0038* (2013.01); *D01D 5/06* (2013.01); *D01D 5/18* (2013.01); *D01D 5/40* (2013.01); *D01F 6/74* (2013.01); *H01M 2/162* (2013.01); *B29K 2079/085* (2013.01); *B29K 2995/0058* (2013.01); *B29L 2031/3468* (2013.01); *B29L 2031/755* (2013.01)

(58) Field of Classification Search
CPC .... D01D 5/0007; D01D 5/0015; D01D 5/003; D01D 5/0038; D01D 5/0046
USPC .......................... 264/10, 464, 465, 466, 484
See application file for complete search history.

(56) References Cited

U.S. PATENT DOCUMENTS

| 3,558,764 A | 1/1971 | Isaacson et al. |
| 3,875,116 A | 4/1975 | Heath et al. |
| 4,044,404 A | 8/1977 | Martin et al. |
| 4,056,598 A | 11/1977 | Galasso et al. |
| 4,141,927 A | 2/1979 | White et al. |
| 4,187,143 A | 2/1980 | Sander et al. |
| 4,548,997 A | 10/1985 | Mellinger et al. |
| 4,629,759 A | 12/1986 | Rock |
| 4,639,390 A | 1/1987 | Shoji |
| 4,650,506 A | 3/1987 | Barris et al. |
| 4,690,997 A | 9/1987 | Cella et al. |
| 4,808,686 A | 2/1989 | Cella et al. |
| 4,816,527 A | 3/1989 | Rock |
| 4,842,505 A | 6/1989 | Annis et al. |
| 4,965,110 A | 10/1990 | Berry |
| 5,171,489 A | 12/1992 | Hirao et al. |
| 5,202,178 A | 4/1993 | Turner |
| 5,229,482 A | 7/1993 | Brunelle |
| 5,385,777 A | 1/1995 | Higuchi et al. |
| 5,522,879 A | 6/1996 | Scopelianos |
| 6,063,874 A | 5/2000 | Jin et al. |
| 6,106,913 A | 8/2000 | Scardino et al. |
| 6,150,473 A | 11/2000 | Brown et al. |
| 6,200,706 B1 | 3/2001 | Ashida et al. |
| 6,204,340 B1 | 3/2001 | Liao et al. |
| 6,280,843 B1 | 8/2001 | Murayama et al. |
| 6,310,145 B1 | 10/2001 | Puyenbroek et al. |
| 6,355,723 B1 | 3/2002 | van Baal et al. |
| 6,616,435 B2 | 9/2003 | Lee et al. |

(Continued)

FOREIGN PATENT DOCUMENTS

| CN | 1823184 A | 8/2006 |
| EP | 1911864 A1 | 4/2008 |

(Continued)

OTHER PUBLICATIONS

Doshi et al., "Electrospinning Process and Applications of Electrospun Fibers", J Electrostatics, 1995, 35, 151-160.

(Continued)

*Primary Examiner* — Leo B Tentoni
(74) *Attorney, Agent, or Firm* — Cantor Colburn LLP

(57) ABSTRACT

A method for preparing a high temperature melt integrity separator, the method comprising spinning a polymer by one or more of a mechanical spinning process and an electrospinning process to produce fine fibers.

20 Claims, 49 Drawing Sheets

(56) References Cited

U.S. PATENT DOCUMENTS

| | | | |
|---|---|---|---|
| 6,713,011 | B2 | 3/2004 | Chu et al. |
| 6,919,422 | B2 | 7/2005 | Gallucci et al. |
| 7,041,773 | B2 | 5/2006 | Gallucci et al. |
| 7,083,854 | B1 | 8/2006 | Joo et al. |
| 7,112,389 | B1 | 9/2006 | Arora et al. |
| 7,134,857 | B2 | 11/2006 | Andrady et al. |
| 7,170,739 | B1 | 1/2007 | Arora et al. |
| 7,230,066 | B2 | 6/2007 | Khouri et al. |
| 7,323,540 | B2 | 1/2008 | Velev et al. |
| 7,439,291 | B2 | 10/2008 | Wang et al. |
| 7,618,743 | B2 | 11/2009 | Ohashi et al. |
| 8,551,378 | B2 | 10/2013 | Velev et al. |
| 2001/0038946 | A1* | 11/2001 | Rao ............... H01M 2/162 429/249 |
| 2002/0100725 | A1 | 8/2002 | Lee et al. |
| 2005/0073075 | A1 | 4/2005 | Chu et al. |
| 2006/0063882 | A1 | 3/2006 | Velev et al. |
| 2007/0056901 | A1 | 3/2007 | Wang et al. |
| 2007/0060688 | A1 | 3/2007 | Wang et al. |
| 2008/0006970 | A1 | 1/2008 | Dris et al. |
| 2009/0122466 | A1 | 5/2009 | Blankenbeckler |
| 2009/0169725 | A1 | 7/2009 | Zhamu et al. |
| 2009/0226814 | A1 | 9/2009 | Takita et al. |
| 2009/0232920 | A1 | 9/2009 | Lozano et al. |
| 2009/0269429 | A1 | 10/2009 | Lozano et al. |
| 2009/0280207 | A1 | 11/2009 | Lozano et al. |
| 2009/0280325 | A1 | 11/2009 | Lozano et al. |
| 2009/0286147 | A1 | 11/2009 | Nakajima et al. |
| 2010/0247908 | A1 | 9/2010 | Velev et al. |
| 2011/0117416 | A1 | 5/2011 | Arora et al. |
| 2011/0180972 | A1 | 7/2011 | Lee et al. |
| 2011/0236744 | A1 | 9/2011 | Kim et al. |
| 2012/0082884 | A1 | 4/2012 | Orilall et al. |
| 2012/0309860 | A1 | 12/2012 | Huang |
| 2013/0115484 | A1 | 5/2013 | Li et al. |

FOREIGN PATENT DOCUMENTS

| | | |
|---|---|---|
| GB | 1087212 A | 10/1967 |
| GB | 1552313 A | 9/1979 |
| JP | 63273651 | 11/1988 |
| JP | 05230712 | 9/1993 |
| JP | 0864194 | 3/1996 |
| JP | 9259859 | 10/1997 |
| JP | 2007039840 A | 2/2007 |
| JP | 2007211378 A | 8/2007 |
| JP | 2011077233 A | 4/2011 |
| JP | 04963909 | 6/2012 |
| KR | 20080013208 A | 2/2008 |
| KR | 20080013209 A | 2/2008 |
| KR | 20100072532 A | 7/2010 |
| WO | 2008004712 A2 | 1/2008 |
| WO | 2008057426 A2 | 5/2008 |
| WO | 2009079523 A2 | 6/2009 |
| WO | 2010014986 A2 | 2/2010 |
| WO | 2011055967 A2 | 5/2011 |
| WO | 2012009240 A1 | 1/2012 |
| WO | 2012043718 A1 | 4/2012 |
| WO | 2012122485 A2 | 9/2012 |

OTHER PUBLICATIONS

Ellison et al, "Melt Blown Nanofibers: Fiber Diameter Distributions and Onset of Fiber Breakup", Polymer, 2007, 48, 3306-3316.

Fong et al, "Beaded Nanofibers Formed During Electrospinning", Polymer, 1999, 40(16), 4585-4592.

Haghi, "Chapter 1: Electrospun Nanofibers: an Introduction, Electrospinning of Nanofibers in Textiles", CRC Press, Oct. 31, 2011.

Laius et al., "Transformation of Solid Polyamic Acids at Thermal Treatment", CRC Press, 1993, 47-106.

Lukas et al., "Self-Organization of Jets in Electrospinning from Free Liquid Surface: A Generalized Approach", Journal of Applied Physics, 2008, 103(084309), 7 pages.

MacMullin RB and Muccini GA. "Characteristics of porous beds and structures." AIChE, 1956, 2(3), 393-403.

Ou et al., "Membranes of Epitaxial-Like Packed, Super Aligned Electrospun Micron Hollow Poly(l-lactic acid) (PLLA) Fibers", European Polymer Journal, 2011, 47, 882-892.

Patel et al., "Numerical Simulation of Porous Networks in Relation to Battery Electrodes and Separators", Journal of Power Sources, 2003, 122, 144-152.

Ratta, "Crystallization, Morphology, Thermal Stability and Adhesive Properties of Novel High Performance Semicrystalline Polyimides", Chapter 1, 1999, 34 pages.

Theron et al., "Multiple Jets in Electrospinning: Experiment and Modeling", Polymer, 2005, 46(9), 2889-2899.

Varabhas et al., "Electrospun Nanofibers from a Porous Hollow Tube", Polymer, 2008, 49, 4226-4229.

Von Loesecke et al., "Machinery and Processing: An Overview of Engine Filtration", Filtration and Separation, 2008, 45(7), 17-19.

Wertz et al., "Filtration Media: Advantages of Nanofibre Coating Technology", Filtration and Separation, 2009, 46(4), 18-20.

Yao et al., "Surface Modification and Antibacterial Activity of Electrospun Polyurethane Fibrous Membranes with Quaternary Ammonium Moieties", Journal of Membrane Science, 2008, 320, 259-267.

* cited by examiner

PROCESS OF MAKING BATTERY SEPARATORS VIA SPINNING

CROSS REFERENCE TO RELATED APPLICATIONS

This application is a continuation of U.S. application Ser. No. 14/132,718, filed Dec. 18, 2013, issued as U.S. Pat. No. 9,577,235 on Feb. 21, 2017, which claims priority to U.S. Patent Application No. 61/738,810, filed Dec. 18, 2012, U.S. Patent Application No. 61/808,924, filed Apr. 5, 2013, and U.S. Patent Application No. 61/808,927, filed Apr. 5, 2013, each of which is hereby incorporated herein by reference in its entirety.

BACKGROUND

Battery cells typically consist of a positive and negative electrode (cathode and anode) and a liquid electrolyte solution, separated by a thin, porous film known as a separator. A separator plays a key role in a battery. Its main function is to keep the two electrodes physically apart from each other in order to prevent an electrical short circuit. Accordingly, the separator should be electrically insulating. At the same time, the separator should allow rapid transport of ionic charge carriers that are needed to complete the circuit during cell charging and discharging. The separator should have the capability of conducting ions by either intrinsic ionic conduction (such as solid electrolytes) or by soaking the separator with a liquid electrolyte.

High temperature melt integrity (HTMI) of battery separators is a key property to ensure the safety of the battery pack. Specifically, high separator HTMI is important to provide an extra margin of safety. For example, in case the battery pack is subject to internal heat build-up from overcharging or internal short-circuiting, a separator with a high HTMI maintains its integrity (both shape and mechanical) and as a consequence, prevents the electrodes from contacting each other at high temperatures.

Lithium-ion batteries typically use separators made from polymers and, more specifically, polyethylene (PE) and polypropylene (PP), which are produced via melt processing techniques. These types of separators typically have insufficient melt integrity at high temperatures and are incompatible, i.e., non-wettable, with the electrolyte solutions. Therefore, a need exists for alternative separators with improved HTMI that can be produced via a melt or solution process.

Polyetherimides (for example Saudi Arabia Basic Industries Corporation's ULTEM branded polyethermide products) are attractive materials for battery separator applications because they combine outstanding characteristics, such as good electrolyte wettability, high solvent resistance, and HTMI typically exceeding 200° C. Polyphenylene oxides are also particularly suitable for HTMI battery separators, with HTMI values typically exceeding 200° C. Additionally, polyimides are also suitable to be used for HTMI separators, which are typically produced by processing poly(amic acid) into a desired form factor, followed by a heat treatment to form the polyimide. Alternatively, aromatic polyamides can be used as HTMI battery separators.

Conventional PP and PE separators are prepared by either the "dry process" or the "wet process". Both processes rely on stretching, crystallization, and annealing of the polymers to generate the desired pore structure. Since polyetherimides, polyphenylene oxides, and poly(amic acids) (precursor to polyimides) are typically amorphous resins, these two conventional approaches are not suitable to produce polyetherimide, polyphenylene oxide, or polyimide-based separators. Additionally, the dry and wet processes lead to relatively low porosities and high tortuosity, which limits lithium-ion transfer through the separator, e.g., leading to relatively low power capability battery cells. Therefore, there exists a need for a membrane preparation process suitable for amorphous resins like polyetherimides, polyphenylene oxides, and poly(amic acids), where the process allows preparing porous structures meeting the requirements of battery separators.

In the case of lithium-ion batteries, polymeric separator films are typically based on PE and/or PP. The porosity is typically induced by uniaxial stretching of extruded films, which process is known as the "dry process" and is based on a complex interplay between extrusion, annealing, and stretching of the film (see e.g., U.S. Pat. Nos. 3,558,764 and 5,385,777). The "dry process" typically leads to an open pore structure and a relatively uniform pore size. However, inherent to the stretching process, the "dry process" leads to non-spherical pores and to residual stresses in the material. The latter typically leads to deformation (shrinkage) of the films over time, especially at elevated temperatures. Since crystallization/crystallinity is required during the stretching process in order to develop a porous structure, the preparation of porous films by the "dry process" is limited to semi-crystalline polymers only. Although this process allows for a reasonably high porosity (30-50%), the actual accessible porosity (as measured e.g., by air permeability) is often lower, since not all pores are interconnected with each other.

Alternatively, porosity can be induced by pre-mixing the polymer with a low molecular weight extractable, which forms a specific structure upon cooling from the melt and, after removal of the low molecular weight species, leaves a porous structure (see e.g., U.S. Pat. No. 7,618,743, JP1988273651, JP1996064194, and JP1997259859). This process is known as the "wet process", and typically uses a polymer/extractable combination that is miscible during the extrusion process, but phase separates upon cooling. Removal of the low molecular weight specie can be achieved by evaporation or extraction. An additional stretching (uniaxial or biaxial) step is sometimes used to create the desired pore structure. The "wet process" typically leads to a highly tortuous, interconnected porous structure. The preparation of porous films by the "wet process" is limited to polymers with a relatively high melt strength (e.g., ultra-high molecular weight PE). Also here the actual accessible porosity (as measured e.g., by air permeability) is often lower than the total porosity, since not all pores are interconnected with each other.

In all cases, high porosity of separator films is beneficial for the charging and discharging characteristics of batteries, since the volume resistivity of the cell typically scales inversely with the accessible separator porosity. Additionally, separator pore sizes need to be small enough to ensure it functions as an electrical barrier between the electrode, with pore sizes preferably smaller than the particle size of the anode and cathode active material (typically several micrometer). Also, the pore size distribution is preferably narrow and the pores are preferably uniformly distributed. Preferably, all pores are in some way connected from front to backside of the film or, in other words, the actual accessible porosity equals the total porosity. This means that all pores are accessible for the electrolyte solution and contribute to ion transport through the separator. In the case of lithium-ion batteries, high tortuosity and an interconnected pore structure is beneficial for long life batteries, since it suppresses the growth of lithium crystals on the graphite anode during fast charging or low temperature charging. On the other hand, an open (low tortuosity) and uniform pore size structure is beneficial for applications where fast charging and discharging is required, e.g., for high power density batteries.

Battery separators with a pore structure that is significantly more open than that of separators prepared via the "dry process" and "wet process" can be made via fiber spinning processes and organizing the spun fibers into woven or non-woven webs.

Polymers in the form of fibers are also useful in the applications of separators (electrolytical capacitors for example) or for substrates (fuel cell applications for example). Additionally, webs consisting of fibers, either with a sub-micron or supra-micron diameter, can be applied as medial implants, filtration membranes, dialysis membranes, water filtration membranes, desalination membranes, gas separation membranes, hospital gowns, electrical insulation paper and personal hygiene products. Also, webs comprised of polymer fibers can function as a substrate for further functionalization, e.g., by spinning other fibers onto the substrate, or by coating with other polymer or inorganic systems. Additionally, polymer fibers can be useful to functionalize substrates. An example could be to spin ultra-fine fibers onto a micro-porous web.

The conventional fiber fabrication technologies such as melt spinning, web spinning, dry spinning, or dry jet-wet spinning, comprise extrusion of a polymer melt or solution through a nozzle by a mechanical force followed by solidification of the melt or solution in order to fabricate fibers. These conventional fiber fabrication technologies typically produce fibers having a diameter ranging from several micrometers to several scores of micrometers. Consequently, the woven or nonwoven webs comprising such spun fibers typically contain pores too large to be applicable for lithium-ion battery separators, e.g., exceeding 5 µm, as the fiber diameter scales with the pore size of the web (see G. E. Simmonds et al., Journal of Engineered Fibers and Fabrics, 2(1), 2007). This large pore size would allow the particles of the anode and the cathode to migrate towards each other through the large pores to cause an internal short circuit. Additionally, the large fiber diameter makes it difficult to achieve thin separators, e.g., of 50 µm or less. For example, U.S. Pat. No. 5,202,178 describes melt spun polyamide with a fineness of 0.5-3.5 denier (fiber diameter about 8-20 µm), which are applicable as alkaline battery separators, but not as lithium-ion battery separators. Various methodologies to produce fine polymer fibers with a sub-micrometer average diameter have been described, such as in U.S. Pat. Nos. 4,044,404, 4,639,390, 4,842,505, 4,965,110, 5,522,879, and 6,106,913, where the formation of the fine fibers out of a polymer melt or a polymer solution typically relies on applying a pressure or an electro-static force. The latter method, commonly known as electro-spinning, is by far the most used technology to prepare fine fibers. Electro-spinning (comprising electro-blowing, melt-blowing, flash spinning or air-electro-spinning) is a technology known to be applicable to polymers of various forms, such as a polymer melt or a polymer solution, and the technology is able to produce fibers having a diameter of several nanometers up to thousands of nanometers. Such a small fiber diameter enables to produce polymer webs having a high porosity combined with a small pore size and provides new properties that are impossible to realize via the conventional fiber spinning technologies. Details around the electro-spinning method, setup, processing conditions and applications are widely described in literature, such as for example "Electrospinning Process and Applications of Electrospun Fibers" by Doshi and Reneker (J. Electrostatics, 35, 151-160 (1995)), "Electrospinning of Nanofibers in Textiles" by Haghi (CRC Press, Oct. 31, 2011), "Beaded nanofibers formed during electrospinning" by H. Fong (Polymer, 40, 4585-4592 (1999)) and U.S. Pat. Nos. 6,616,435, 6,713,011, 7,083,854, and 7,134,857.

In the process for fabricating a porous polymer web using electro-spinning, a polymer solution is extruded through fine holes (e.g., a needle or nozzle) under an electric field to volatilize or solidify the solvent from the solution, which forms the fibers on the collector surface located at a predetermined distance. The polymer web thus obtained is a laminated three-dimensional network structure of fibers having a diameter of from several nanometers to several thousands of nanometers and has a large surface area per unit volume. Accordingly, the polymer web thereby obtained is typically superior in total porosity and reduced pore size to those produced by the other, conventional fabrication methods.

The main advantage of the electro-spinning process is that it enables to readily control the diameter of fibers in the polymer web, the total web thickness (i.e., from several micrometers to several thousands of micrometers) and the size of the pores by modifying the process conditions. The physical phenomenon that takes place when applying a high voltage to the liquid drops hanging on the orifice of e.g., a needle in the electro-spinning process is called "Taylor cone". Here, a stream is formed to discharge the liquid drop towards the collector when the force of charges exceeds the surface tension of a solution to be suspended. An organic solution having a low molecular weight can be sprayed into fine liquid drops. However, due to its high viscosity and rheological characteristics, a polymer solution typically forms a stream that is split into several sub-streams with densely accumulated charges as it becomes apart from the Taylor cone to reduce the diameter. The large surface area of the polymer solution in the shape of fine streams accelerates solidification of the polymer solution and volatilization of the solvent, forming a polymer web with semi-entangled solid fibers on the surface of the collector.

Among the various parameters of the electro-spinning process are the applied voltage, the orifice to collector distance, the solution delivery rate, the polymer concentration, the viscosity, the solvent polarity, the surface tension of the solution, the solvent evaporation rate and the solution dielectric constant. A great increase in the discharged amount of liquid without adjusting the applied voltage accordingly will result in liquid drops being formed, rather than the desired nano-fibers, eventually leading to a polymer web in which fibers are mixed with liquid drops. A too high voltage makes the discharged polymer stream unstable and uncontrollable. A rise of the applied voltage or an increase in the discharged amount typically increases the diameter of the stream emitted from the Taylor cone to form a polymer with fibers having a larger diameter. It can be understood that finding the proper processing conditions for electro-spinning is, therefore, not straightforward, as e.g., described by Yao et al. (Yao et al., Journal of Membrane Science, 320(1-2), 2008, Pages 259-267). Additionally, the polymer needs to be well soluble in a solvent, where the combination of polymer/solvent needs to be suitable for the electro-spinning process (e.g., in dielectric constant, evaporation rate, viscosity, etc).

The electro-spinning process largely depends on the force of charges, which is a disadvantage in large-scale production over the conventional fiber fabrication processes, because the discharged amount from the nozzle is relatively small in production of a polymer web with fibers having a small diameter compared to the conventional processes. It is generally stated that the required time for the polymer solution to move from the orifice or nozzle to the collector and form solid fibers is significantly shorter than one second, normally 0.1 to 0.01 second. Assuming a typical orifice-nozzle distance of 10 cm, the fiber spinning speed is normally 1 to 10 m/s. Although the fiber spinning speed appears rather fast at first sight (1-10 m/s), it is important to understand that a single web of 0.1 m2 with a thickness of 50 µm and a total porosity of 50% consisting of fibers with a diameter below 1 µm has a total fiber length exceeding many hundreds of kilometers. So even at a spinning speed of 10 m/s, the electro-spinning process to prepare such a 0.1 m2 porous web typically leads to preparation times of several hours up to several days, which is not acceptable for large-scale, commercial nano-fiber web production. Varabhas et al. state that a 0.1 m2 nonwoven mat containing 1 g of 100 nm fibers may take several days to create from a single jet via an electro-spinning process (Varabhas et al., Polymer, 49(19), 2008, Pages 4226-4229). Many other sources state that electro-spinning is a very slow process, which severely limits its commercial value, for example Wertz et al., Filtration and Separation, 46(4), 2009, Pages 18-20; Ou et al., European Polymer Journal, 47(5), 2011, Pages 882-892; WO Patent Application 2008057426; von Loesecke et al., Filtration and Separation, 45(7), 2008, Pages 17-19. Additionally, the solvent handling and recovery in the electro-spinning process is intrinsically difficult (Ellison et al., Polymer, 48, 2007, Pages 3306-3316).

As discussed previously, electro-spinning production speeds cannot simply be improved by increasing the discharge rate out of the orifice, as this would typically result in the formation of liquid drops (defects) next to the (nano-) fibers. To increase the overall production speed of nano-fiber polymer webs, a plurality of needles, nozzles or orifices for discharging the polymer solution can be densely arranged, as for example described in Theron et al., Polymer, 46, 2005, Pages 2889-2899 or Lukas et al., Journal of Applied Physics, 103, 2008, 084309. Such a setup enables simultaneous spinning of multiple fibers, which increases the web production speed. However, even when 10 to 100 orifices would electro-spin nano-fibers simultaneously, the preparation of a 0.1 m2 nonwoven mat with a thickness of 50 µm and a total porosity of 50% consisting of fibers with a diameter below 1 µm will still take several hours, i.e., the process is still very time consuming. Additionally, as the orifices are typically densely arranged in a small space, it is more difficult to volatilize the solvent of the polymer solution. As a result, there is an increased possibility to form a polymer web having a film structure rather than a fiber structure, i.e., more defects will be present. This problem is a serious obstacle to high-speed or large-scale production of nano-fiber polymer webs using the electro-spinning process.

The application of the electro-spinning method to prepare nano-fiber webs for battery or capacitor separators has been explained in literature, e.g., WO Patent Application 2012043718 and U.S. Pat. Appl. No. 2002/0100725. Additionally, U.S. Pat. Appl. No. 2009/0122466 describes capacitor separators based on polyamide prepared via an electro-spinning process, where webs made out of nm-sized fibers were prepared by electro-blowing polyamide and depositing those directly on a moving collection belt, either in a single or multiple pass, after which the as-spun nano-web was dried by transportation through a solvent stripping zone with hot air and infrared radiation. The nano-webs were also calendared in order to impart the desired physical properties. U.S. Pat. No. 7,112,389 describes battery separators comprising a porous fine fiber layer of polyamide or polyvinyl alcohol fibers having a mean diameter of 50 to 3000 nm. The fine fibers are prepared via electro-blowing the polymer solutions. To improve the strength of the webs, the polyamide fine fiber web was thermally bonded, while the polyvinyl alcohol fine fiber web was cross-linked by a chemical procedure. U.S. Pat. No. 7,170,739 describes the application of such porous fine fiber layers of polyamide and polyvinyl alcohol for electrochemical double layer capacitors. U.S. Pat. Appl. No. 2011/0117416 describes that the electrolyte wettability of such fine fiber web separators can be improved by the introduction of a surfactant. JP Patent Application 2007211378 describes battery separators based on poly(4-methyl-1-pentene), where the polymer is shaped into the geometry of fibers with a diameter of 2 µm or less. KR Patent Application 2008013208 and 2010072532 and WO Patent Application 2011055967 describe heat-resistant, fine fibrous separators for secondary batteries, comprising a fibrous phase formed by electro-spinning or air-electro-spinning a heat-resistant polymer material (such as aromatic polyesters, polyimides, polyphenylene oxide, polyamide) in combination with a fibrous phase formed by electro-spinning consisting of a polymeric material that swells in the electrolyte solution (such as polyvinylidene fluoride, polyvinylchloride, PE oxide, polystyrene, polymethyl methacrylate). KR Patent Application 2008013209 describes a heat-resistant separator with a shutdown function for electrochemical devices used in, e.g., electric automobile, comprising an fine fibrous layer positioned on a porous substrate, where the fibrous phase is formed by electro-spinning a heat-resistant polymer (such as aromatic polyesters, polyimides, polyphenylene oxide, polyamide) and a polymer material that swells in the electrolyte solution (such as polyvinylidene fluoride, polyvinylchloride, PE oxide, polystyrene, polymethyl methacrylate). JP Patent 04963909 describes the production of fibrous battery separators based on polyphenylene oxide via an electro-spinning process, with average fiber diameters of 0.01-10 µm. Polymer fibers in the form of a woven or nonwoven web can also be used in laminated structures. JP Patent Application 2011077233 described the use of polyamide fibers of 10-600 nm in diameter prepared via an electro-spinning process, where the nano-fibers are spun on a fibrous support with fiber fineness of 0.01-5 dtex (about 1-25 µm average diameter). As described in U.S. Pat. Appl. No. 2012/0082884, the discussed electro-spinning process can be used to spin nano-fibers in a continuous fashion onto a substrate.

Therefore, there exists a need for a fiber preparation process that allows for the production of fine fibers at a throughput significantly higher than that of electro-spinning, and that allows for fiber diameters significantly smaller than those obtained from traditional melt-spinning techniques.

An alternative method to electro-spinning does not rely on an electro-static force to form the fine fibers from a single orifice, but rather on a centrifugal force. As the centrifugal force is the driving force for the formation of the fine fibers, the technology is generally known as force-spinning. U.S. Pat. Appl. Nos. 2009/0280207, 2009/0232920, 2009/0269429, and 2009/0280325 describe an apparatus that uses a rotating spinneret comprising an array of capillaries. This spinneret typically rotates at speeds from 500 to 25000 rpms, thereby creating a significant centrifugal force responsible for the formation of fine fibers. By increasing the number of capillaries in a given spinneret, the volumetric throughput of fiber generation can be increased to make more fibers in a short period of time. This technology can be applied to a polymer melt as well as to a polymer solution and has the advantage of having significantly higher throughputs as compared to the conventional nano-fiber spinning technology, such as electro-spinning. WO Patent Application 2012122485 describes the application of the described force-spinning method to prepare fine fiber of fluoropolymers having a contact angle greater than 150°. However, this technique has never been used to produce fibers based on high temperature materials, such as polyetherimides, polyphenylene oxides and poly(amic acids), which would be required for e.g., HTMI battery separators.

Another alternative to electro-spinning is a process whereby a polymer solution is injected through one or multiple small orifices into a non-solvent to the polymer, which, upon mixing of the solvent and non-solvent, induces precipitation of the polymer at a solvent/non-solvent composition at which the polymer is no longer soluble in the solvent/non-solvent mixture. When the non-solvent is sheared (e.g., flows) upon injection of the polymer solution, the precipitation of the polymer will occur under shear conditions, which enables the formation of fibers at very high throughput. As spinning of the fibers relies on the shear conditions of the non-solvent in which the polymer solution is injected, this process is known as shear-spinning. The fiber diameter is dependent on the process conditions. However, this technique has never been used to produce fibers based on high temperature materials, such as polyetherimides, polyphenylene oxides and poly(amic acids), which would be required for e.g., HTMI battery separators.

Therefore, there exists a need for a high throughput fiber production process based on mechanical spinning, shear spinning and/or electro-spinning that enables the production of fine fibers based on high temperature materials.

SUMMARY

Disclosed are materials that provide solvent resistant membranes. As an example, membranes can be used in environments such as battery cells and/or capacitor cells, electrolytical energy storage devices, a dialysis membrane, a water filtration membrane, a desalination membrane, a gas separation membrane, and the like. As a further example, other structures and systems can implement the disclosed materials.

Method are disclosed, which do not rely on an electrostatic force, or a centrifugal force through an orifice. The disclosed methods can be based on injecting a polymer solution into a flow stream of an anti-solvent medium, with sufficient pressure to precipitate the resin in form of fine fibers, for example fibers having an individual average diameter of about 10 nm to about 50 µm.

In an aspect, a method can comprise dissolving a polymer in a solvent to provide a polymer solution, wherein the polymer comprises one or more of polyetherimide, poly (amic acid), and polyphenylene oxide and spinning the polymer solution by a mechanical spinning method into fine fibers.

In an aspect, a method can comprise dissolving a polymer in a solvent to provide a polymer solution, wherein the polymer comprises one or more of polyetherimide, poly (amic acid), aromatic polyamide, poly(amide-imide) and polyphenylene oxide and spinning the polymer solution by a mechanical spinning method into fine fibers.

In an aspect, a method can comprise dissolving a polymer in a solvent to provide a polymer solution, wherein the polymer comprises thermoplastic polymers having a glass transition temperature higher than about 180° C. and spinning the polymer solution by a mechanical spinning method into fine fibers.

In an aspect, a method can comprise melting a polymer comprising, poly(4-methylpentene), poly(amide-imide), polyoxymethylene, polyphthalamide, polysulfone, polyethersulfone, polyphenylsulfone, polyetherimide, polyketone, polyetherketone, polyetheretherketone, polyphenylene sulfide, or a copolymer or blend thereof and spinning the polymer melt by a mechanical spinning method into fine fibers.

In an aspect, a method can comprise providing a polymer solution comprising a chemical-resistant polymer in a solvent and spinning the polymer solution by an electro-spinning method into fine fibers.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
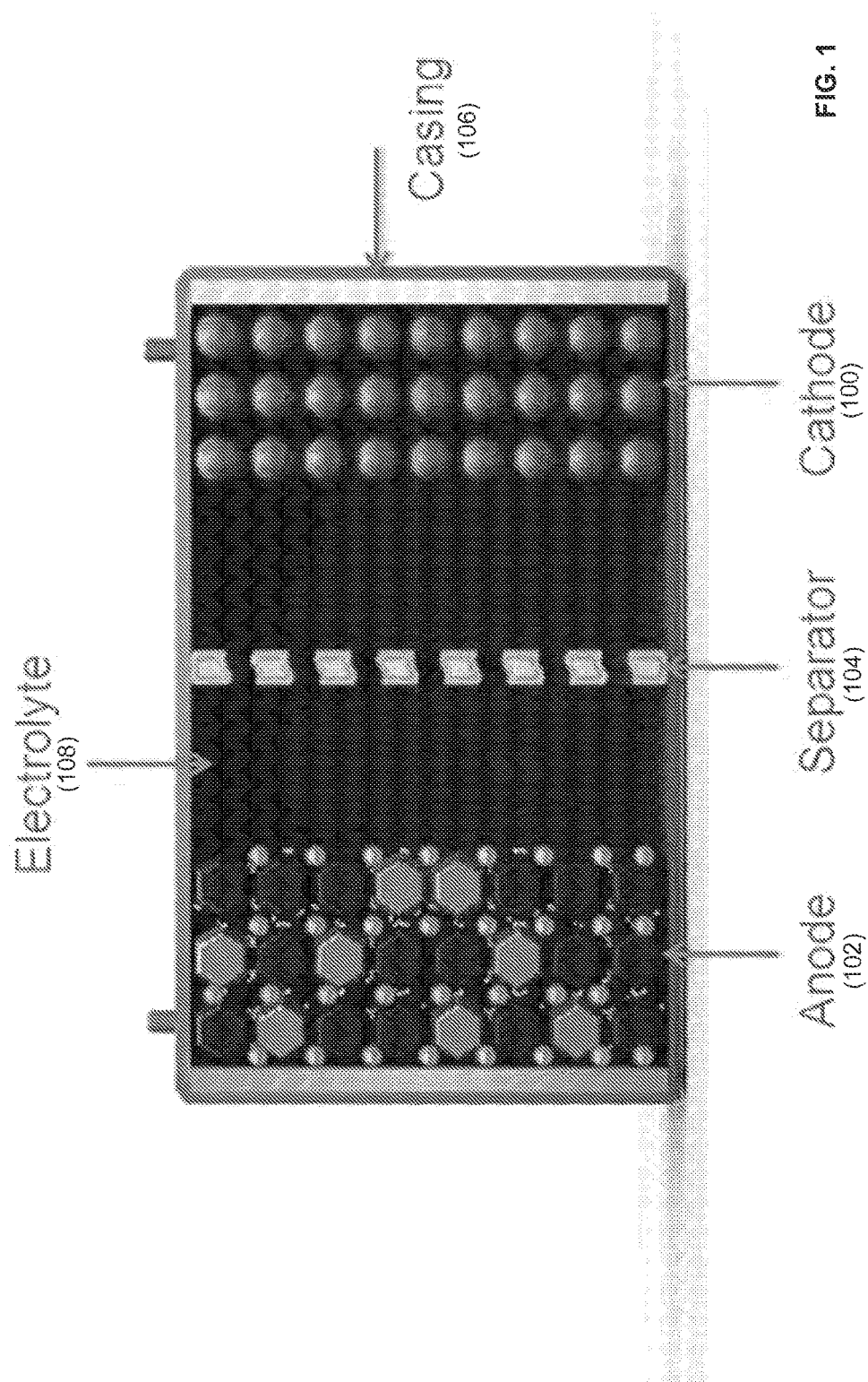
FIG. 1 is a schematic of an exemplary battery cell.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

FIG. 1 illustrates an exemplary non-aqueous electrolyte battery. It would be understood by one skilled in the art that an electrolytic capacitor cell can have a similar configuration as the battery shown and described in reference with FIG. 1. Other membranes can be produced using the materials and methods described herein. The battery cell of FIG. 1 is an example of an environment for one or more membranes produced using the materials and process described herein. Other environments can make use if the methods and materials disclosed herein such as electrolytical energy storage devices, a dialysis membrane, a water filtration membrane, a desalination membrane, a gas separation membrane, and the like.

In an aspect, the battery comprises a positive electrode 100 (cathode), a negative electrode 102 (anode), and a separator 104 disposed between the positive electrode 100 and the negative electrode 102. As an example, one or more of the positive electrode 100, the negative electrode 102, and the separator 104 is received in a battery vessel or casing 106. As a further example, a non-aqueous electrolyte 108 can be disposed in the casing 106 (e.g., adjacent one or more of the positive electrode 100, the negative electrode 102, and the separator 104, soaking the separator 104, immersing the separator 104, and the like).

In an aspect, the positive electrode 100 can comprise a positive active material incorporated therein and may further contain an electrically conductive material such as carbon or a binder for helping sheet or pelletize the positive active material. The positive electrode 100 can be used in contact with an electronically conductive substrate such as metal as a collector. As an example, the binder can be formed from a polytetrafluoroethylene (PTFE), a polyvinylidene fluoride (PVdF), an ethylene-propylene-diene copolymer, a styrene-butadiene rubber or the like. As another example, the collector can be formed from a foil, thin sheet, mesh or gauze of metal such as aluminum, stainless steel and titanium. As a further example, the positive active material and/or the conductive material may be pelletized or sheeted with the aforementioned binder by kneading/rolling. Alternatively, these materials may be dissolved and suspended in a solvent such as toluene and N-methyl-2-pyrrolidone (NMP) to form slurry which is then spread over the aforementioned collector and dried to form a sheet. Other materials and forming processes can be used.

In an aspect, the positive electrode 100 can comprise a lithium composite oxide containing at least one of iron, cobalt, manganese and nickel incorporated therein as a positive active material and is capable of insertion/releasing lithium ion. Various oxides such as chalcogen compound, e.g., lithium-containing iron composite oxide, lithium-containing cobalt composite oxide, lithium-containing nickel-cobalt composite oxide, lithium-containing nickel composite oxide and lithium-manganese composite oxide may be used as positive active material. Other materials and forming processes can be used.

In an aspect, negative electrode 102 can comprise a negative active material incorporated therein. As an example, the negative electrode 102 can be formed by pelletizing, tabulating or sheeting the negative active material with a conductive material, a binder, etc. In an aspect, the conductive material can be formed from an electronically conducting material such as carbon and metal. As an example, the binder can be formed from polytetrafluoroethylene, polyvinylidene fluoride, styrene-butadiene rubber, carboxymethyl cellulose or the like. As another example, the collector can be formed from a foil, thin plate, mesh, or gauze of copper, stainless steel, nickel, or the like. As a further example, the negative active material and/or the conductive material may be pelletized or sheeted with the aforementioned binder by kneading/rolling. Alternatively, these materials may be dissolved and suspended in a solvent such as water and/or N-methylpyrrolidone to form slurry which is then spread over the aforementioned collector and dried to obtain a sheet. Other materials and forming processes can be used.

In an aspect, the negative electrode 102 is capable of containing lithium (or lithium ion) or capable of occluding/releasing lithium (or lithium ion) similarly to the aforementioned positive electrode. As an example, the negative electrode 102 can comprise a negative active material incorporated therein capable of containing lithium ion or insertion/releasing lithium ion at a more negative potential than that of the positive electrode 100 combined with the negative electrode 102. Examples of negative active materials having such characteristics include: lithium metal, carbonaceous materials (carbon-based materials) such as artificial graphite, natural graphite, non-graphitizable carbon, graphitizable carbon and graphene; lithium titanate; iron sulfide; cobalt oxide; lithium-aluminum alloy; silicon; and tinoxide. Other materials and forming processes can be used.

In an aspect, the separator 104 can be formed from polyetherimides (e.g., ULTEM 1000 series supplied by SABIC). As an example, battery separator films (e.g., separator 104) formed from polyetherimides provide a combination of outstanding performance characteristics, such as high compatibility with electrolyte and a high melt integrity temperature exceeding 180° C. In an aspect, the separator 104 can be formed from polyetherimides based on para-phenylene diamenes (e.g., ULTEM CRS 5000 series supplied by SABIC). Polyetherimides based on para-phenylene diamine can fulfill the critical requirement to be resistant to the battery electrolyte solution, also at elevated temperatures of 55° C. Additionally, these materials show an extremely low contact angle to the electrolyte solution, which favors separator wettability and electrolyte retention, allowing for a reduced electrolyte filling time during cell production and improved operating cell performance. In an aspect, the separators 104 can be formed from polyphenylene oxides (PPO, also known as polyphenylene ethers, PPE). As an example, battery separators (e.g., separator 104) formed from polyphenylene oxides provide an outstanding HTMI exceeding 180° C. and good electrolyte resistance. In an aspect, the separators 104 can be formed from polyimides (PI), e.g., by first preparing a separator based on a poly(amic acid), followed by a heat treatment (e.g., 325° C. for 2 mins) to form the polyimide. As an example, battery separators (e.g., separator 104) formed from polyimides provide an outstanding HTMI exceeding 180° C. combined with an excellent electrolyte wettability and electrolyte resistance. In an aspect, the separator 104 can comprise a fiber-based structure. The fiber-based structure can be formed from fine fibers spun from one or more polymers. Various polymers can be formed into fiber-based structure such as polyetherimide, poly(amic acid), polyphenylene oxide, polymethyl methacrylate, polystyrene, PE, PP, polytetrafluoroethylene, polyvinylidene fluoride, polycarbonate, poly(4-methylpentene), cyclic olefin copolymers, polyamide, aromatic polyamide, poly(amide-imide), polyoxymethylene, polyphthalamide, polysulfone, polyethersulfone, polyphenylsulfone, liquid crystalline polymers, polybutylene terephthalate, PE terephthalate, PE naphthalate, polymethylpentene, polyketone, polyetherketone, polyetheretherketone, polyphenylene sulfide, cellulose, cellulose acetate, cellulose acetate butylate, polyacrylonitrile, or poly(acrylonitrile-co-methacrylate), or a copolymer or blend thereof.

Figure 2:
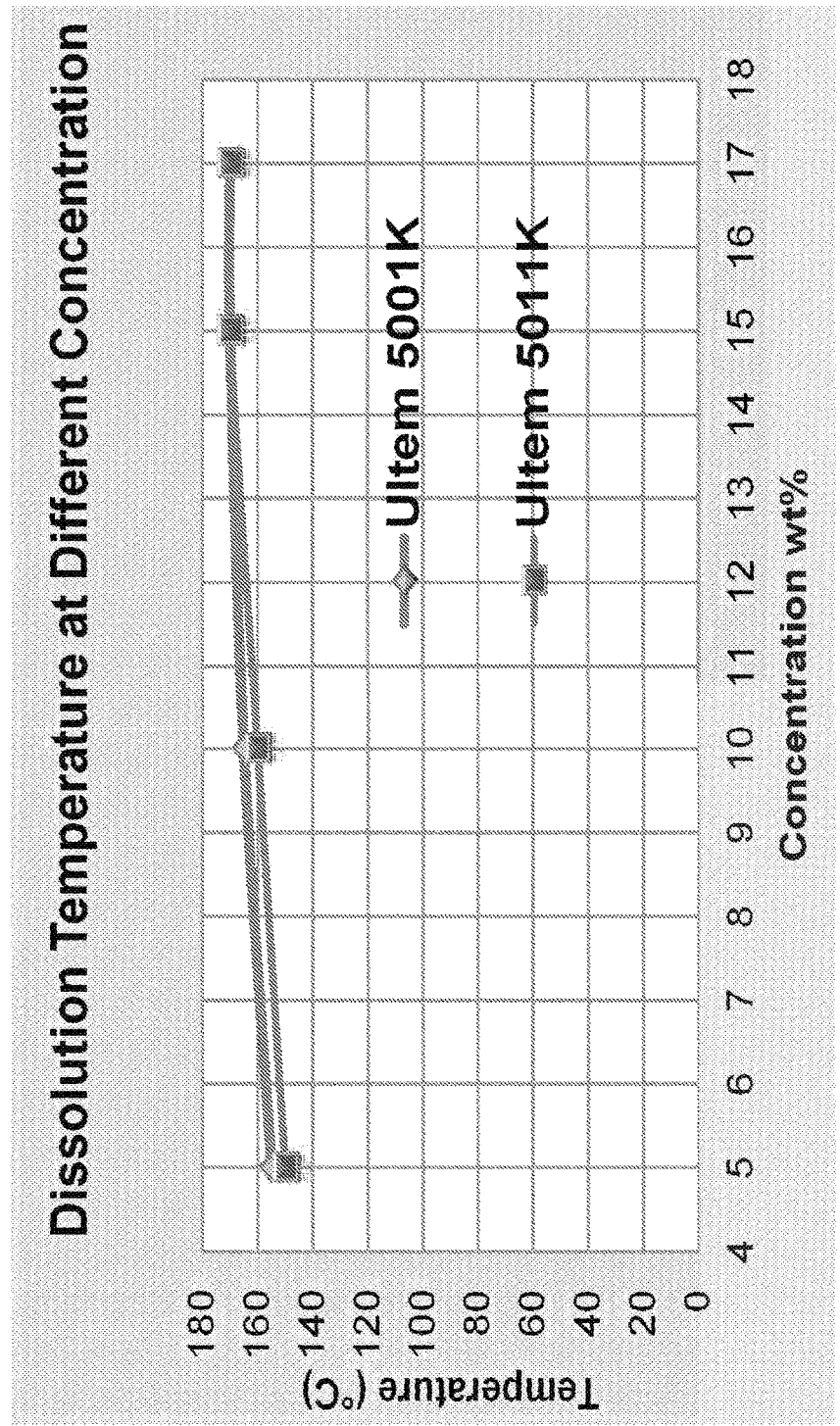
FIG. 2 is a graph illustrating dissolution temperature of ULTEM CRS 5001K and CRS 5011K in N-methyl-2-pyrrolidone (NMP) as function of concentration.

In an aspect, the separator 104 can be prepared by dissolving solvent-resistant polyetherimides in N-methyl-pyrrolidone (N-methyl-2-pyrrolidone) at elevated temperatures (140-202° C., see FIG. 2) in a closed system (i.e., no direct contact between the solution and the air atmosphere) or open system, followed by spinning the solution at reduced temperature (25-140° C.). As an example, membranes can be prepared using the materials and processes disclosed herein for environments such as battery cells and/or capacitor cells, electrolytic energy storage devices, a dialysis membrane, a water filtration membrane, a desalination membrane, a gas separation membrane, and the like.

In an aspect, polyimides can comprise polyetherimides and polyetherimide copolymers. The polyetherimide can be selected from (i) polyetherimide homopolymers, e.g., polyetherimides, (ii) polyetherimide co-polymers, e.g., polyetherimidesulfones, and (iii) combinations thereof. Polyetherimides are known polymers and are sold by SABIC under the ULTEM®*, EXTEM®*, and Siltem* brands (Trademark of SABIC Innovative Plastics IP B.V.).

In an aspect, the polyetherimides can be of formula (1):

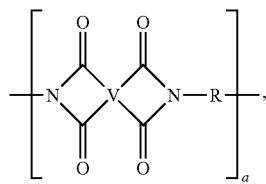

(1)

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations comprising at least one of the foregoing.

Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

(2)

wherein Q1 includes but is not limited to a divalent moiety such as —O—, —S—, —C(O)—, —SO2-, —SO—, —CyH2y- (y being an integer from 1 to 5), and halogenated derivatives thereof, including perfluoroalkylene groups.

In an embodiment, linkers V include but are not limited to tetravalent aromatic groups of formula (3):

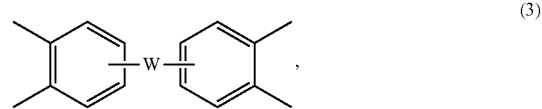

(3)

wherein W is a divalent moiety including —O—, —SO2-, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

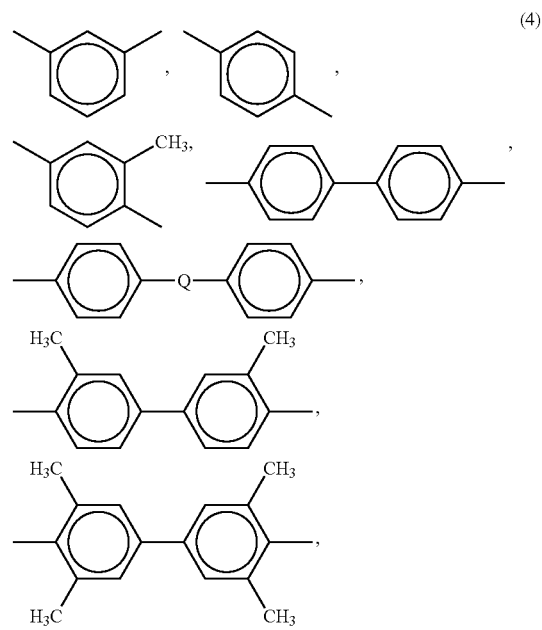

(4)

-continued

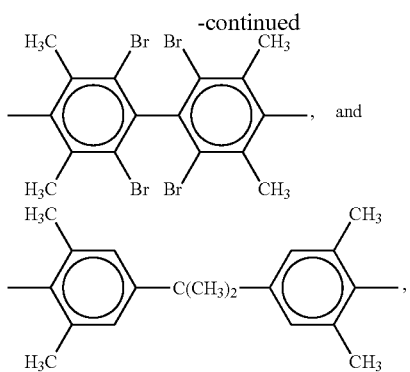

and wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In an aspect, the polyetherimide comprise more than 1, specifically 10 to 1,000, or more specifically, 10 to 500 structural units, of formula (5):

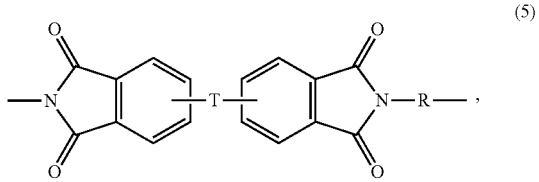
(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another aspect, the polyetherimidesulfones are polyetherimides comprising ether groups and sulfone groups wherein at least 50 mole % of the linkers V and the groups R in formula (1) comprise a divalent arylenesulfone group. For example, all linkers V, but no groups R, can contain an arylenesulfone group; or all groups R but no linkers V can contain an arylenesulfone group; or an arylenesulfone can be present in some fraction of the linkers V and R groups, provided that the total mole fraction of V and R groups containing an aryl sulfone group is greater than or equal to 50 mole %.

Even more specifically, polyetherimidesulfones can comprise more than 1, specifically 10 to 1,000, or more specifically, 10 to 500 structural units of formula (6):

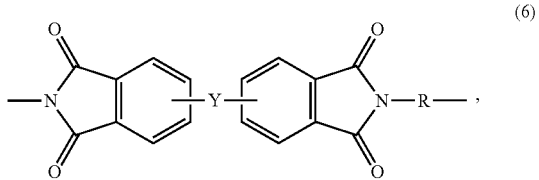
(6)

wherein Y is —O—, —SO2-, or a group of the formula —O—Z—O— wherein the divalent bonds of the —O—, SO2-, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+ moles R in formula (2) contain —SO2- groups.

It is to be understood that the polyetherimides and polyetherimidesulfones can optionally comprise linkers V that do not contain ether or ether and sulfone groups, for example linkers of formula (7):

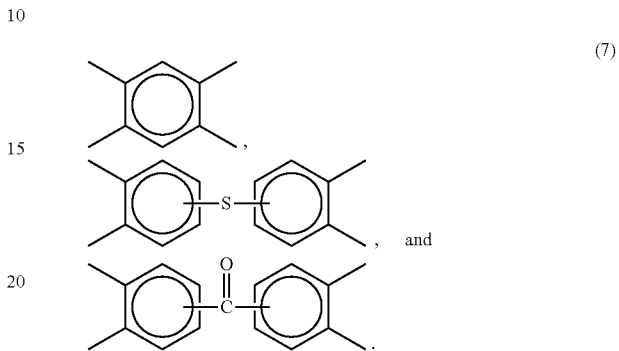
(7)

and

Imide units containing such linkers are generally be present in amounts ranging from 0 to 10 mole % of the total number of units, specifically 0 to 5 mole %. In one embodiment no additional linkers V are present in the polyetherimides and polyetherimidesulfones.

In another aspect, the polyetherimide comprises 10 to 500 structural units of formula (5) and the polyetherimidesulfone contains 10 to 500 structural units of formula (6).

Polyetherimides and polyetherimidesulfones can be prepared by any suitable process. In one embodiment, polyetherimides and polyetherimide copolymers include polycondensation polymerization processes and halo-displacement polymerization processes.

Polycondensation methods can include a method for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO2 in what is known as the nitro-displacement step. After purification, the BPA-bisimide is reacted with phthalic anhydride in an imide exchange reaction to afford BPA-dianhydride (BPADA), which in turn is reacted with a diamine such as meta-phenylene diamine (MPD) in ortho-dichlorobenzene in an imidization-polymerization step to afford the product polyetherimide.

Other diamines are also possible. Examples of suitable diamines include: m-phenylenediamine; p-phenylenediamine; 2,4-diaminotoluene; 2,6-diaminotoluene; m-xylylenediamine; p-xylylenediamine; benzidine; 3,3'-dimethylbenzidine; 3,3'-dimethoxybenzidine; 1,5-diaminonaphthalene; bis(4-aminophenyl)methane; bis(4-aminophenyl)propane; bis(4-aminophenyl)sulfide; bis(4-aminophenyl)sulfone; bis(4-aminophenyl)ether; 4,4'-diaminodiphenylpropane; 4,4'-diaminodiphenylmethane(4,4'-methylenedianiline); 4,4'-diaminodiphenylsulfide; 4,4'-diaminodiphenylsulfone; 4,4'-diaminodiphenylether(4,4'-oxydianiline); 1,5-diaminonaphthalene;

3,3'dimethylbenzidine; 3-methylheptamethylenediamine; 4,4-dimethylheptamethylenediamine; 2,2',3,3'-tetrahydro-3,3,3',3'-tetramethyl-1,1'-spirobi[1H-indene]-6,6'-diamine; 3,3',4,4'-tetrahydro-4,4,4',4'-tetramethyl-2,2'-spirobi[2H-1-benzo-pyran]-7,7'-diamine; 1,1'-bis[1-amino-2-methyl-4-phenyl]cyclohexane, and isomers thereof as well as mixtures and blends comprising at least one of the foregoing. In one embodiment, the diaminesare specifically aromatic diamines, especially m- and p-phenylenediamine and mixtures comprising at least one of the foregoing.

Suitable dianhydrides that can be used with the diamines include and are not limited to 2,2-bis[4-(3,4-dicarboxyphenoxy)phenyl]propane dianhydride; 4,4'-bis(3,4-dicarboxyphenoxy)diphenyletherdianhydride; 4,4'-bis(3,4-dicarboxyphenoxy)diphenylsulfidedianhydride; 4,4'-bis(3,4-dicarboxyphenoxy)benzophenonedianhydride; 4,4'-bis(3,4-dicarboxyphenoxy)diphenylsulfonedianhydride; 2,2-bis[4-(2,3-dicarboxyphenoxy)phenyl]propane dianhydride; 4,4'-bis(2,3-dicarboxyphenoxy)diphenyletherdianhydride; 4,4'-bis(2,3-dicarboxyphenoxy)diphenylsulfidedianhydride; 4,4'-bis(2,3-dicarboxyphenoxy)benzophenonedianhydride; 4,4'-bis(2,3-dicarboxyphenoxy)diphenylsulfonedianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy) diphenyletherdianhydride; 4-(2,3-dicarboxyphenoxy)-4'-(3,4-dicarboxyphenoxy)diphenylsulfide dianhydride; 4-(2,3-dicarboxyphenoxy)-4'-(3,4-dicarboxyphenoxy) benzophenonedianhydride; 4-(2,3-dicarboxyphenoxy)-4'-(3,4-dicarboxyphenoxy)diphenylsulfone dianhydride; 1,3-bis (2,3-dicarboxyphenoxy)benzene dianhydride; 1,4-bis(2,3-dicarboxyphenoxy)benzene dianhydride; 1,3-bis(3,4-dicarboxyphenoxy)benzene dianhydride; 1,4-bis(3,4-dicarboxyphenoxy)benzene dianhydride; 3,3',4,4'-diphenyltetracarboxylicdianhydride; 3,3',4,4'-benzophenonetetracarboxylic dianhydride; naphthalicdianhydrides, such as 2,3,6,7-naphthalic dianhydride, etc.; 3,3',4,4'-biphenylsulphonictetracarboxylic dianhydride; 3,3',4,4'-biphenylethertetracarboxylic dianhydride; 3,3',4,4'-dimethyldiphenylsilanetetracarboxylic dianhydride; 4,4'-bis (3,4-dicarboxyphenoxy)diphenylsulfidedianhydride; 4,4'-bis (3,4-dicarboxyphenoxy)diphenylsulphonedianhydride; 4,4'-bis (3,4-dicarboxyphenoxy) diphenylpropanedianhydride; 3,3',4,4'-biphenyltetracarboxylic dianhydride; bis(phthalic) phenylsulphineoxidedianhydride; p-phenylene-bis (triphenylphthalic)dianhydride; m-phenylene-bis (triphenylphthalic)dianhydride; bis(triphenylphthalic)-4,4'-diphenylether dianhydride; bis(triphenylphthalic)-4,4'-diphenylmethane dianhydride; 2,2'-bis(3,4-dicarboxyphenyl)hexafluoropropanedianhydride; 4,4'-oxydiphthalic dianhydride; pyromelliticdianhydride; 3,3',4,4'-diphenylsulfonetetracarboxylic dianhydride; 4',4'-bisphenol A dianhydride; hydroquinone diphthalic dianhydride; 6,6'-bis(3,4-dicarboxyphenoxy)-2,2',3,3'-tetrahydro-3,3,3',3'-tetramethyl-1,1'-spirobi[1H-indene]dianhydride; 7,7'-bis(3,4-dicarboxyphenoxy)-3,3',4,4'-tetrahydro-4,4,4',4'-tetramethyl-2,2'-spirobi[2H-1-benzopyran] dianhydride; 1,1'-bis[1-(3,4-dicarboxyphenoxy)-2-methyl-4-phenyl]cyclohexane dianhydride; 3,3',4,4'-diphenylsulfonetetracarboxylic dianhydride; 3,3',4,4'-diphenylsulfidetetracarboxylic dianhydride; 3,3',4,4'-diphenylsulfoxidetetracarboxylic dianhydride; 4,4'-oxydiphthalic dianhydride; 3,4'-oxydiphthalic dianhydride; 3,3'-oxydiphthalic dianhydride; 3,3'-benzophenonetetracarboxylic dianhydride; 4,4'-carbonyldiphthalic dianhydride; 3,3',4,4'-diphenylmethanetetracarboxylic dianhydride; 2,2-bis(4-(3,3-dicarboxyphenyl)propane dianhydride; 2,2-bis(4-(3,3-dicarboxyphenyl)hexafluoropropanedianhydride; (3,3',4,4'-diphenyl)phenylphosphinetetracarboxylicdianhydride; (3,3',4,4'-diphenyl)phenylphosphineoxidetetracarboxylicdianhydride; 2,2'-dichloro-3,3',4,4'-biphenyltetracarboxylic dianhydride; 2,2'-dimethyl-3,3',4,4'-biphenyltetracarboxylic dianhydride; 2,2'-dicyano-3,3',4,4'-biphenyltetracarboxylic dianhydride; 2,2'-dibromo-3,3',4,4'-biphenyltetracarboxylic dianhydride; 2,2'-diiodo-3,3',4,4'-biphenyltetracarboxylic dianhydride; 2,2'-ditrifluoromethyl-3,3',4,4'-biphenyltetracarboxylic dianhydride; 2,2'-bis(1-methyl-4-phenyl)-3,3',4,4'-biphenyltetracarboxylic dianhydride; 2,2'-bis(1-trifluoromethyl-2-phenyl)-3,3',4,4'-biphenyltetracarboxylic dianhydride; 2,2'-bis(1-trifluoromethyl-3-phenyl)-3,3',4,4'-biphenyltetracarboxylic dianhydride; 2,2'-bis(1-trifluoromethyl-4-phenyl)-3,3',4,4'-biphenyltetracarboxylic dianhydride; 2,2'-bis(1-phenyl-4-phenyl)-3,3',4,4'-biphenyltetracarboxylic dianhydride; 4,4'-bisphenol A dianhydride; 3,4'-bisphenol A dianhydride; 3,3'-bisphenol A dianhydride; 3,3',4,4'-diphenylsulfoxidetetracarboxylic dianhydride; 4,4'-carbonyldiphthalic dianhydride; 3,3',4,4'-diphenylmethanetetracarboxylic dianhydride; 2,2'-bis(1,3-trifluoromethyl-4-phenyl)-3,3',4,4'-biphenyltetracarboxylic dianhydride, and all isomers thereof, as well as combinations of the foregoing.

Halo-displacement polymerization methods for making polyetherimides and polyetherimidesulfones include and are not limited limited to, the reaction of a bis(phthalimide) for formula (8):

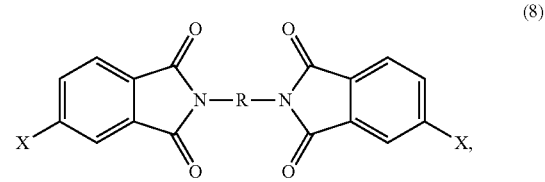

wherein R is as described above and X is a nitro group or a halogen. Bis-phthalimides (8) can be formed, for example, by the condensation of the corresponding anhydride of formula (9):

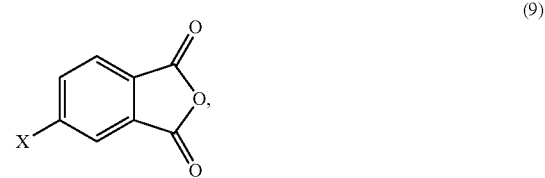

wherein X is a nitro group or halogen, with an organic diamine of the formula (10):

wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3, 5-diethylphenyl) methane, bis (4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1, 3-diamino-4-isopropylbenzene, bis(4-aminophenyl) ether and 1,3-bis(3-aminopropyl) tetramethyldisiloxane. Mixtures of these amines can be used. Illustrative examples of amine compounds of formula (10) containing sulfone groups include but are not limited to, diaminodiphenylsulfone (DDS) and bis(aminophenoxy phenyl) sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimidesulfone comprises structural units of formula (6) wherein at least 50 mole % of the R groups are of formula (4) wherein Q is —SO2- and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimidesulfone can be used alone or in combination with each other ans/or other of the disclosed polymeric materials in fabricating the polymeric components of the invention. In one embodiment, only the polyetherimide is used. In another embodiment, the weight ratio of polyetherimide:polyetherimidesulfone can be from 99:1 to 50:50.

The polyetherimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 500° C., as measured using differential scanning calorimetry (DSC) per ASTM test D3418. In some embodiments, the polyetherimide and, in particular, a polyetherimide has a glass transition temperature of 240 to 350° C.

The polyetherimides can have a melt index of 0.1 to 10 grams per minute (g/min), as measured by American Society for Testing Materials (ASTM) DI 238 at 340 to 370° C., using a 6.7 kilogram (kg) weight.

An alternative halo-displacement polymerization process for making polyetherimides, e.g., polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischlorophthalimide of meta-phenylene diamine (CAS No. 148935-94-8). The bischlorophthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischlorophthalimides which may be polymerized by chloro-displacement with BPA disodium salt as described above.

Siloxane polyetherimides can include polysiloxane/polyetherimide block copolymers having a siloxane content of greater than 0 and less than 40 weight percent (wt %) based on the total weight of the block copolymer. The block copolymer comprises a siloxane block of Formula (I):

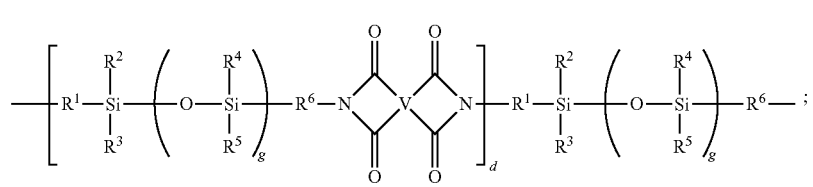

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstitutedalkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted-alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyetherimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyetherimide resin can have a weight average molecular weight (Mw) from 5,000 to 100,000 daltons, from 5,000 to 80,000 daltons, or from 5,000 to 70,000 daltons. The primary alkyl amine modified polyetherimide will have lower molecular weight and higher melt flow than the starting, unmodified, polyetherimide.

The polyetherimide resin can be selected from the group consisting of a polyetherimide, for example, as described in U.S. Pat. Nos. 3,875,116, 6,919,422, and 6,355,723; a silicone polyetherimide, for example, as described in U.S. Pat. Nos. 4,690,997 and 4,808,686; a polyetherimidesulfone resin, as described in U.S. Pat. No. 7,041,773; or combinations thereof. Each of these patents are incorporated herein in their entirety.

The polyetherimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, 300, 310, and 320 degrees Celsius. For example, the polyetherimide resin can have a glass transition temperature (Tg) greater than about 200 degrees Celsius. The polyetherimide resin can be substantially free (less than 100 ppm) of benzylic protons. The polyetherimide resin can be free of benzylic protons. The polyetherimide resin can have an amount of benzylic protons below 100 ppm. In one embodiment, the amount of benzylic protons ranges from more than 0 to below 100 ppm. In another embodiment, the amount of benzylic protons is not detectable.

The polyetherimide resin can be substantially free (less than 100 ppm) of halogen atoms. The polyetherimide resin can be free of halogen atoms. The polyetherimide resin can have an amount of halogen atoms below 100 ppm. In one embodiment, the amount of halogen atoms range from more than 0 to below 100 ppm. In another embodiment, the amount of halogen atoms is not detectable.

In an aspect, the electrolyte 108 can comprise a molten salt and/or a lithium salt. As an example, the lithium battery electrolyte can have a high lithium ionic conductivity and so low viscosity as to give a high infiltration into the electrode or separator. In an aspect, the electrolyte 108 can comprise one or more of lithium tetrafluoroborate (abbreviated as "LiBF4"), lithium hexafluorophosphate (abbreviated as "LiPF6"), lithium hexafluoromethanesulfonate, lithium bis (trifluoromethane sulfonyl) amide (abbreviated as "LiTFSI"), lithium dicyanamide (abbreviated as "LiDCA"), lithium trifluoromethanesulfonate (abbreviated as "LiTFS") and lithium bis(pentafluoroethanesulonyl)amide (abbreviated as "LiBETI"). Other materials and forming processes can be used.

The cation contained in the aforementioned molten salt is not specifically limited but may be one or more selected from the group consisting of aromatic quaternary ammonium ions such as 1-ethyl-3-methyl imidazolium, 1-methyl-3-propylimidazolium, 1-methyl-3-isopropylimidazolium, 1-butyl-3-methylimidazolium, 1-ethyl-2,3-dimethyl imidazolium, 1-ethyl-3,4-dimethylimidazolium, N-propylpyridinium, N-butylpyridinium, N-tert-butyl pyridinium and N-tert-pentylpyridinium, and aliphatic quaternary ammonium ions such as N-butyl-N,N,N-trimethylammonium, N-ethyl-N,N-dimethyl-N-propyl ammonium, N-butyl-N-ethyl-N,N-dimethylammonium, N-butyl-N,N-dimethyl-N-propylammonium, N-methyl-N-propylpyrrolidinium, N-butyl-N-methyl pyrrolidinium, N-methyl-N-pentylpyrrolidinium, N-propoxyethyl-N-methylpyrrolidinium, N-methyl-N-propyl piperidinium, N-methyl-N-isopropylpiperidinium, N-butyl-N-methylpiperidinium, N-isobutyl-N-methyl piperidinium, N-sec-butyl-N-methyl piperidinium, N-methoxyethyl-N-methylpiperidinium and N-ethoxyethyl-N-methylpiperidinium. Among these aliphatic quaternary ammonium ions, pyrrolidinium ions as nitrogen-containing 5-membered ring or piperidinium ions as nitrogen-containing 6-membered ring are desirable because they have a high reduction resistance that inhibits side reaction to enhance storage properties or cycle performances. Other materials and forming processes can be used.

The anion contained in the aforementioned molten salt is not specifically limited but may be one or more selected from the group consisting of PF6-, (PF3(C2F5)3)-, (PF3(CF3)3)-, BF4-, (BF2(CF3)2)-, (BF2(C2F5)2)-, (BF3(CF3))-, (BF3(C2F5))-, (B(COOCOO)2)- (abbreviated as "BOB-"), CF3SO3- (abbreviated as "Tf-"), C4F9SO3- (abbreviated as "Nf-"), ((CF3SO2)2N)— (abbreviated as "TFSI-"), ((C2F5SO2)2N)— (abbreviated as "BETI-"), ((CF3SO2) (C4F9SO2)N)—, ((CN)2N)— (abbreviated as "DCA-") and ((CF3SO2)3C)— and ((CN)3C)—. Among these there may be desirably used at least one of PF6-, (PF3(C2F5)3)-, (PF3(CF3)3)-, BF4-, (BF2(CF3)2)-, (BF2(C2F5)2)-, (BF3(CF3))-, (BF3(C2F5))-, Tf-, Nf-, TFSI-, BETI- and ((CF3SO2) (C4F9SO2)N), which include F, in view of excellent cycle performances.

In use, the positive electrode and the negative electrode are separated from each other by a separator and are electrically connected to each other by ion movement through the aforementioned electrolyte. In order to form a battery including an electrolyte having the aforementioned constitution, the separator can be formed from a thermoplastic polymer.

Suitable polyetherimides that can be used in the disclosed compositions include, but are not limited to, ULTEM™. ULTEM™ is a polymer from the family of polyetherimides sold by Saudi Basic Industries Corporation (SABIC). ULTEM™ can have elevated thermal resistance, high strength and stiffness, and broad chemical resistance. ULTEM™ as used herein refers to any or all ULTEM™ polymers included in the family unless otherwise specified. In one aspect, a polyetherimide can comprise any polycarbonate material or mixture of materials, for example, as recited in U.S. Pat. Nos. 4,548,997; 4,629,759; 4,816,527; 6,310,145; and 7,230,066, all of which are hereby incorporated in its entirety for the specific purpose of disclosing various polyetherimide compositions and methods. In another aspect, a polyetherimide can comprise any polyester material or mixture of materials, for example, as recited in U.S. Pat. Nos. 4,141,927; 6,063,874; 6,150,473; and 6,204,340, all of which are hereby incorporated in its entirety for the specific purpose of disclosing various polyetherimide compositions and methods.

In certain aspects, the thermoplastic polymer is a polyetherimide polymer having a structure comprising structural units represented by an organic radical of formula (I):

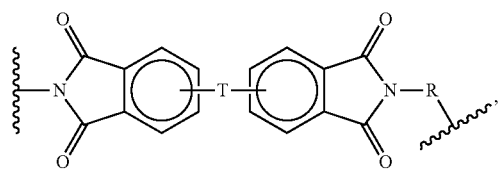

(I)

wherein R in formula (I) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (II):

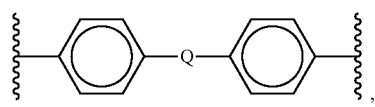

(II)

wherein Q includes a divalent moiety selected from the group consisting of a single bond, —O—, —S—, —C(O)—, —SO2-, —SO—, —CyH2y- (y being an integer from 1 to 5), and halogenated derivatives thereof, including perfluoroalkylene groups; wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III):

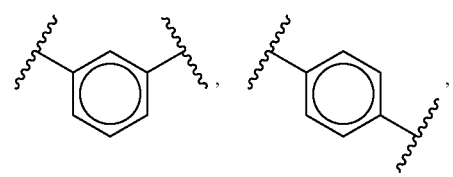

(III)

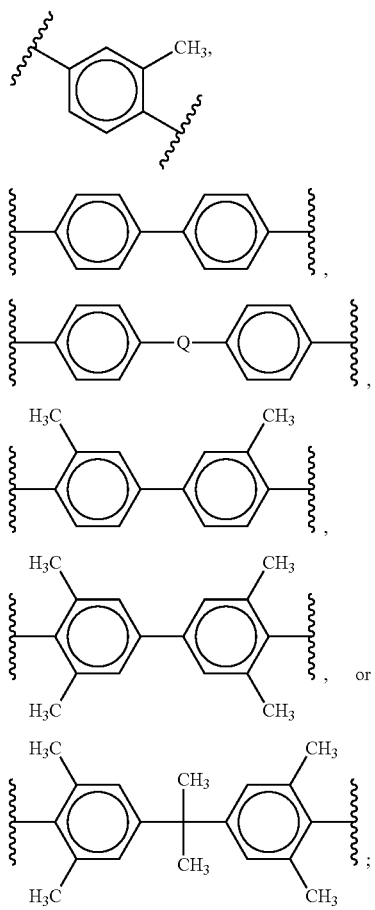

and wherein the polyetherimides which are included by formula (I) have a Mw of at least about 40,000.

In a further aspect, the polyetherimide polymer may be a copolymer, which, in addition to the etherimide units described above, further contains polyimide structural units of the formula (IV):

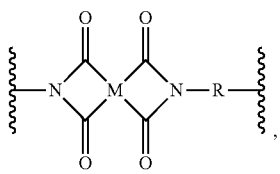

(IV)

wherein R is as previously defined for formula (I) and M includes, but is not limited to, radicals of formula (V):

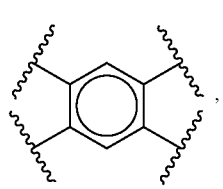

(V)

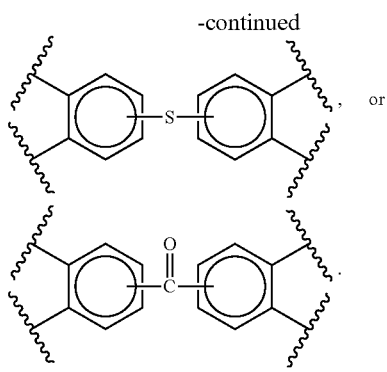

In a further aspect, the thermoplastic resin is a polyetherimide polymer having structure represented by a formula:

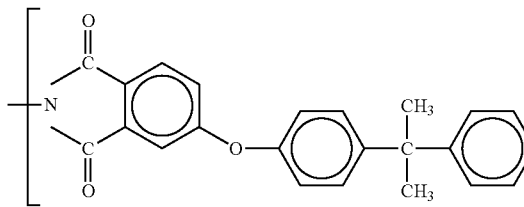

wherein the polyetherimide polymer has a molecular weight of at least 40,000 Daltons, 50,000 Daltons, 60,000 Daltons, 80,000 Daltons, or 100,000 Daltons.

The polyetherimide polymer can be prepared by methods known to one skilled in the art, including the reaction of an aromatic bis(ether anhydride) of the formula (VI):

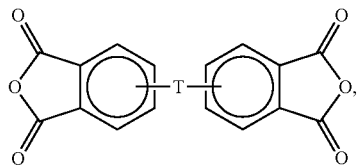

with an organic diamine of the formula (IX):

$$H_2N-R-NH_2 \quad \text{(VII)},$$

wherein T and R are defined as described above in formula (I).

Illustrative, non-limiting examples of aromatic bis(ether anhydride)s of formula (VI) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A useful class of aromatic bis(ether anhydride)s included by formula (VI) above includes, but is not limited to, compounds wherein T is of the formula (VIII):

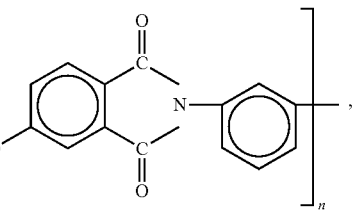

and the ether linkages, for example, are beneficially in the 3,3', 3,4', 4,3', or 4,4' positions, and mixtures thereof, and where Q is as defined above.

Any diamino compound may be employed in the preparation of the polyimides and/or polyetherimides. Illustrative, non-limiting examples of suitable diamino compounds of formula (VII) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecane diamine, 1,18-octadecanediamine, 3-methylheptamethylenediamine, 4,4-dimethylheptamethylenediamine, 4-methylnonamethylenediamine, 5-methylnonamethylene diamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylene diamine, 1,2-bis(3-aminopropoxy) ethane, bis(3-aminopropyl) sulfide, 1,4-cyclohexane diamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3, 5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1, 3-diamino-4-isopropyl benzene, bis(4-aminophenyl) sulfide, bis (4-aminophenyl) sulfone, bis(4-aminophenyl) ether and 1,3- bis(3-aminopropyl) tetramethyldisiloxane. Mixtures of these compounds may also be present. Beneficial diamino compounds are aromatic diamines, especially m- and p-phenylenediamine and mixtures thereof.

In a further aspect, the polyetherimide resin includes structural units according to formula (I) wherein each R is independently p-phenylene or m-phenylene or a mixture thereof and T is a divalent radical of the formula (IX):

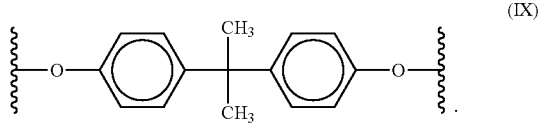

(IX)

In various aspects, the reactions can be carried out employing solvents such as o-dichlorobenzene, m-cresol/toluene, or the like, to effect a reaction between the anhydride of formula (VI) and the diamine of formula (VII), at temperatures of about 100° C. to about 250° C. Alternatively, the polyetherimide can be prepared by melt polymerization of aromatic bis(ether anhydride)s of formula (VI) and diamines of formula (VII) by heating a mixture of the starting materials to elevated temperatures with concurrent stirring. Melt polymerizations can employ temperatures of about 200° C. to about 400° C. Chain stoppers and branching agents can also be employed in the reaction. The polyetherimide polymers can optionally be prepared from reaction of an aromatic bis(ether anhydride) with an organic diamine in which the diamine is present in the reaction mixture at no more than about 0.2 molar excess, and beneficially less than about 0.2 molar excess. Under such conditions the polyetherimide resin has less than about 15 microequivalents per gram (μeq/g) acid titratable groups in one embodiment, and less than about 10 μeq/g acid titratable groups in an alternative embodiment, as shown by titration with chloroform solution with a solution of 33 weight percent (wt %) hydrobromic acid in glacial acetic acid. Acid-titratable groups are essentially due to amine endgroups in the polyetherimide resin.

In a further aspect, the polyetherimide resin has a weight average molecular weight (Mw) of at least about 24,000 to about 150,000 grams per mole (g/mole), as measured by gel permeation chromatography, using a polystyrene standard. In a still further aspect, the thermoplastic resin can have a molecular weight of at least 20,000 Daltons, 40,000 Daltons, 50,000 Daltons, 60,000 Daltons, 80,000 Daltons, 100,000 Daltons, or 120,000 Daltons. In a yet further aspect, the thermoplastic resin can have a molecular weight of at least 40,000 Daltons. In an even further aspect, the thermoplastic resin can have a molecular weight of at least 45,000 Daltons. In a still further aspect, the thermoplastic resin can have a molecular weight of at least 50,000 Daltons. In a yet further aspect, the thermoplastic resin can have a molecular weight of at least 60,000 Daltons. In an even further aspect, the thermoplastic resin can have a molecular weight of at least 70,000 Daltons. In a still further aspect, the thermoplastic resin can have a molecular weight of at least 100,000 Daltons.

In a further aspect, the thermoplastic resin can comprise a polyetherimide polymer having a molecular weight of at least 40,000 Daltons, 50,000 Daltons, 60,000 Daltons, 80,000 Daltons, or 100,000 Daltons. In a yet further aspect, polyetherimide polymer has a molecular weight of at least Daltons, 40,000 Daltons or 50,000 Daltons. In a still further aspect, the polyetherimide polymer has a molecular weight of at least 40,000 Daltons. In a yet further aspect, the polyetherimide polymer has a molecular weight of at least 50,000 Daltons. In an even further aspect, the polyetherimide polymer has a molecular weight of at least 60,000 Daltons. In a still further aspect, the polyetherimide polymer has a molecular weight of at least 70,000 Daltons. In a yet further aspect, the polyetherimide polymer has a molecular weight of at least 100,000 Daltons.

Poly(phenylene oxide) (PPO) is also known as poly (phenylene ether) (PPE) and can comprise homopolymers (e.g., based on 2,6-dimethyl-phenol), copolymers (e.g., based on 2,6-dimethyl-phenol, 2,3,6-trimethylphenol, 2-methyl-6-phenylphenol, 2,4-dimethyl-6-phenylphenol, eugenol-capped siloxane) or blends with e.g., polystyrene (PS), high-impact polystyrene (HIPS), styrene block-copolymers (e.g., styrene-ethylene-butylene-styrene, SEBS) or PP. Additionally, stabilizers and/or compatibilizers may be present.

Poly(amic acid) (PAA) is typically comprised of a dianhydride (e.g., pyromellitic dianhydride, 4,4',5,5'-sulfonyldiphthalic anhydride, 3,3',4,4'-oxydiphtalic dianhydride, 3,3',4,4'-benzophenone tetracarboxylic dianhydride, 4,4'-diphtalic (hexafluoroisopropylidene) anhydride, 4,4'-biphthalic anhydride, hydroquinone diphthalic anhydride, 4,4'-(4,4'-isopropylidenediphenoxy)bis(phthalic anhydride), or the like) combined with one or more types of amines, typically aliphatic or aromatic in nature (see for example Varun Rana, PhD Thesis, "Crystallization, Morphology, Thermal Stability and Adhesive Properties of Novel High Performance Semicrystalline Polyimides", 1999, Chapter 1). Such poly(amic acid) polymers will undergo ring close to form polyimide polymers (typically thermosets), as widely described in literature, e.g., in "Polyamic Acids and Polyimides: Synthesis, Transformations, and Structure", M. Bessonov, V. Zubkov, CRC Press, 1993.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Mechanical Spinning

This disclosure relates to a method for production of fine fibers from a polymer through a mechanical spinning process such as solution shear spinning, force spinning, and the like. Force spinning (comprising centrifugal spinning and rotary jet spinning) can be a technique where the driving force for the formation of the fine fibers is a centrifugal force. U.S. Pat. Appl. Nos. 2009/0280207, 2009/0232920, 2009/0269429, and 2009/0280325 describe an apparatus that uses a rotating spinneret comprising an array of capillaries. This spinneret typically rotates at speeds from 500 to 25000 rpms, thereby creating a significant centrifugal force responsible for the formation of fine fibers. By increasing the number of capillaries in a given spinneret, the volumetric throughput of fiber generation can be increased to make more fibers in a short period of time. This technology can typically be applied to a polymer melt as well as to a polymer solution and has the advantage of having significantly higher throughputs as compared to the conventional nano-fiber spinning technologies, such as electro-spinning. As the polymer is drawn from the orifice by the rotational (centrifugal) force, the parameters influencing the final fiber geometry and quality include spinneret angular velocity and orifice radius, polymer viscoelasticity (which includes viscosity and relaxation time of the material), surface tension, evaporation rate (for solvent in solution) and temperature (melting and solidification) and distance of spinneret orifice to collector. Shear spinning can be a process whereby a polymer solution is injected through one or multiple small orifices into a non-solvent to the polymer, which, upon mixing of the solvent and non-solvent, induces precipitation of the polymer at a solvent/non-solvent composition at which the polymer is no longer soluble in the solvent/non-solvent mixture. When the non-solvent is sheared (e.g., flows) upon injection of the polymer solution, the precipitation of the polymer will occur under shear conditions, which enables the formation of fibers at very high throughput. As spinning of the fibers relies on the shear conditions of the non-solvent in which the polymer solution is injected, this process is known as shear-spinning. Other spinning and fiber-processing techniques can be used.

Certain embodiments of the disclosure are directed to producing fine fibers having an individual average diameter of about 10 nm to about 50 µm. In an aspect, thermoplastic polymers having a glass transition temperature higher than 180° C. can be spun into fine fibers using the systems and methods of the present disclosure. In another aspect, polymers comprising one or more of polyetherimide, poly(amic acid), aromatic polyamide, poly(amide-imide) and polyphenylene oxide can be spun into fine fibers using the systems and methods of the present disclosure. In a further aspect, a polymer melt or solution can be spun into fine fibers using the systems and methods of the present disclosure, wherein the polymer melt or solution comprises polymethyl methacrylate, polystyrene, PE, PP, polytetrafluoroethylene, polyvinylidene fluoride, polycarbonate, poly(4-methylpentene), cyclic olefin copolymers, polyamide, aromatic polyamide, poly(amide-imide), poly(amic acid), polyoxymethylene, polyphthalamide, polysulfone, polyethersulfone, polyphenylsulfone, liquid crystalline polymers, polyetherimide, polybutylene terephthalate, PE terephthalate, PE naphthalate, polymethylpentene, polyketone, polyetherketone, polyetheretherketone, polyphenylene sulfide, cellulose, cellulose acetate, cellulose acetate butylate, polyacrylonitrile, or poly(acrylonitrile-co-methacrylate), or a copolymer or blend thereof. Other materials can be spun using the systems and methods of the present disclosure.

Materials

In an aspect, a plurality of high temperature materials can be used in preparation of fine fibers, to be used as e.g., a HTMI separator, as described herein and as illustrated below:

| Component | CHEMICAL DESCRIPTION | SOURCE |
| --- | --- | --- |
| ULTEM 1000 | Polyetherimide based on meta-phenylenediamine | SABIC |
| ULTEM 1010 | Polyetherimide based on meta-phenylenediamine | SABIC |
| ULTEM 9011 | Polyetherimide based on meta-phenylenediamine | SABIC |
| ULTEM CRS 5001K | Polyetherimide based on para-phenylenediamine | SABIC |
| ULTEM CRS 5011K | Polyetherimide based on para-phenylenediamine | SABIC |
| PPO 6130 | Polyphenyleneoxide | SABIC |
| PAA | Poly(pyromellitic dianhydride-co-4,4'-oxydianiline), amic acid solution, 11 wt. % +/− 5 wt. % in NMP/aromatic hydrocarbons (80%/20% solvent ratio) | Sigma-Aldrich |
| PAA | Poly(pyromellitic dianhydride-co-4,4'-oxydianiline), amic acid solution, 15 wt. % +/− 5 wt. % in NMP/aromatic hydrocarbons (80%/20% solvent ratio) | Sigma-Aldrich |
| PAA | Poly(pyromellitic dianhydride-co-4,4'-oxydianiline), amic acid solution, 12.8 wt. % +/− 0.5 wt. % in NMP/aromatic hydrocarbons (80%/20% solvent ratio) | Sigma-Aldrich |
| NMP | N-methyl pyrrolidone (HPLC-grade, water content 500 ppm) [e.g., for electrospinning] | Spectrochem Pvt Ltd. Mumbai (India) |
| 2-Cl-phenol | 2-Chloro-phenol | Sinopharm Chemical Reagent Co. Ltd |
| HFIP | Hexafluoro-isopropanol | Sinopharm Chemical Reagent Co. Ltd |
| DCM | Dichloromethane | Sinopharm Chemical Reagent Co. Ltd |
| TFA | Trifluoroacetic acid | Sinopharm Chemical Reagent Co. Ltd |
| CMP | 4-Chloro-2-methyl-phenol | Sinopharm Chemical Reagent Co. Ltd |
| Chloroform | Chloroform | Sinopharm Chemical Reagent Co. Ltd |
| TFE | 1,1,2,2-Tetrachloroethane | Sinopharm Chemical Reagent Co. Ltd |
| NMP | N-methyl pyrrolidone (99%, extra pure) [e.g., for Solution Forcespinning] | Acros Organics |
| Chloroform | Chloroform (99+%, extra pure, stabilized with ethanol) | Acros Organics |
| Toluene | Methylbenzene (>99.5%, Certified ACS reagent grade) [e.g., for Solution Forcespinning] | Fisher Scientific |
| Glycerol | Glycerol (99.7%) | Brenntag Southwest, Inc. |
| Ethanol | Ethanol (Anhydrous ACS/USP grade, 99.5%) | Pharmco-Aaper |

As shown and described herein, polyetherimides based on para-phenylene diamines (ULTEM CRS 5000 series from SABIC) can be used as solvent resistant membranes for lithium-ion battery applications. The ULTEM CRS 5000 series does not significantly dissolve (i.e., normalized dry weight of greater than about 90%) in typical electrolytes (e.g., 1:1:1 EC:DMC:EMC and 1 mol/L LiPF$_6$), where the normalized dry weight is calculated as the dry weight after electrolyte soaking divided by the starting weight, and the dry weight after electrolyte soaking is measured by soaking the material in the electrolyte for 21 days at about 55° C., drying the material in an oven until no further weight reduction is observed, and recording the dry weight. As an example, fibers and membranes can be prepared using the materials and processes disclosed herein for environments such as battery cells and/or capacitor cells, electrolytic energy storage devices, a dialysis membrane, a water filtration membrane, a desalination membrane, a gas separation membrane, and the like.

Figure 3:
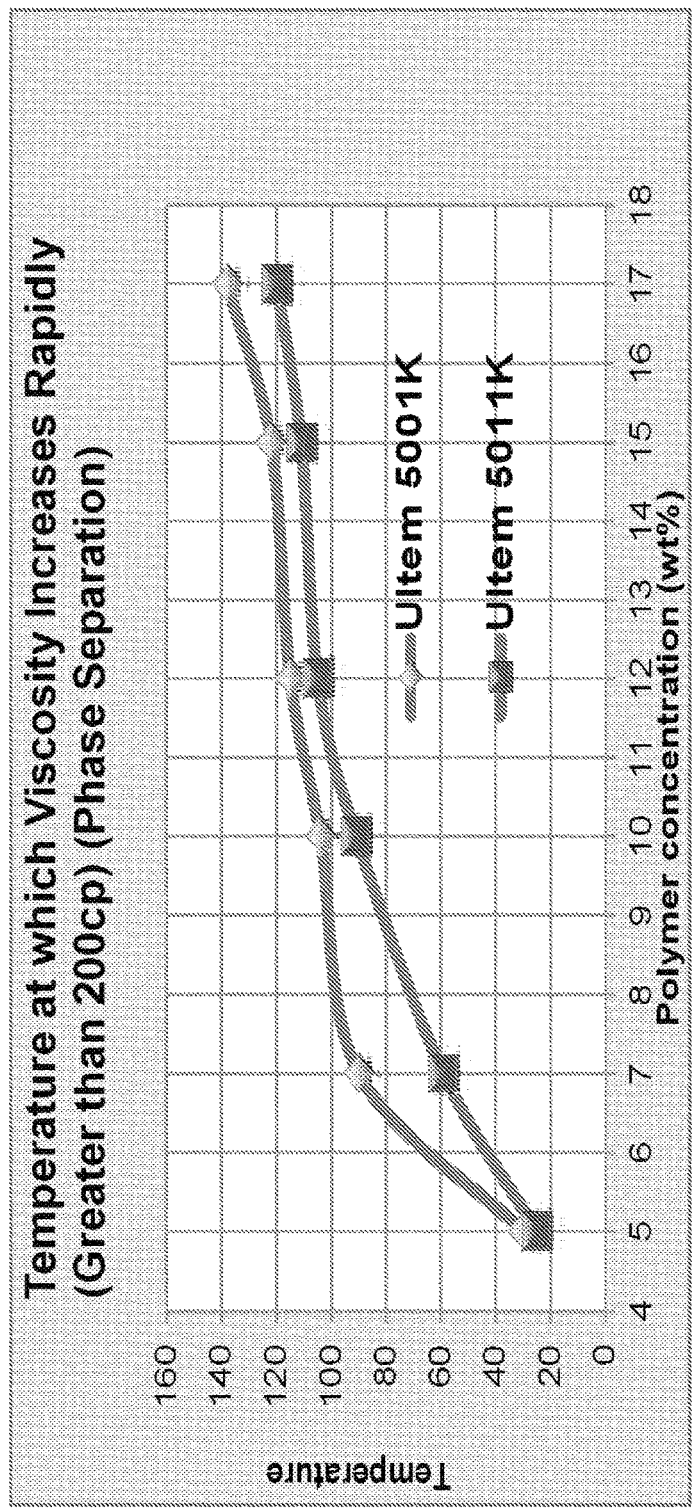
FIG. 3 is a graph illustrating "steady-state" phase separation temperature.

In an aspect, chemical resistant, porous membranes can be prepared by dissolving solvent-resistant polyetherimides in NMP at elevated temperatures (about 140-202° C., see FIG. 2), followed by spinning the solution at reduced temperature (about 30-140° C.). The dissolution temperature in FIG. 2 was determined by visual observation of the polymer dissolving in the solvent and the complete solution turning transparent. FIG. 3 shows the phase separation temperature as a function of concentration, measured by determining the temperature at which the solution shows a sudden significant increase in viscosity upon slowly cooling down from about 170° C., which is an indication for gelation (early stage of phase separation). In an aspect, solutions can be prepared by boiling the NMP solution for a period of time (e.g., 3-5 mins). Moisture analysis of NMP using a Karl Fischer titrator shows that there is a drastic reduction in moisture content, which is explained by the fact that NMP and water do not form an azeotrope (reference Raginskaya L. M.: N-Methyl-2-Pyrrolidon-Wasser. Prom. Sint. Kaucuka (1975) 1-3) and, therefore, most of the water evaporates from the boiling NMP.

NMP has a Health Rating of only 2 on the NFPA fire diamond (according to the Centers for Disease Control and Prevention—http://www.cdc.gov) and is, therefore, considered to be much more environmentally friendly as compared to other solvent systems capable of dissolving ULTEM CRS 5000, such as phenol and cresol solvent systems as described in U.S. Pat. Appl. Nos. 2007/0056901 and 2007/0060688 and U.S. Pat. No. 7,439,291. Additionally, as NMP is fully miscible with water, and water is a poor solvent for polyetherimides, the non-solvent in e.g., the shear spinning process can be based on water, optionally in combination with NMP.

In an aspect, the fibers formed by the processes described herein can be collected onto a collector substrate to form a non-woven web. The collector substrate can be a solid or porous substrate. The collector substrate can be a porous polymer substrate, such as a micro-porous non-woven web or a polyolefin porous membrane suitable for lithium ion battery separators. Additionally, the substrate collector can be an electrode, e.g., a battery or capacitor electrode. Alternatively, the fibers formed by the processes as described herein can be further processed to form the final porous web. Such processes include, but are not limited to, a drying step, a dispersion step into a solvent, a dry laid process, a wet laid process, a paper-making process, a dry spraying method, a wet spraying method, a thermal treatment, a pressure treatment, or combinations thereof.

Sample Preparation
Shear-Spinning

In an aspect, shear-spinning method (e.g., as described in U.S. Pat. Appl. No. 2006/0063882 and U.S. Pat. No. 7,323, 540) is a particularly suitable method to prepare fine or ultra-fine fibers based on high temperature polymers at high throughputs, which can be used for e.g., HTMI separators. These porous separators are particularly useful in electrolytic energy storage devices, such as lithium-ion, lithium-sulfur and electrolytic double-layer capacitors.

Figure 4A:
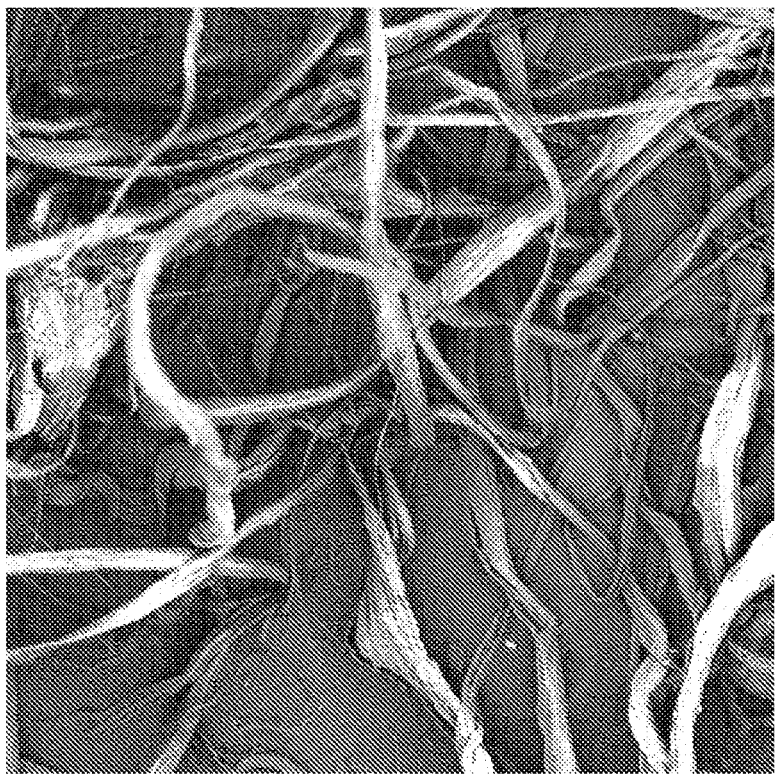
FIG. 4A is a representation of a morphology of PPO 6130 fiber-based structures.
Figure 4B:
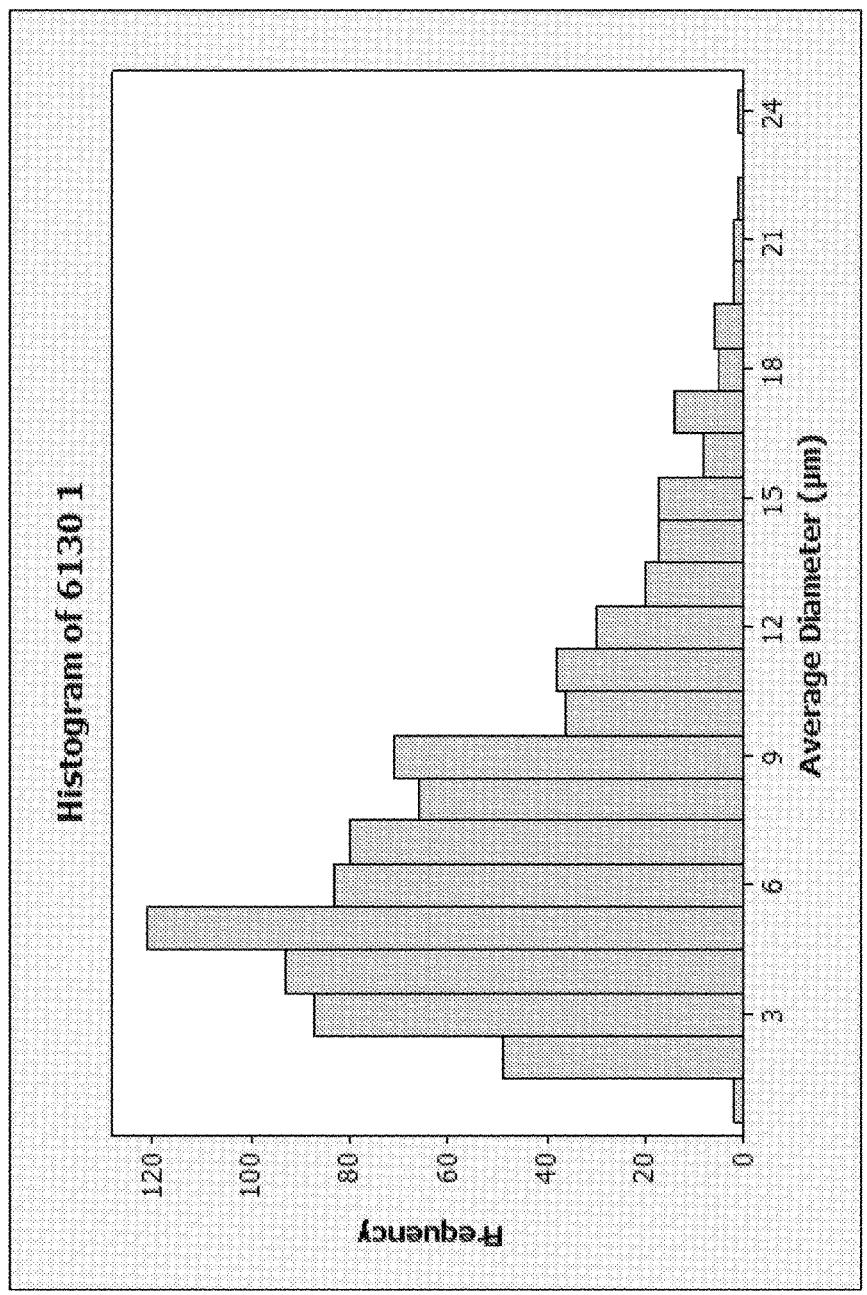
FIG. 4B is a graph of fiber count to fiber diameter of PPO 6130 fiber-based structures.

Polyphenylene oxide fibers were prepared according to the following procedure. PPO 6130 (SABIC) was dissolved in chloroform. The total PPO 6130 concentration was about 8 wt % and the solution was kept at room temperature. The instrument used to generate the fibers was a Xanofi Xanoshear® spinning system. FIG. 4A is a representation of the morphology of the obtained PPO 6130 fibers when spun into an anti-solvent made from about 60% Glycerol, about 25% Ethanol and about 15% water by weight. FIG. 4B is a graph of example fiber count to fiber diameter of the obtained PPO 6130 fibers.

Distributions of fiber diameters were measured by imaging the sample using a Phenom Pro Desktop, scanning electron microscope (SEM). A minimum magnification of 140× was used. A minimum of 4 images are retained for fiber diameter analysis. Fiber diameter analysis software (e.g., Fibermetric software) is used to measure the sample's images and at least 100 measurements per image, which are randomly selected by the software, are used in determining the average fiber diameter and distribution.

Figure 5A:
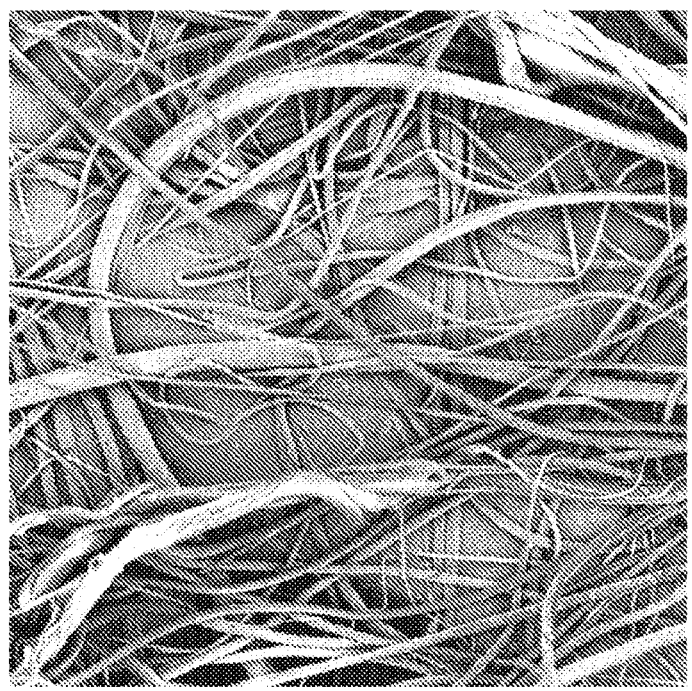
FIG. 5A is a representation of a morphology of PPO 6130 fiber-based structures.
Figure 5B:
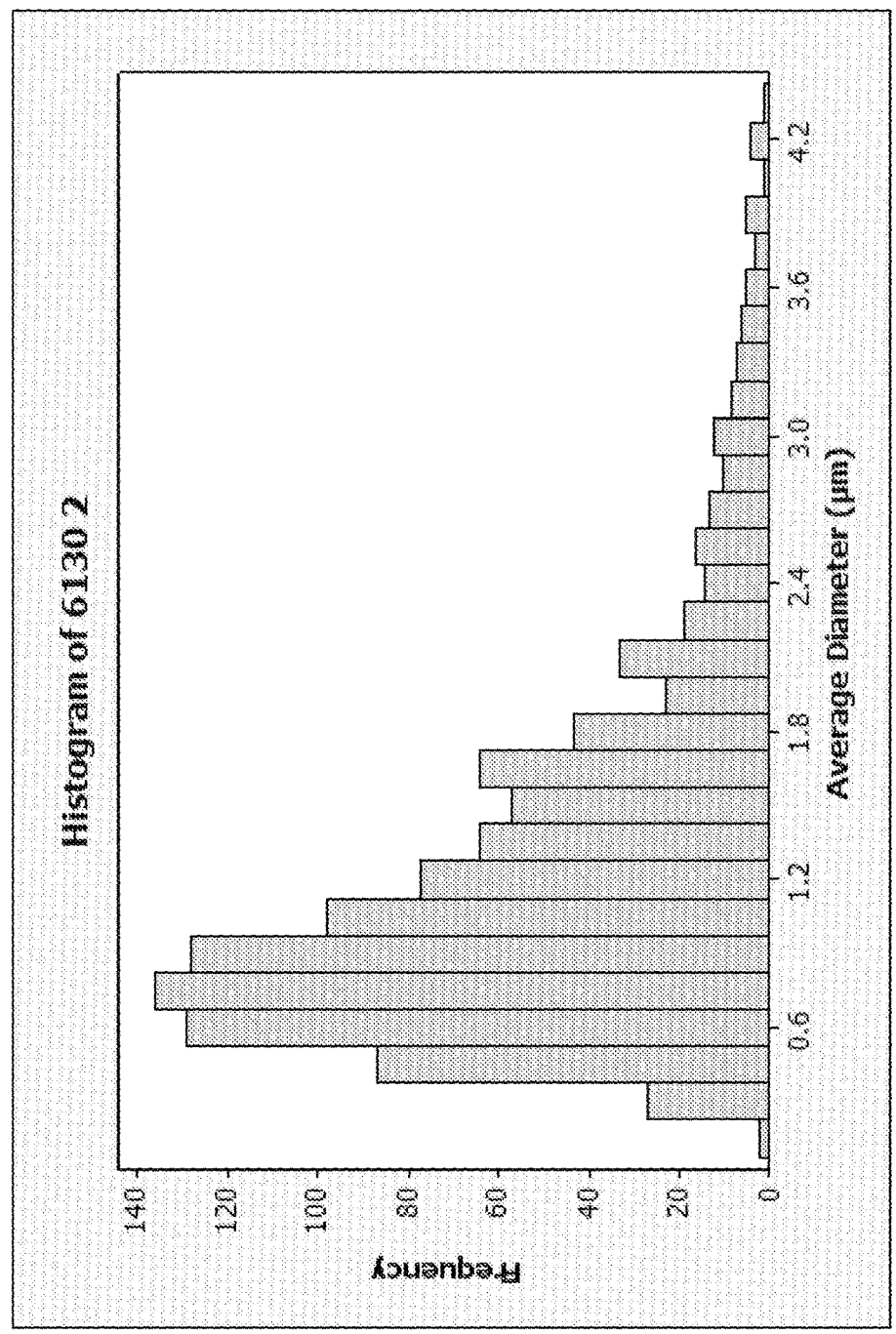
FIG. 5B is a graph of fiber count to fiber diameter of PPO 6130 fiber-based structures.

FIG. 5A is a representation of the morphology of the obtained PPO 6130 fibers when spun into an anti-solvent made from about 65% Glycerol, about 20% Ethanol and about 15% water. The instrument used to generate the samples was a Xanofi Xanoshear® spinning system. FIG. 5B is a graph of fiber count to fiber diameter of the obtained PPO 6130 fibers.

In an aspect, polyetherimide fibers were prepared according to the following procedure. ULTEM 1010 (SABIC) was dissolved in chloroform (CHCL3) and the solution was kept at about room temperature. The instrument used to generate the fibers was a Xanofi Xanoshear® spinning system.

Figure 6A:
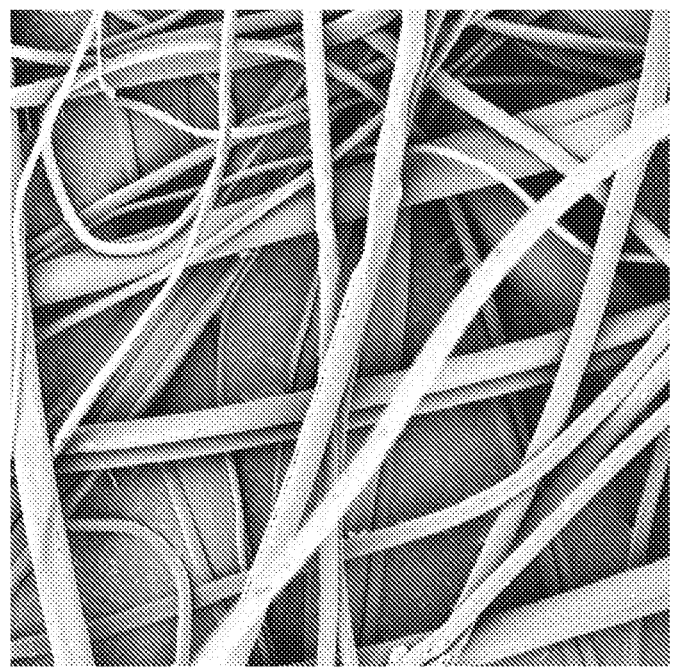
FIG. 6A is a representation of a morphology of ULTEM 1010 fiber-based structures.
Figure 6B:
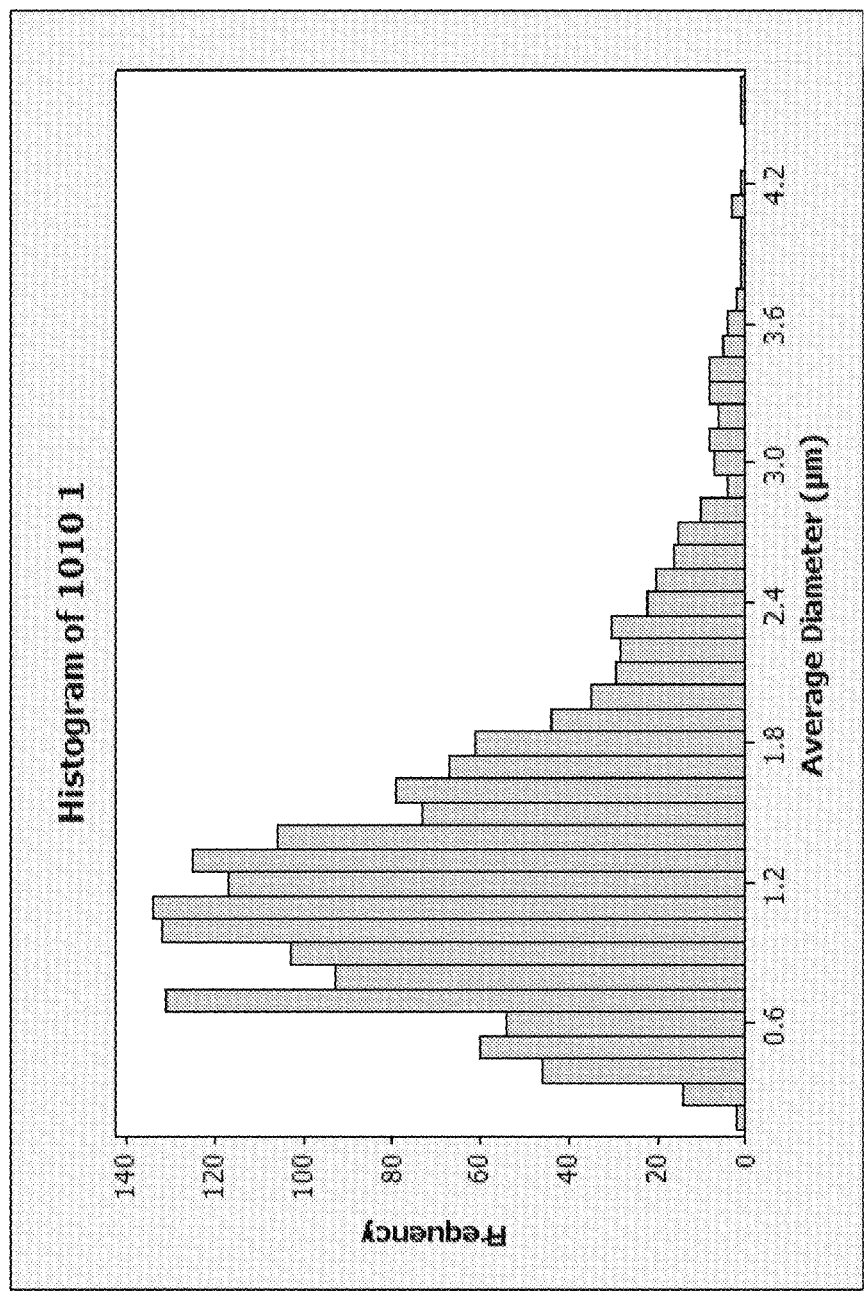
FIG. 6B is a graph of fiber count to fiber diameter of ULTEM 1010 fiber-based structures.

FIG. 6A is a representation of a morphology of ULTEM 1010 fibers made by dissolving ULTEM 1010 in CHCL3 at about 15 wt %, where the solution was injected into the system at about room temperature, and the anti-solvent was made from about 60% Glycerol, about 25% Ethanol and about 15% water. The instrument used to generate the samples was a Xanofi Xanoshear® spinning system. FIG. 6B is a graph of fiber count to fiber diameter of the sample shown in FIG. 6A.

Figure 7A:
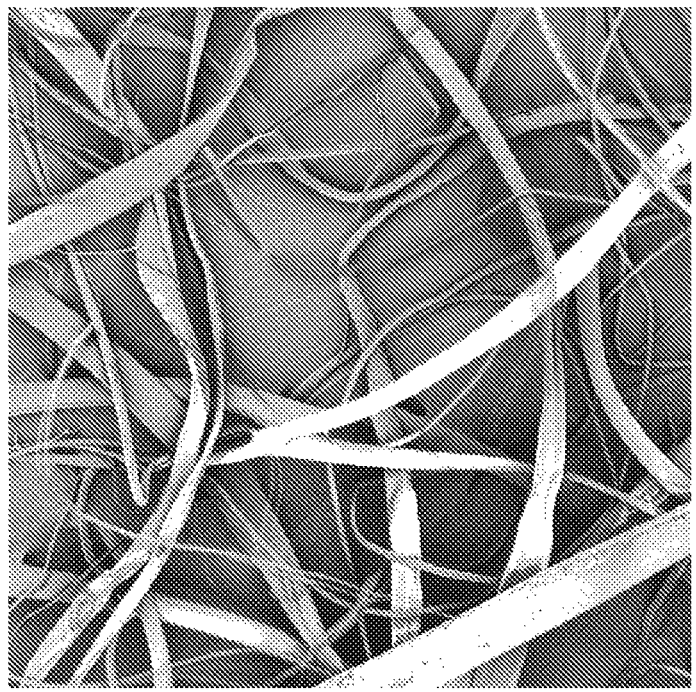
FIG. 7A is a representation of a morphology of ULTEM 1010 fiber-based structures.
Figure 7B:
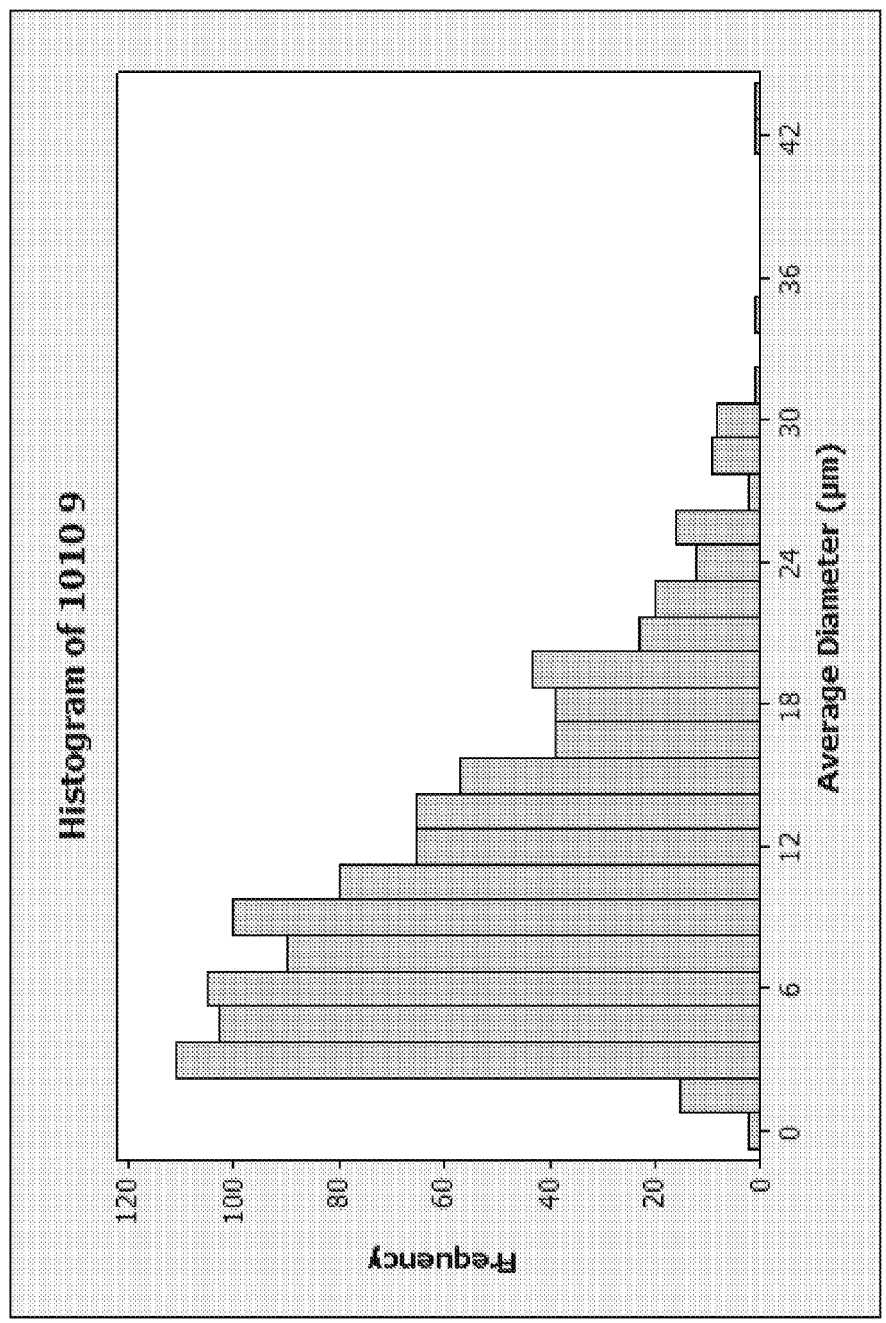
FIG. 7B is a graph of fiber count to fiber diameter of ULTEM 1010 fiber-based structures.

FIG. 7A is a representation of a morphology of ULTEM 1010 fibers made by dissolving ULTEM 1010 in CHCL3 at about 25 wt %, where the solution was injected into the system at room temperature, and the anti-solvent was made from about 60% Glycerol, about 25% Ethanol and about 15% water. The instrument used to generate the samples was a Xanofi Xanoshear® spinning system. FIG. 7B is a graph of fiber count to fiber diameter of the sample shown in FIG. 7A.

Figure 8C:
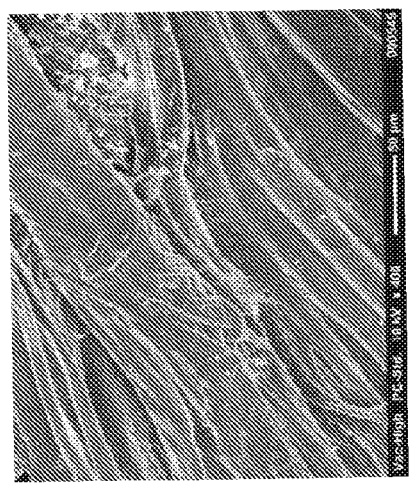
FIG. 8C is a representation of a morphology of ULTEM CRS 5001K.
Figure 8B:
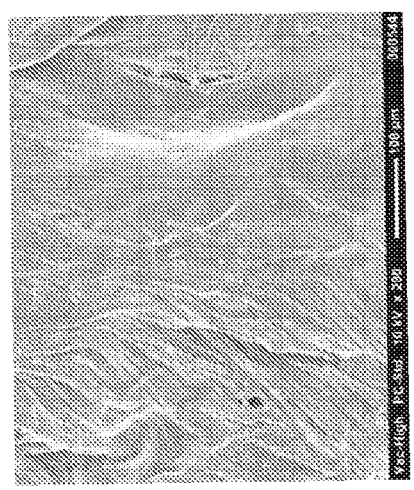
FIG. 8B is a representation of a morphology of ULTEM CRS 5001K.
Figure 8A:
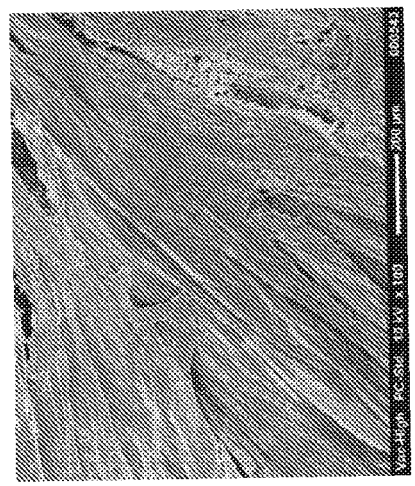
FIG. 8A is a representation of a morphology of ULTEM CRS 5001K.

FIGS. 8A, 8B, and 8C are representations of the morphology of fibers made of a solution comprising ULTEM CRS 5001K in anti-solvent prepared according to the following procedure. ULTEM CRS5001K pellets were dissolved in NMP at about 12 wt % and at about 205° C. The instrument used to generate the samples was a Xanofi Xanoshear® spinning system. The solution was injected into the system at elevated temperature (e.g., prior to cooling to room temperature), and the anti-solvent was made from about 30% NMP, 49% Glycerol, about 14% Ethanol and about 7% Water.

Figure 9C:
FIG. 9C is a representation of a morphology of ULTEM CRS 5001K.
Figure 9B:
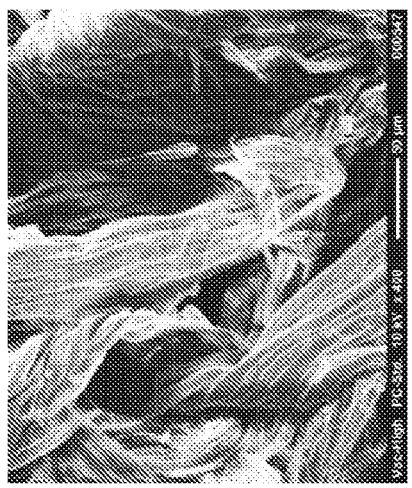
FIG. 9B is a representation of a morphology of ULTEM CRS 5001K.
Figure 9A:
FIG. 9A is a representation of a morphology of ULTEM CRS 5001K.

FIGS. 9A, 9B, and 9C are representations of the morphology of fibers made of a solution comprising ULTEM CRS 5001K in anti-solvent prepared according to the following procedure. ULTEM CRS 5001K pellets were dissolved in NMP at about 12 wt % and at about 205° C. The instrument used to generate the samples was a Xanofi Xanoshear® spinning system. The solution was injected into the system at elevated temperature, and the anti-solvent was made from about 50% NMP, 35% Glycerol, about 10% Ethanol and about 5% Water.

Figure 10C:
FIG. 10C is a representation of a morphology of ULTEM CRS 5001K.
Figure 10B:
FIG. 10B is a representation of a morphology of ULTEM CRS 5001K.
Figure 10A:
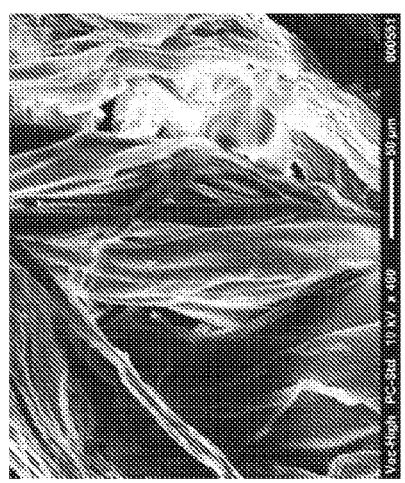
FIG. 10A is a representation of a morphology of ULTEM CRS 5001K.

FIGS. 10A, 10B, and 10C are representations of the morphology of fibers made of a solution comprising ULTEM CRS 5001K in anti-solvent prepared according to the following procedure. ULTEM CRS 5001K pellets were dissolved in NMP at about 12 wt % and at about 205° C. The instrument used to generate the samples was a Xanofi Xanoshear® spinning system. The solution was injected into the system at elevated temperature, and the anti-solvent was made from about 70% NMP, 21% Glycerol, about 6% Ethanol and about 3% Water.

Figure 11C:
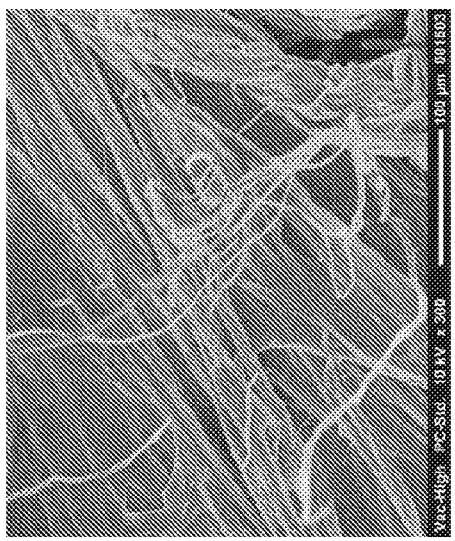
FIG. 11C is a representation of a morphology of ULTEM CRS 5001K.
Figure 11B:
FIG. 11B is a representation of a morphology of ULTEM CRS 5001K.
Figure 11A:
FIG. 11A is a representation of a morphology of ULTEM CRS 5001K.

FIG. 11A is a representation of a morphology of fibers made of a solution comprising about 12% ULTEM CRS 5001K in anti-solvent prepared according to the following procedure. ULTEM CRS 5001K pellets were dissolved in NMP at about 12 wt % and at about 205° C. The instrument used to generate the samples was a Xanofi Xanoshear® spinning system. The solution was injected into the system at elevated temperature, and the anti-solvent was made from about 70% NMP, 14% Glycerol, about 10% Ethanol and about 6% Water.

FIGS. 11B and 11C are representations of the morphology of fibers made of a solution comprising about 12% ULTEM CRS 5001K in anti-solvent prepared according to the following procedure. ULTEM CRS 5001K pellets were dissolved in NMP at about 12 wt % and at about 205° C. The instrument used to generate the samples was a Xanofi Xanoshear® spinning system. The solution was injected into the system at elevated temperature, and the anti-solvent was made from about 85% NMP, 7% Glycerol, about 5% Ethanol and about 3% Water.

Figure 12A:
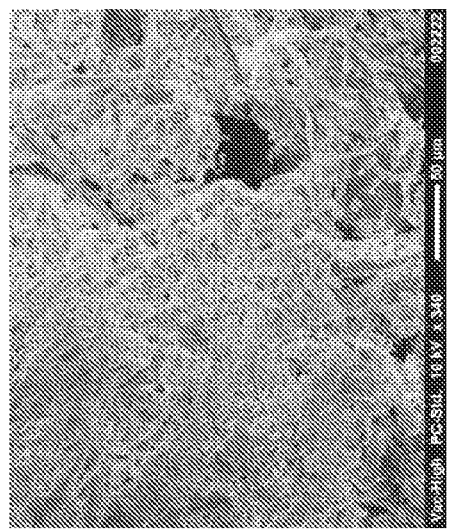
FIG. 12A is a representation of a morphology of ULTEM CRS 5001K.

FIG. 12A is a representation of a morphology of fibers made of a solution comprising about 12% ULTEM CRS 5001K in anti-solvent prepared according to the following procedure. ULTEM CRS 5001K powder was dissolved in NMP at about 12 wt % and at about 205° C. The instrument used to generate the samples was a Xanofi Xanoshear® spinning system. The solution was injected into the system at elevated temperature, and the anti-solvent was made from about 80% NMP, 17% Glycerol, about 2% Ethanol and about 1% Water.

Figure 12B:
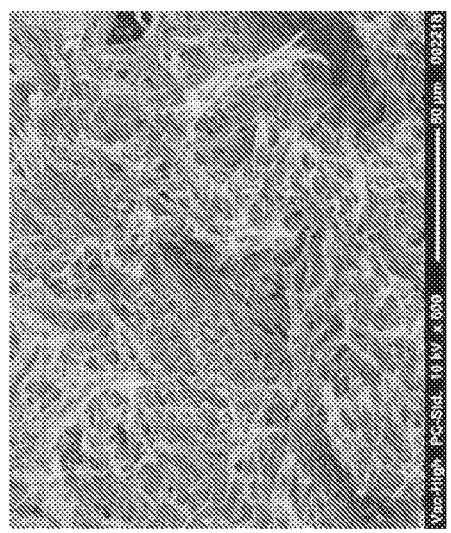
FIG. 12B is a representation of a morphology of ULTEM CRS 5001K.

FIG. 12B is a representation of a morphology of fibers made of a solution comprising about 12% ULTEM CRS 5001K in anti-solvent prepared according to the following procedure. ULTEM CRS 5001K powder was dissolved in NMP at about 12 wt % and at about 205° C. The instrument used to generate the samples was a Xanofi Xanoshear® spinning system. The solution was injected into the system at elevated temperature, and the anti-solvent was made from about 80% NMP, 17% Glycerol, about 1% Ethanol and about 2% Water.

Figure 12C:
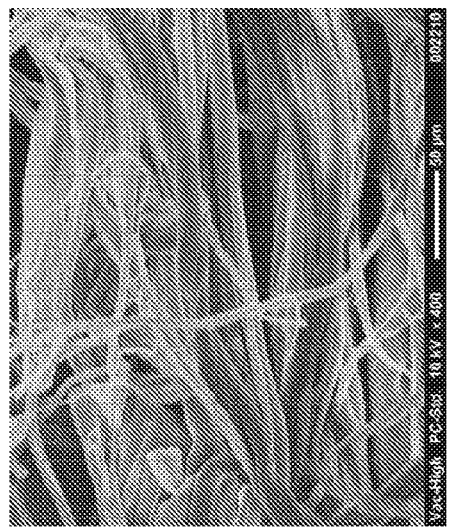
FIG. 12C is a representation of a morphology of ULTEM CRS 5001K.

FIG. 12C is a representation of a morphology of fibers of a solution comprising about 12% ULTEM CRS 5001K in anti-solvent prepared according to the following procedure. ULTEM CRS 5001K powder was dissolved in NMP at about 12 wt % and at about 205° C. The instrument used to generate the samples was a Xanofi Xanoshear® spinning system. The solution was injected into the system at elevated temperature, and the anti-solvent was made from about 80% NMP, 15% Glycerol, about 3% Ethanol and about 2% Water.

Figure 12D:
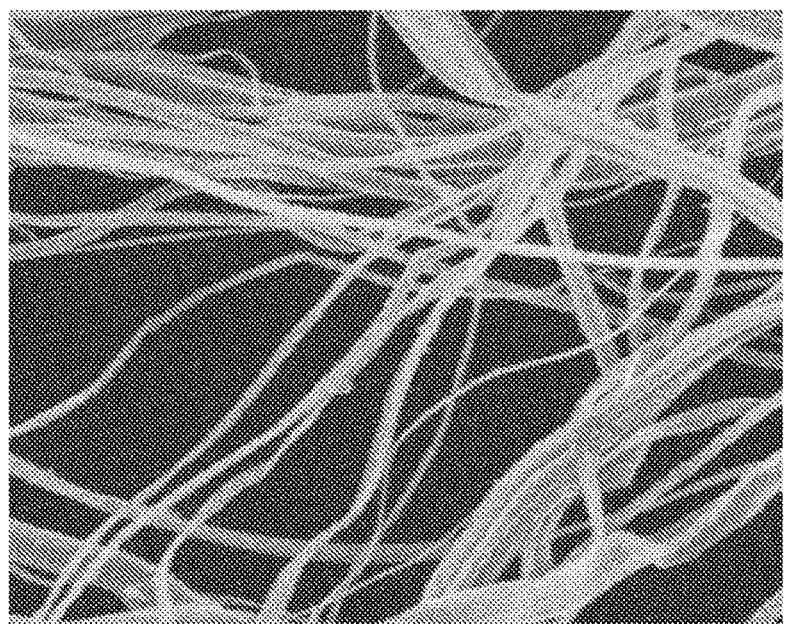
FIG. 12D is a representation of a morphology of ULTEM CRS 5001K fiber-based structures.
Figure 12E:
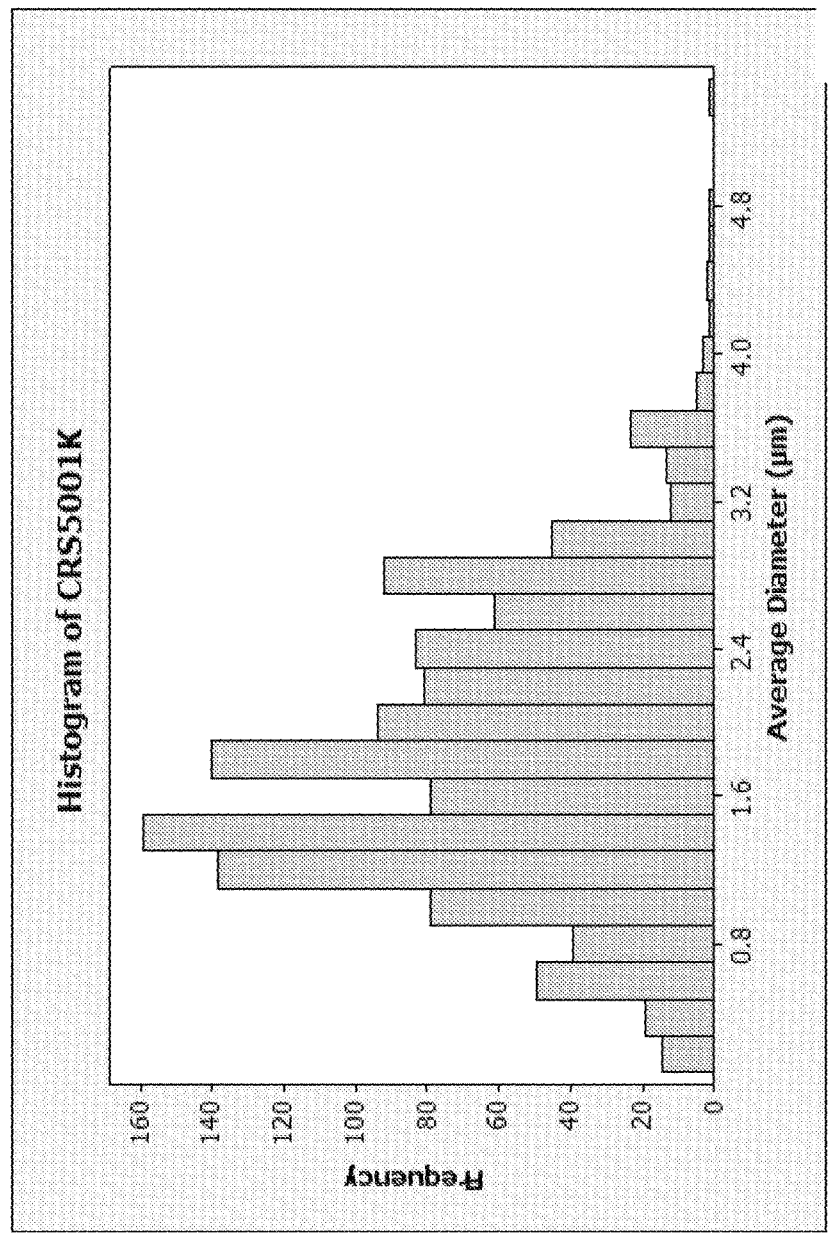
FIG. 12E is a graph of fiber count to fiber diameter of ULTEM CRS 5001K fiber-based structures.

FIG. 12D is a representation of the morphology of fibers made of a solution comprising about 12% ULTEM CRS 5001K in anti-solvent prepared according to the following procedure. ULTEM CRS 5001K powder was dissolved in NMP at about 12 wt % and at about 205° C. The instrument used to generate the samples was a Xanofi Xanoshear® spinning system. The solution was injected into the system at elevated temperature, and the anti-solvent was made from about 85% NMP, 7% Glycerol, about 5% Ethanol and about 3% Water. FIG. 12E is a graph of fiber count to fiber diameter of the sample shown in FIG. 12D.

Force Spinning

In an aspect, a force-spinning method (e.g., using the equipment as described in U.S. Pat. Appl. Nos. 2009/0280207, 2009/0232920, 2009/0269429, and 2009/0280325, i.e., using a rotating spinneret to spin fine fibers via a centrifugal force) is a particularly suitable method to prepare fine or ultra-fine fibers based on high temperature polymers at high throughputs, which can be used for e.g., HTMI separators. These porous separators are particularly useful in electrolytical energy storage devices, such as lithium-ion, lithium-sulfur and electrolytic double-layer capacitors.

Table A illustrates exemplary results of fiber spinning a polymer solution comprising ULTEM 1000 (SABIC) dissolved in NMP. Table A illustrates spinneret speeds (e.g 12,000 revolutions per minute (RPM) (12K)) for specific orifice diameters and wt. % of the polymer (e.g., ULTEM 1000) in the total weight solution. Table A shows the ranges of spinneret speeds for the different polymer concentrations and orifice diameters at which fibers were successfully formed.

TABLE A

| ULTEM 1000 (SABIC) dissolved in N-Methyl-2-pyrrolidone (NMP) | | | |
|---|---|---|---|
| Orifice Diameter | 25 wt. % | 30 wt. % | 35 wt. % |
| 14 G (1600 µm) | | | 6K-2K |
| 16 G (1194 µm) | | 12K-2K | 6K-2K |
| 20 G (603 µm) | 12K-4K | 12K-4K | 12K-4K |
| 23 G (337 µm) | 12K-4K | | |
| 27 G (210 µm) | 12K-8K | 12K-6K | 12K-8K |
| 30 G (159 µm) | 12K-8K | 12K-8K | |

Example A1

Figure 13A:
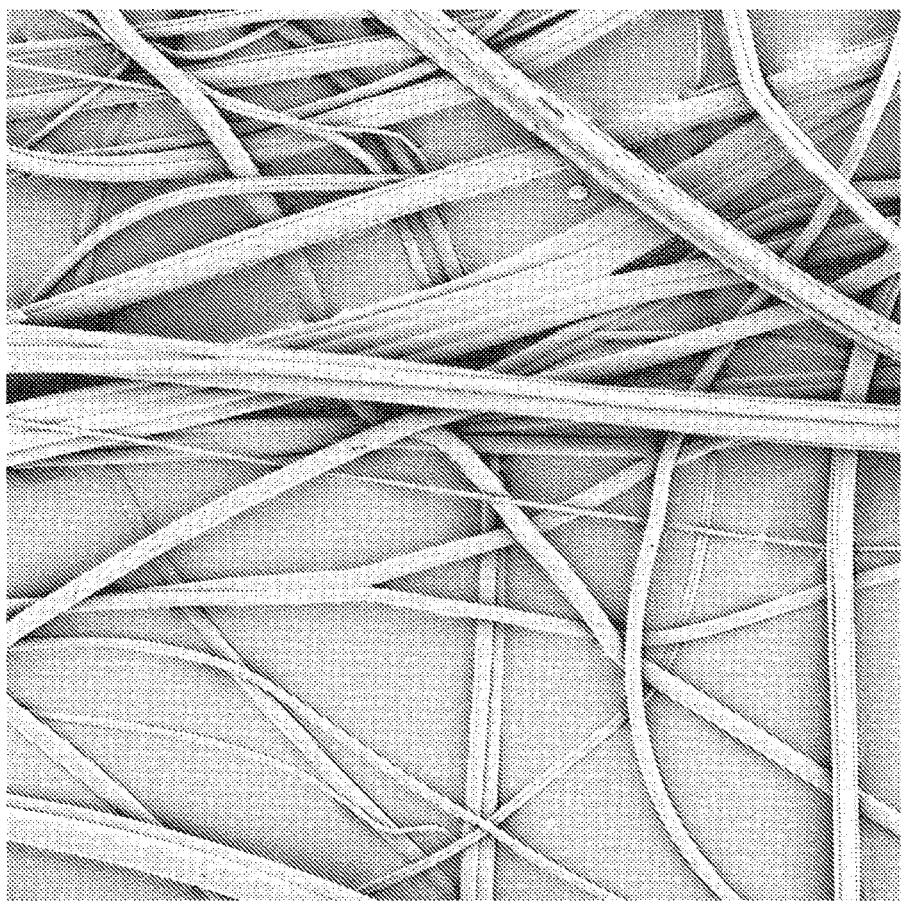
FIG. 13A is a representation of a morphology of ULTEM 1000 fiber-based structures.
Figure 13B:
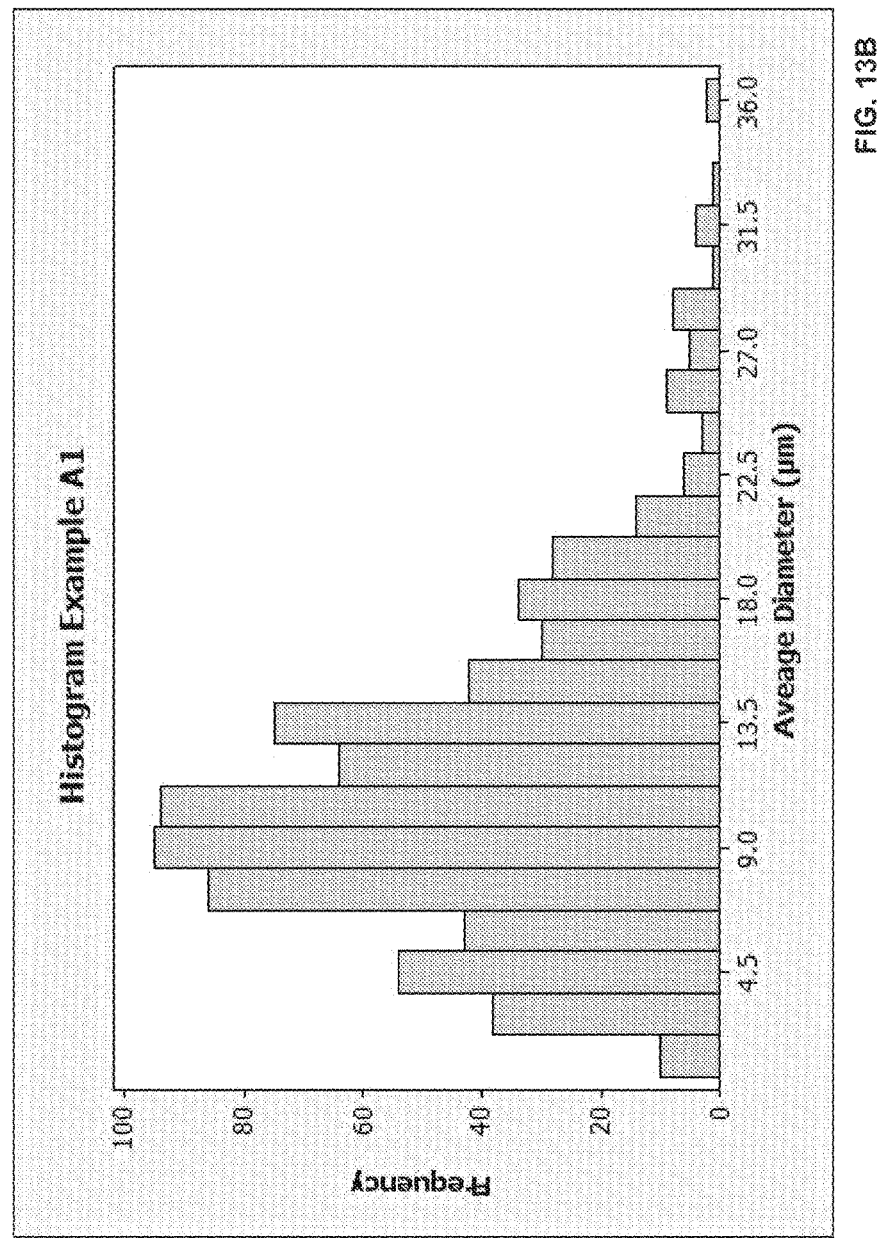
FIG. 13B is a graph of fiber count to fiber diameter of ULTEM 1000 fiber-based structures.

As an example, a solution comprising of about 35 wt. % ULTEM 1000 dissolved in NMP, with a solution viscosity of about 295,000 centipoise (cP), was spun through an orifice diameter of 1,600 µm (14 G) at a spinneret speed of 2,000 RPM. This example resulted in fiber diameters between about 1.24 µm and about 35.3 µm, with an average diameter of about 11.4 µm. FIG. 13A illustrates a representation of the example's fiber morphology. FIG. 13B illustrates a histogram of the fiber diameter distribution.

Solution viscosities were tested using a Brookfield Engineering viscometer at solution temperatures of about 24° C.

Example A2

Figure 14A:
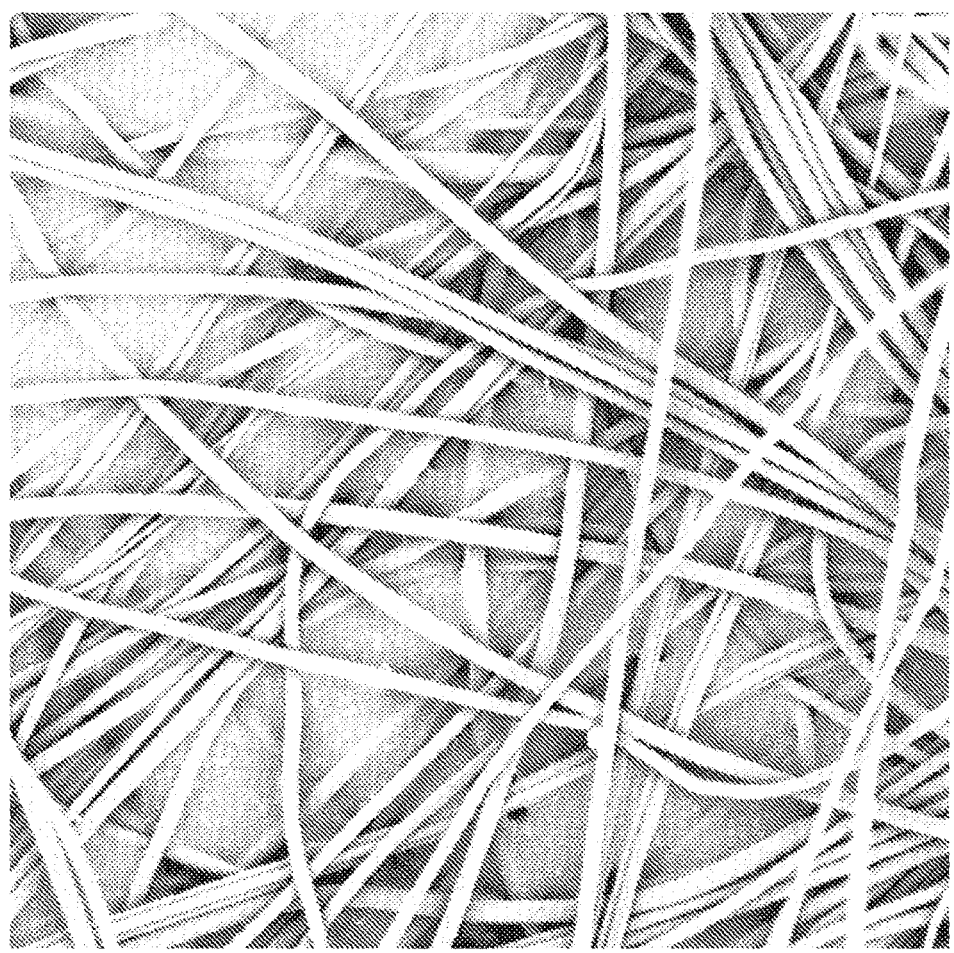
FIG. 14A is a representation of a morphology of ULTEM 1000 fiber-based structures.
Figure 14B:
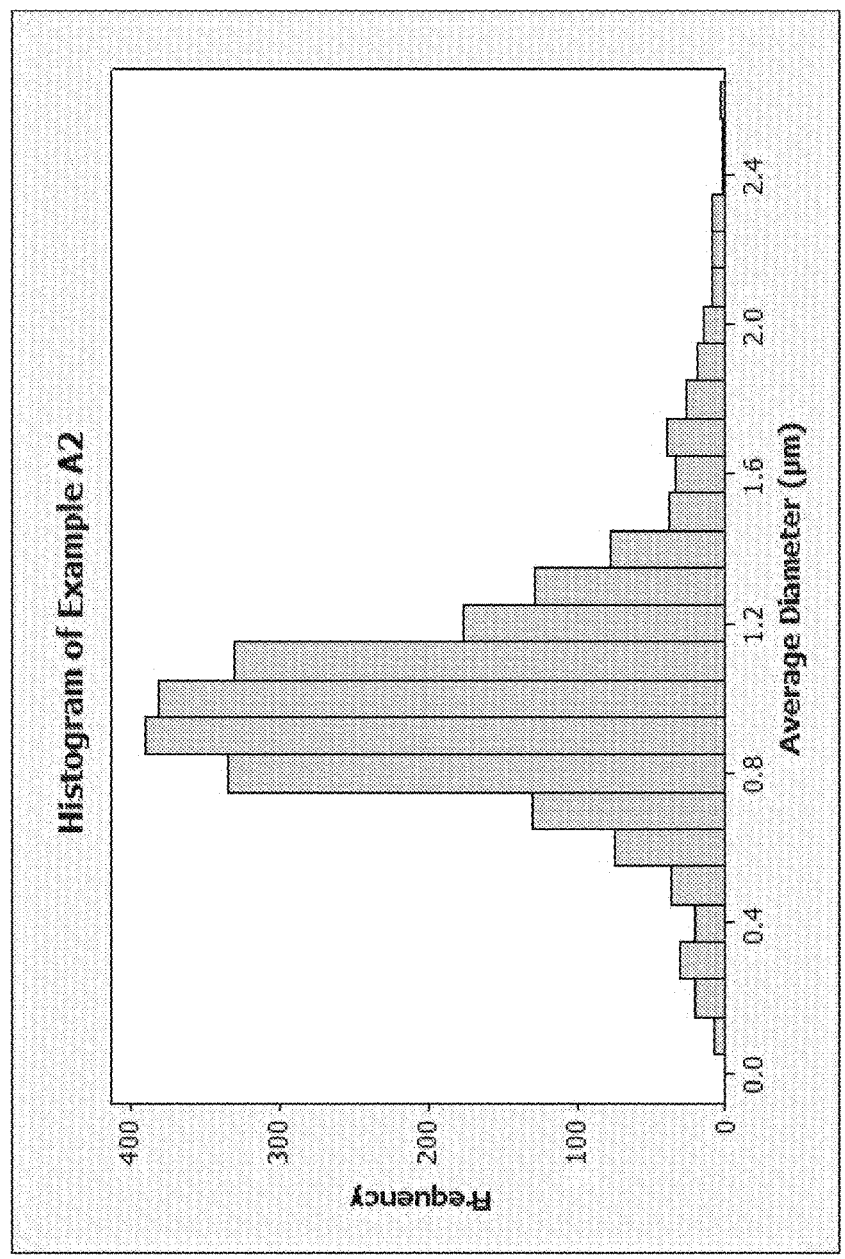
FIG. 14B is a graph of fiber count to fiber diameter of ULTEM 1000 fiber-based structures.

As a further example, a solution comprising of about 25 wt. % ULTEM 1000 dissolved in NMP, with a solution viscosity of about 10,000 cP, was spun through an orifice diameter of 159 µm (30 G) at a spinneret speed of 12,000 RPM. This example resulted in fiber diameters between about 50.0 nm and about 2.62 µm, with an average fiber diameter of about 1.02 µm. FIG. 14A illustrates a representation of the example's fiber morphology. FIG. 14B illustrates a histogram of the fiber diameter distribution.

Table B illustrates exemplary results of fiber spinning a polymer solution comprising ULTEM 1010 (SABIC) dissolved in NMP. In particular, Table B illustrates spinneret speeds (e.g 12,000 revolutions per minute (RPM) (12K)) for specific orifice diameters and wt. % of the polymer (e.g., ULTEM 1000) in the total weight solution. Table B shows the ranges of spinneret speeds for the different polymer concentrations and orifice diameters at which fibers were successfully formed.

TABLE B

| ULTEM 1010 (SABIC) dissolved in N-Methyl-2-pyrrolidone (NMP) | | | |
| --- | --- | --- | --- |
| Orifice Diameter | 25 wt. % | 30 wt. % | 35 wt. % |
| 14 G (1600 μm) | | | 4K-2K |
| 16 G (1194 μm) | | | 4K-2K |
| 20 G (603 μm) | 12K-2K | 6K-2K | 8K-4K |
| 23 G (337 μm) | 12K-4K | 8K-2K | 12K-10K |
| 27 G (210 μm) | 12K-6K | | |
| 30 G (159 μm) | 12K-8K | 10K-2K | |

Example B1

Figure 15A:
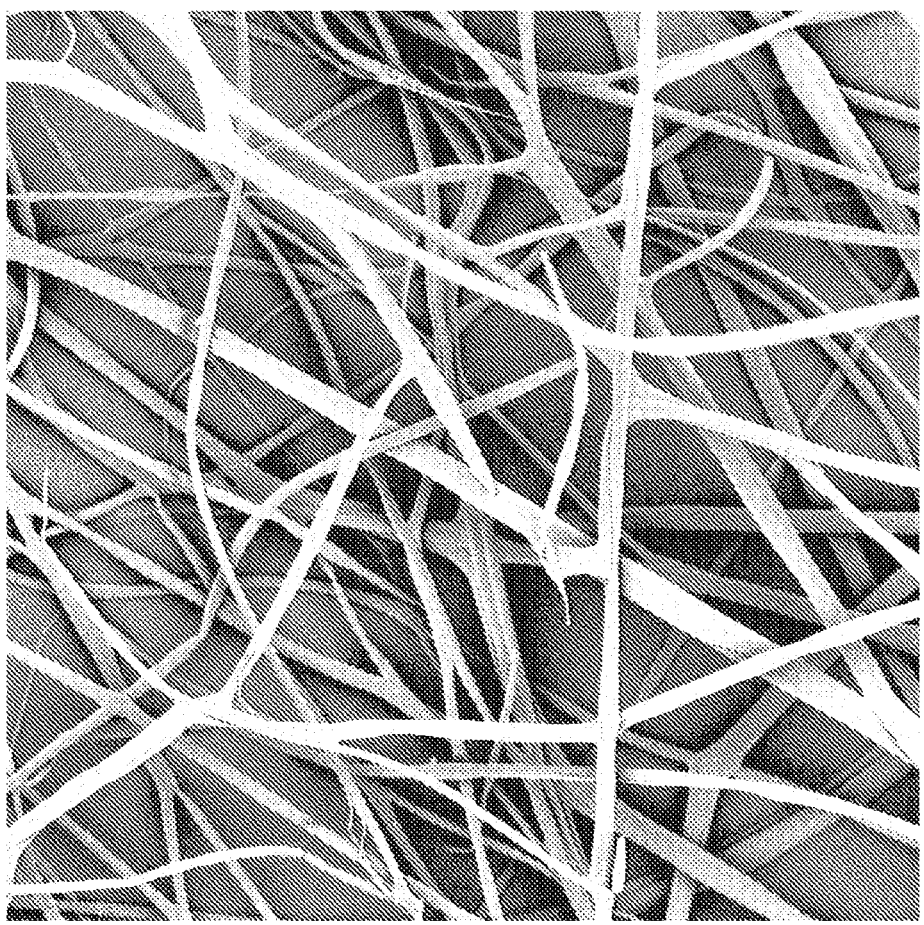
FIG. 15A is a representation of a morphology of ULTEM 1010 fiber-based structures.
Figure 15B:
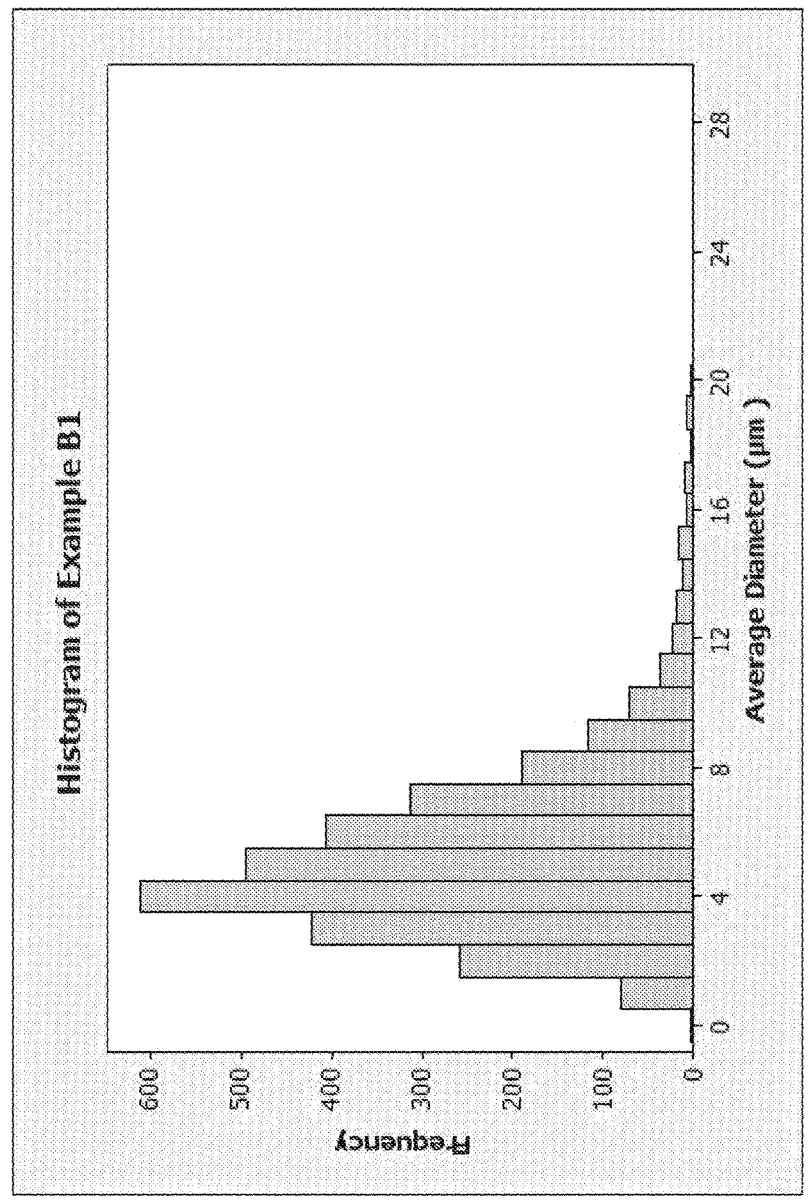
FIG. 15B is a graph of fiber count to fiber diameter of ULTEM 1010 fiber-based structures.

As an example a solution comprised of about 35 wt. % ULTEM 1010 dissolved in NMP, with a solution viscosity of about 190,000 cP, was spun through an orifice diameter of 603 μm (20 G) at a spinneret speed of 8,000 RPM. This example resulted in fiber diameters between about 410 nm and about 28.8 μm, with an average of about 5.35 μm. FIG. 15A illustrates a representation of the example's fiber morphology. FIG. 15B illustrates a histogram of the fiber diameter distribution.

Example B2

Figure 16A:
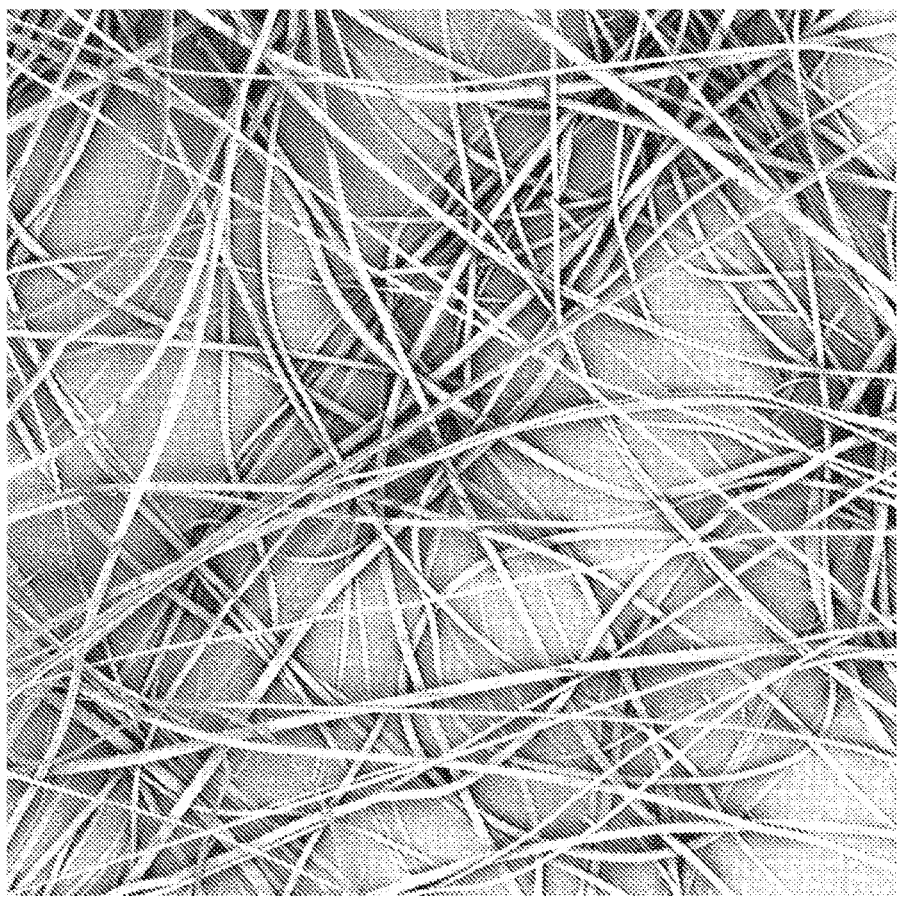
FIG. 16A is a representation of a morphology of ULTEM 1010 fiber-based structures.
Figure 16B:
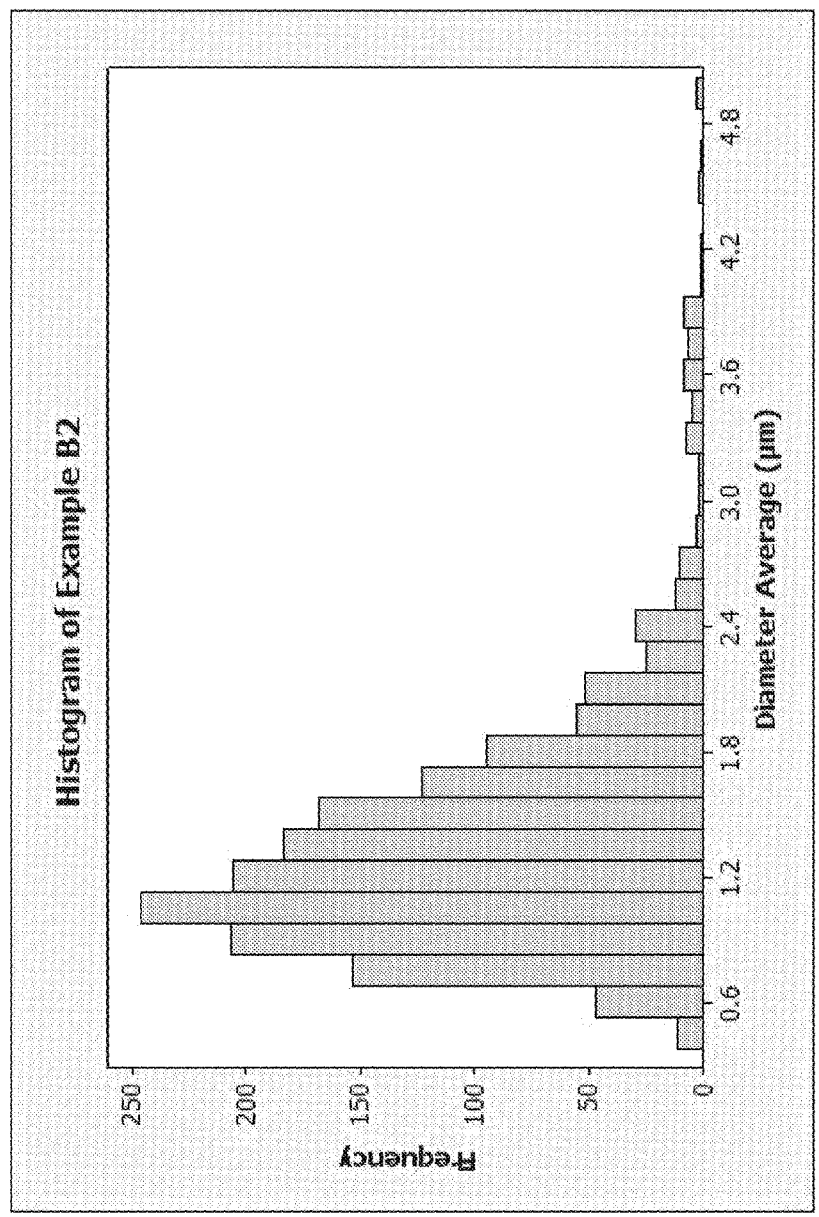
FIG. 16B is a graph of fiber count to fiber diameter of ULTEM 1010 fiber-based structures.

As a further example, a solution comprised of about 25 wt. % ULTEM 1010 dissolved in NMP, with a solution viscosity of about 6,200 cP was spun through an orifice diameter of 159 μm (30 G) at a spinneret speed of 12,000 RPM. This example resulted in fiber diameters between about 379 nm and about 4.95 μm, with an average diameter of about 1.37 μm. FIG. 16A illustrates a representation of the example's fiber morphology. FIG. 16B illustrates a histogram of the fiber diameter distribution.

Table C illustrates exemplary results of fiber spinning a polymer solution comprising PPO 6130 (Polyphenylene oxide (SABIC)) dissolved in chloroform. In particular, Table C illustrates spinneret speeds (e.g 4,000 revolutions per minute (RPM) (4K)) for specific orifice diameters and wt. % of the polymer (e.g., PPO 6130) in the total weight solution. Table C shows the ranges of spinneret speeds for the different polymer concentrations and orifice diameters at which fibers were successfully formed.

TABLE C

| PPO 6130 (Polyphenylene oxide) dissolved in chloroform | | | | |
| --- | --- | --- | --- | --- |
| Orifice Diameter | 2.5 wt. % | 5 wt. % | 8 wt. % | 10 wt. % |
| 23 G (337 μm) | 12K-6K | 12K-2K | 12K-10K | 12K |
| 27 G (210 μm) | 12K-2K | 12K-2K | 12K-4K | |
| 30 G (159 μm) | 12K-2K | 12K-2K | 12K-4K | |

Example C1

Figure 17A:
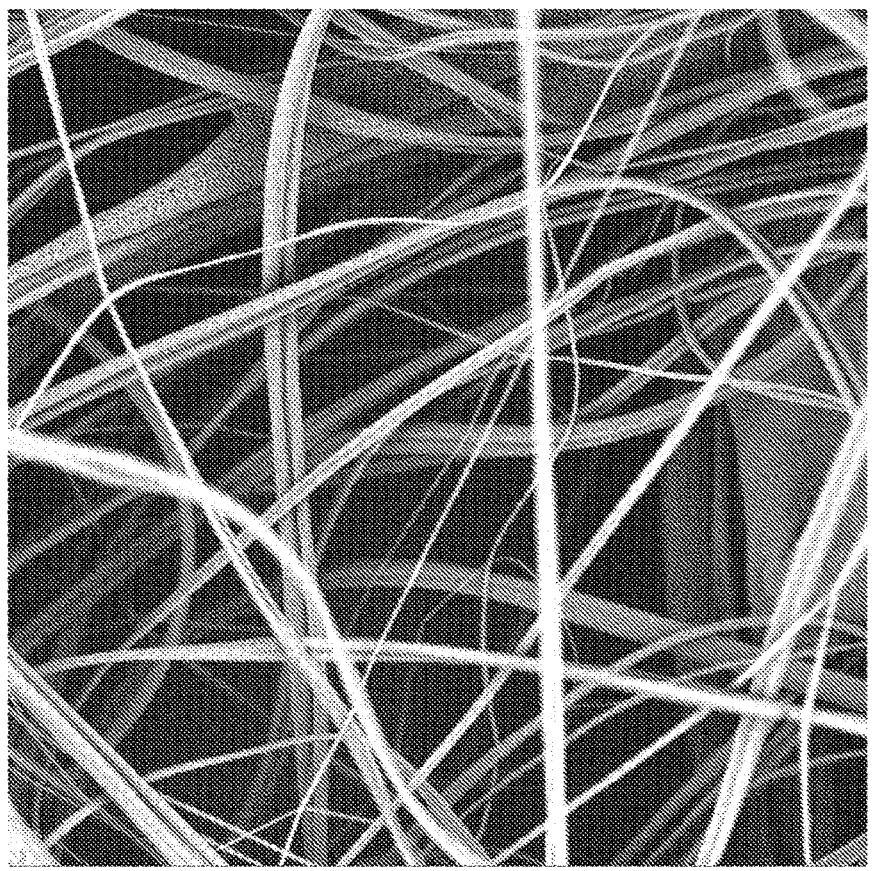
FIG. 17A is a representation of a morphology of PPO 6130 fiber-based structures.
Figure 17B:
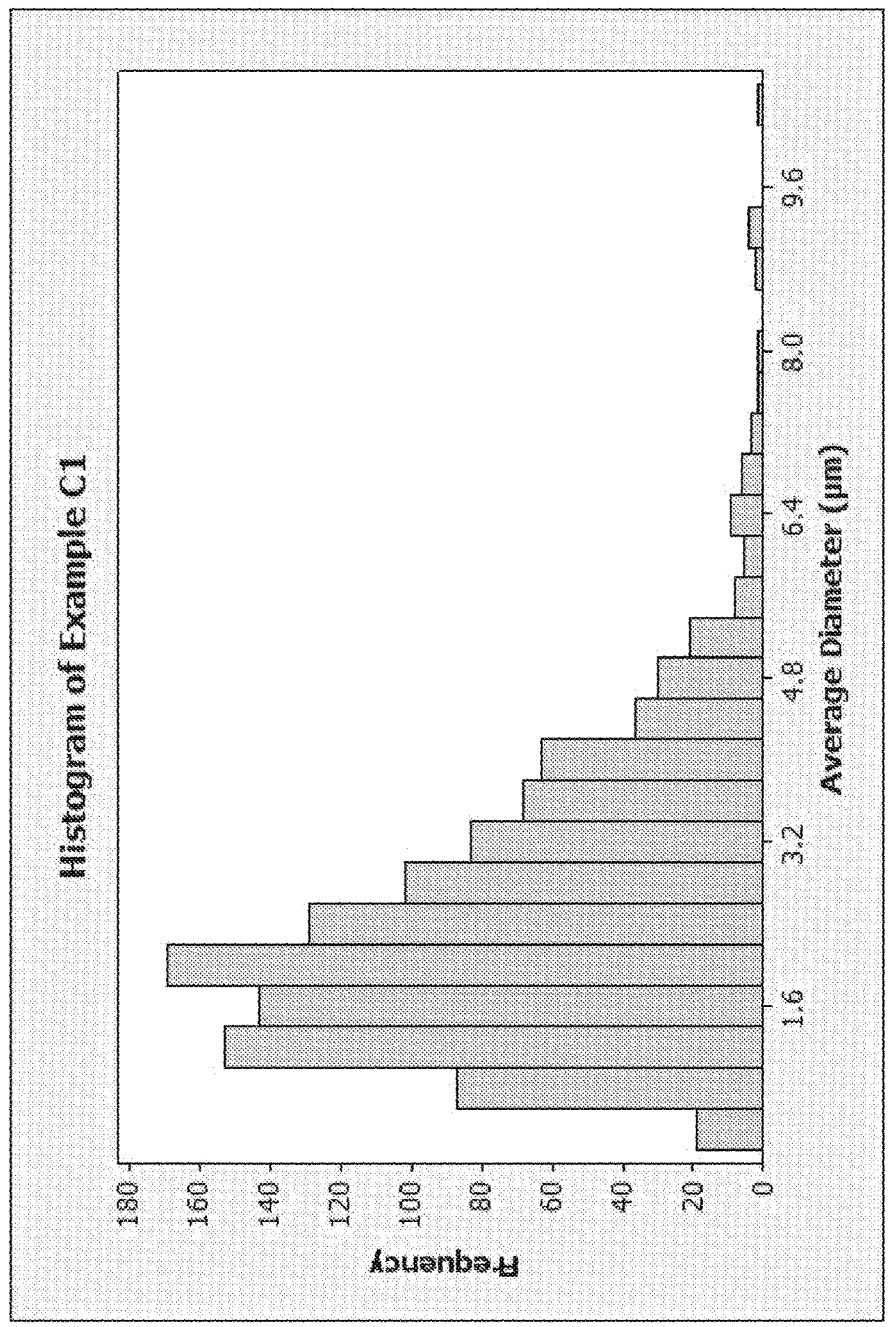
FIG. 17B is a graph of fiber count to fiber diameter of PPO 6130 fiber-based structures.

As an example, a solution comprising about 10 wt. % PPO 6130 dissolved in chloroform, with a solution viscosity of about 2,500 cP was spun through an orifice diameter of 337 μm (23 G) at a spinneret speed of 12,000 RPM. This example resulted in fiber diameter between about 267 nm and about 10.3 μm, with an average diameter of about 2.51 μm. FIG. 17A illustrates a representation of the example's fiber morphology. FIG. 17B illustrates a histogram of the fiber diameter distribution.

Example C2

Figure 18A:
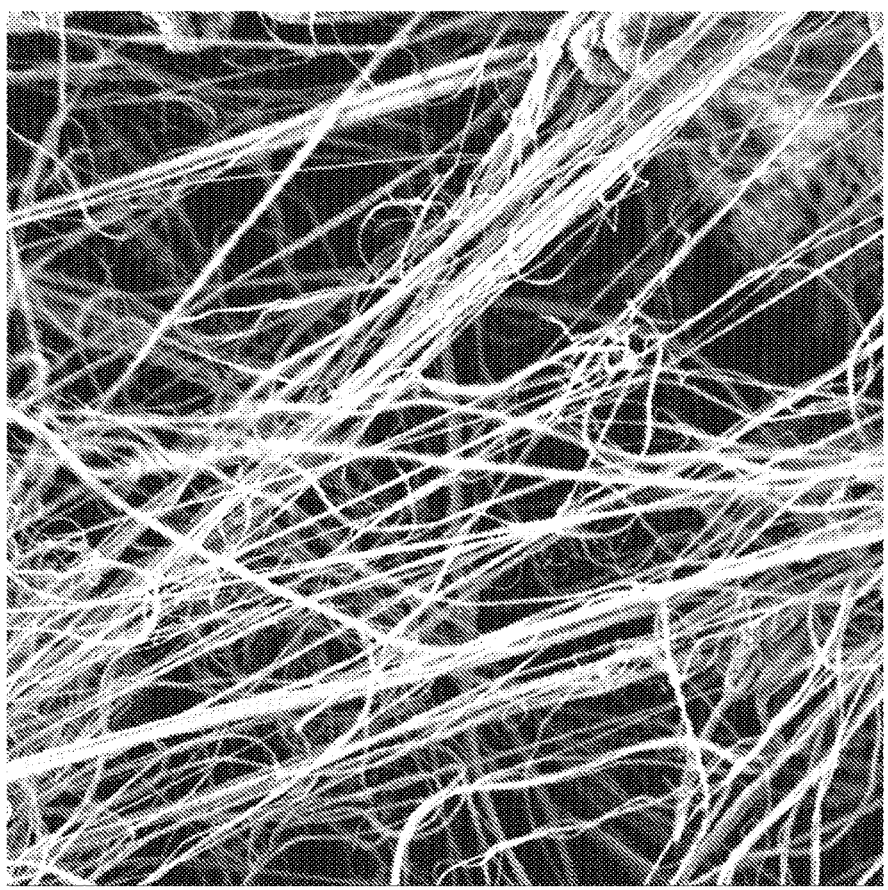
FIG. 18A is a representation of a morphology of PPO 6130 fiber-based structures.
Figure 18B:
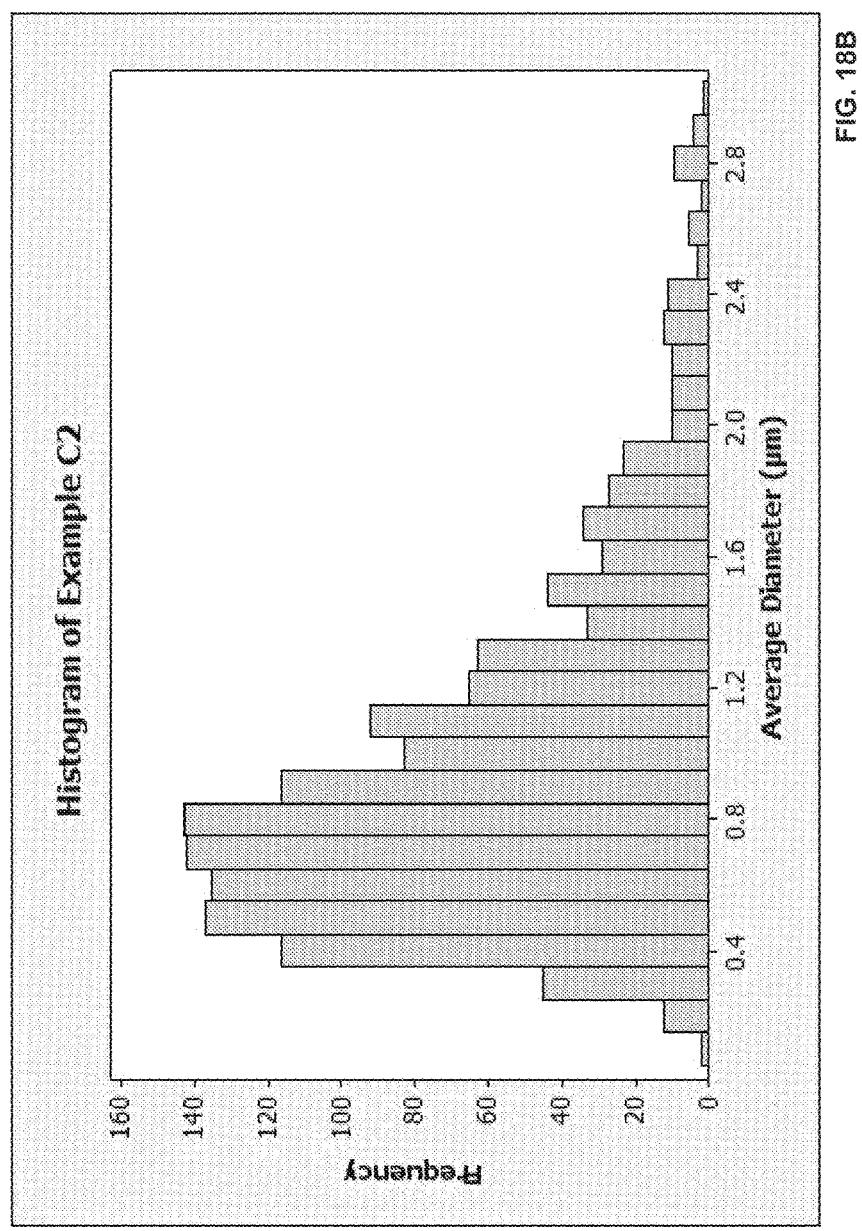
FIG. 18B is a graph of fiber count to fiber diameter of PPO 6130 fiber-based structures.

As a further example, a solution comprising of about 2.5 wt. % dissolved in chloroform, with a solution viscosity of about 14 cP, was spun through an orifice diameter of 210 μm (27 G) at a spinneret speed of 12,000 RPM. This example resulted in fiber diameter between about 63.7 nm and about 2.98 μm, with an average diameter of about 965 nm. FIG. 18A illustrates a representation of the example's fiber morphology. FIG. 18B illustrates a histogram of the fiber diameter distribution.

Table D illustrates exemplary results of fiber spinning a polymer solution comprising PPO 6130 (Polyphenylene oxide) was dissolved in toluene. In particular, Table D illustrates spinneret speeds (e.g 4,000 revolutions per minute (RPM) (4K)) for specific orifice diameters and wt. % of the polymer (e.g., PPO 6130) in the total weight solution.

TABLE D

| PPO 6130 (Polyphenylene oxide) dissolved in toluene | | |
| --- | --- | --- |
| Orifice Diameter | 5 wt. % | 8 wt. % |
| 23 G (337 μm) | 12K-10K | 12K-6K |
| 27 G (210 μm) | 12K-10K | 12K-6K |
| 30 G (159 μm) | 12K-10K | 12K-6K |

Example D1

Figure 19A:
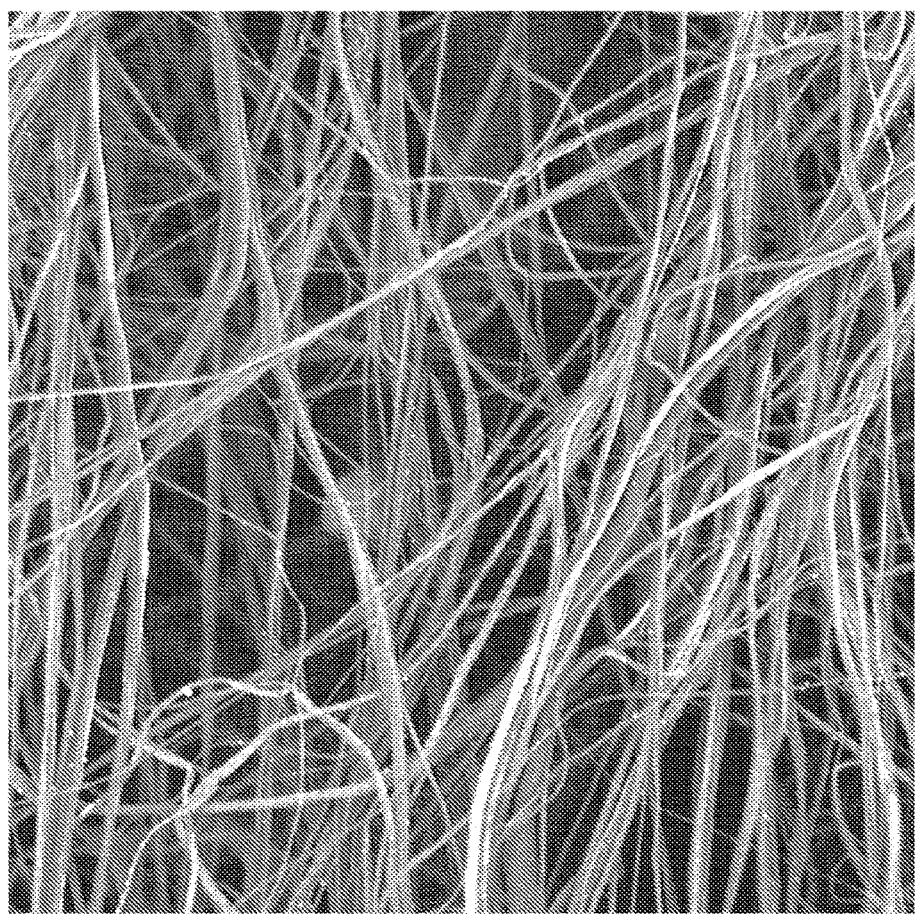
FIG. 19A is a representation of a morphology of PPO 6130 fiber-based structures.
Figure 19B:
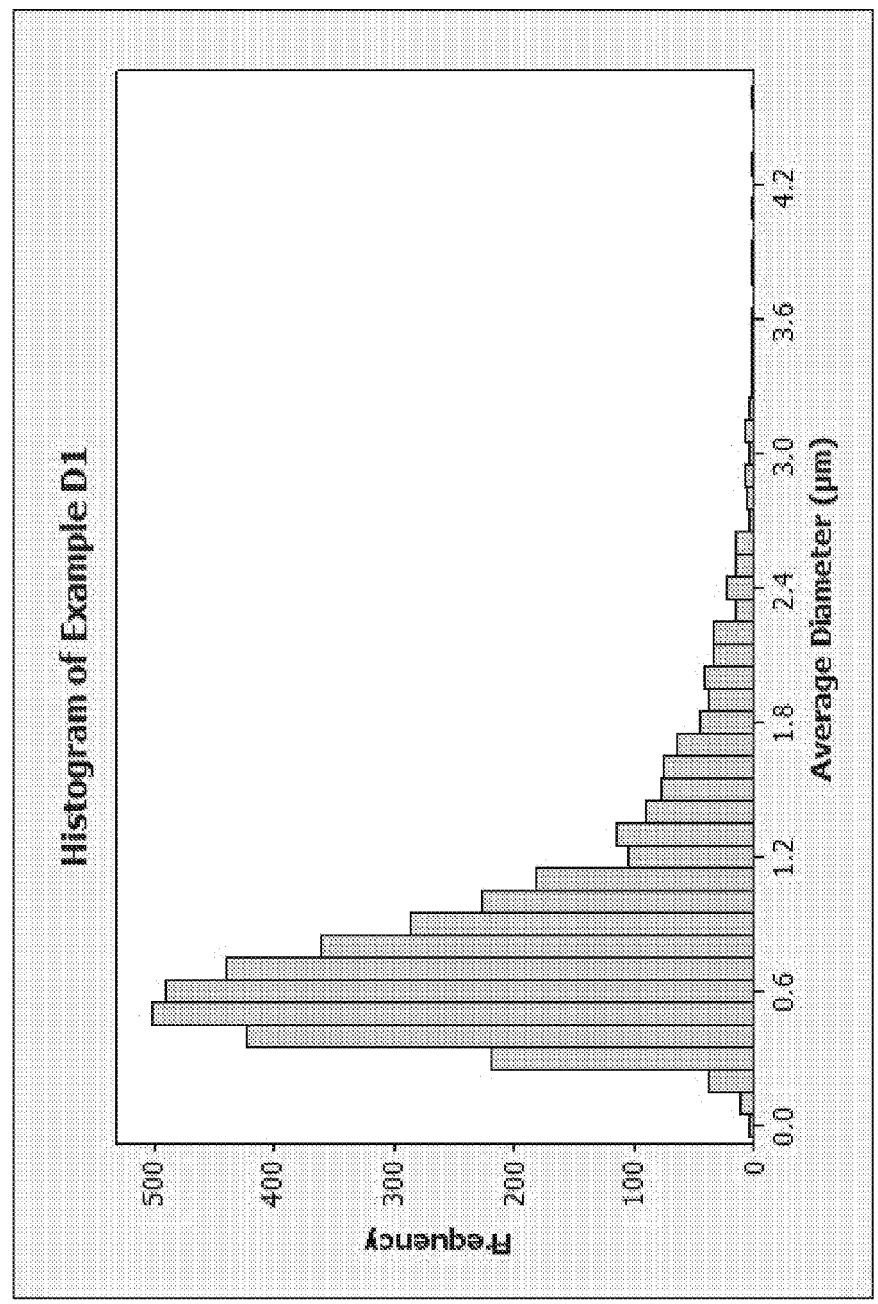
FIG. 19B is a graph of fiber count to fiber diameter of PPO 6130 fiber-based structures.

As an example, a solution comprising about 8 wt. % PPO 6130 dissolved in toluene, with a solution viscosity of about 100 cP was spun through an orifice diameter of 337 μm (23 G) at spinneret speed of 6,000 RPM. The example resulted in fiber diameter between about 50 nm and about 4.62 μm, with an average fiber diameter of about 871 nm. FIG. 19A illustrates representation of the example's fiber morphology. FIG. 19B illustrates a histogram of the fiber diameter distribution.

Table E illustrates exemplary results of fiber spinning a polymer solution comprising PPO 6130 (Polyphenylene oxide) dissolved in solvent system comprising about 50 wt. % toluene and about 50 wt. % chloroform of the total weight of the solvent system. In particular, Table E illustrates spinneret speeds (e.g 2,000 revolutions per minute (RPM) (2K)) for specific orifice diameters and wt. % of the polymer (e.g., PPO 6130) in the total weight solution. Table E shows the ranges of spinneret speeds for the different polymer concentrations and orifice diameters at which fibers were successfully formed.

TABLE E

| | PPO 6130 (Polyphenylene oxide) dissolved in 50% toluene/ 50% chloroform solvent system | | |
|---|---|---|---|
| Orifice Diameter | 5 wt. % | 8 wt. % | 10 wt. % |
| 23 G (337 μm) | 12K-6K | 12K-2K | 12K-2K |
| 27 G (210 μm) | 12K-2K | 12K-2K | 12K-2K |
| 30 G (159 μm) | 12K-6K | 12K-2K | 12K-2K |

Example E1

Figure 20A:
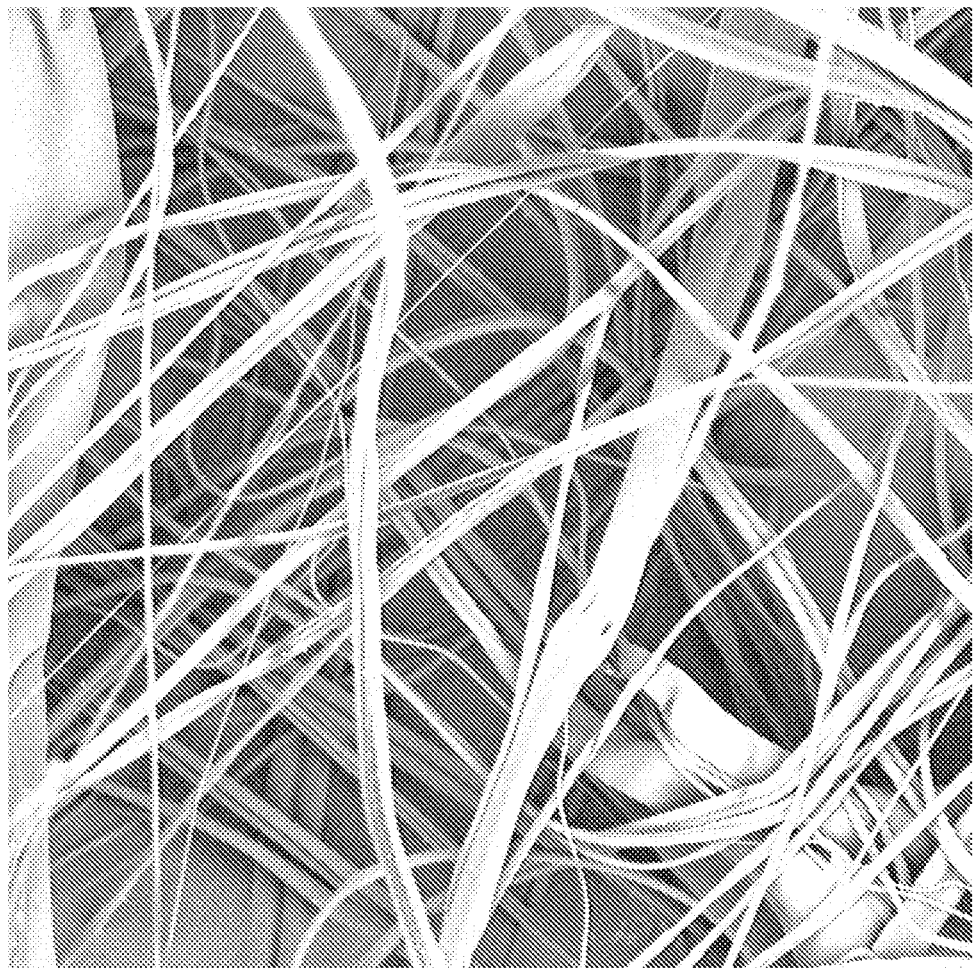
FIG. 20A is a representation of a morphology of PPO 6130 fiber-based structures.
Figure 20B:
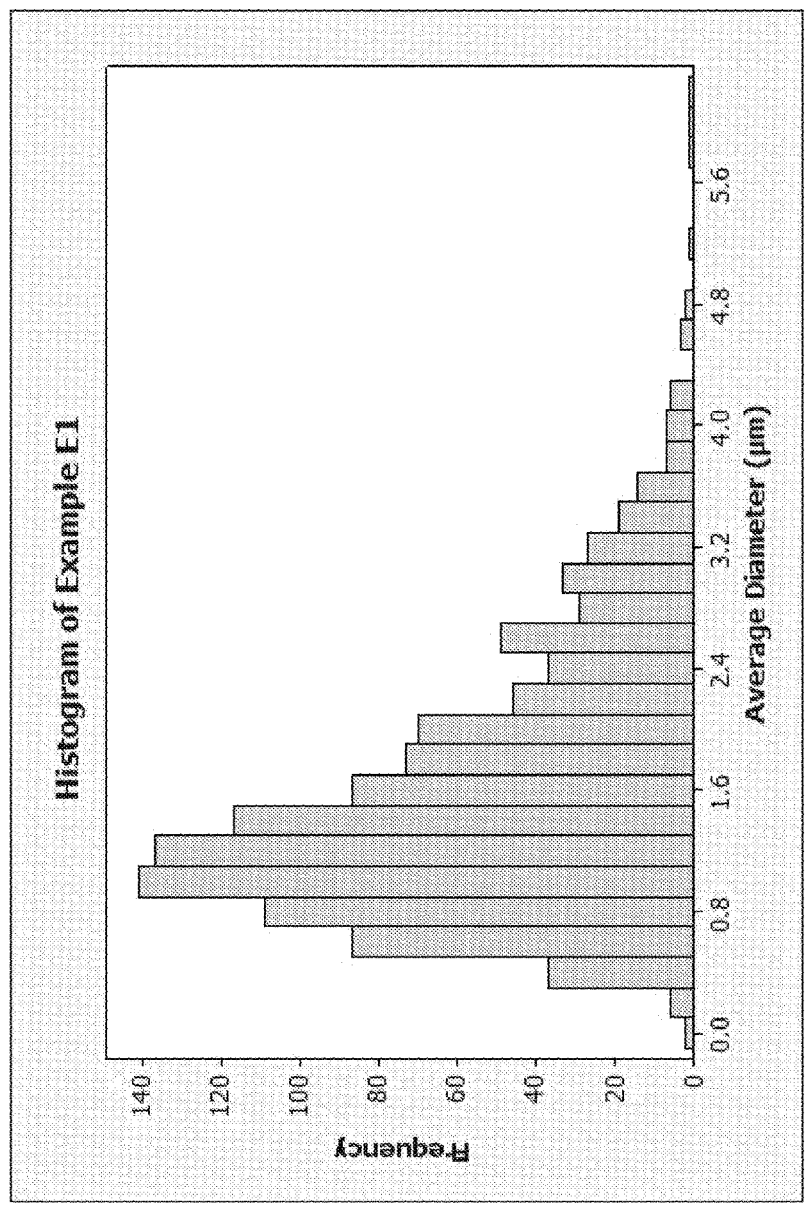
FIG. 20B is a graph of fiber count to fiber diameter of PPO 6130 fiber-based structures.

As an example, a solution comprising of about 8 wt % PPO 6130 dissolved in a solvent system comprising of about 50% toluene and about 50% chloroform of the total weight of the solvent system, with a solution viscosity of about 380 cP, was spun through an orifice diameter of 159 μm (30 G) at a spinneret speed of 12,000 RPM. The example resulted in fiber diameter between about 70.6 nm and about 6.19 μm, with an average fiber diameter of about 1.62 nm. FIG. 20A illustrates representation of the example's fiber morphology. FIG. 20B illustrates a histogram of the fiber diameter distribution.

Table F illustrates exemplary results of fiber spinning a polymer solution comprising PPO 6130 (Polyphenylene oxide) dissolved in solvent system comprising about 70 wt % toluene and about 30 wt % chloroform of the total weight of the solvent system. In particular, Table F illustrates spinneret speeds (e.g 4,000 revolutions per minute (RPM) (4K)) for specific orifice diameters and wt. % of the polymer (e.g., PPO 6130) in the total weight solution. Table F shows the ranges of spinneret speeds for the different polymer concentrations and orifice diameters at which fibers were successfully formed.

TABLE F

| | PPO 6130 (Polyphenylene oxide) dissolved in 70% toluene/ 30% chloroform solvent system | | |
|---|---|---|---|
| Orifice Diameter | 8 wt. % | 10 wt. % | 12 wt. % |
| 30 G (159 μm) | 11K-9K | 11K-9K | 7K |

Example F1

Figure 21A:
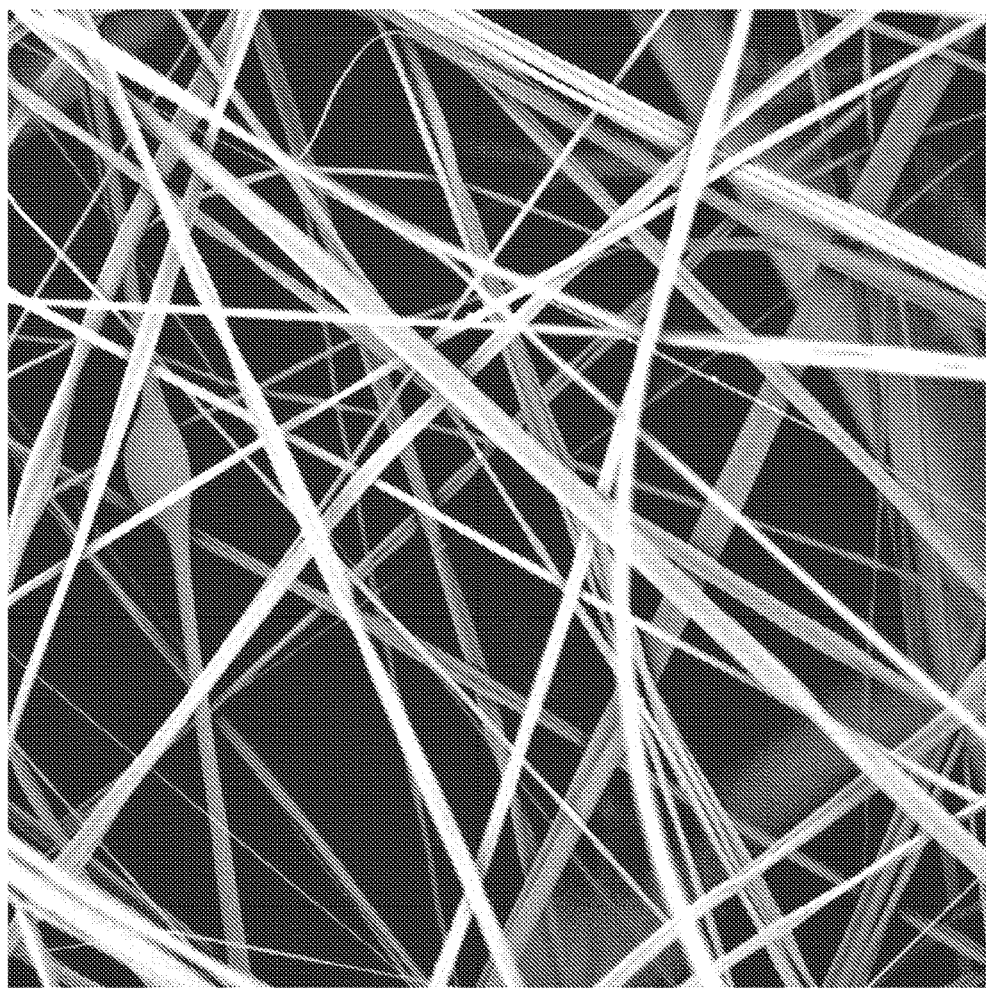
FIG. 21A is a representation of a morphology of PPO 6130 fiber-based structures.
Figure 21B:
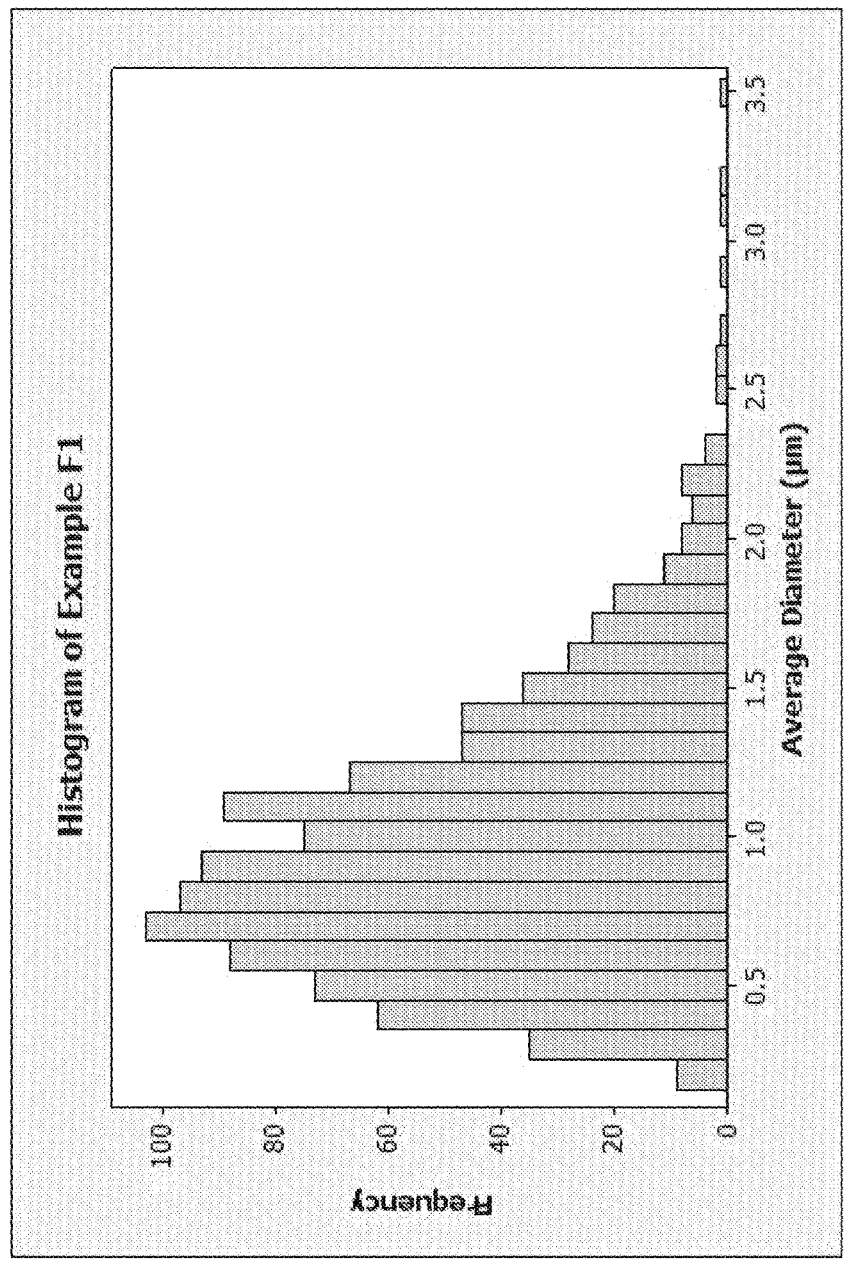
FIG. 21B is a graph of fiber count to fiber diameter of PPO 6130 fiber-based structures.

As an example, a solution comprising of about 8 wt. % PPO 6130 dissolved in a solvent system comprising of about 70% toluene and about 30% chloroform of the total weight of the solvent system, with a solution viscosity of about 200 cP, was spun through an orifice diameter of 159 μm (30 G) at a spinneret speed of 11,000 RPM. The example resulted in fiber diameter between about 158 nm and about 3.51 μm, with an average diameter of about 979 nm. FIG. 21A illustrates representation of the example's fiber morphology. FIG. 21B illustrates a histogram of the fiber diameter distribution.

Table G illustrates exemplary results of fiber spinning a polymer solution comprising poly(amic acid) (Sigma-Aldrich) dissolved in a solvent system comprising about 80 wt % NMP and about 20 wt % aromatic hydrocarbons of the total weight of the solvent system. In particular, Table G illustrates spinneret speeds (e.g., 2,000 revolutions per minute (RPM) (2K)) for specific orifice diameters and wt. % of the polymer (e.g., poly(amic acid)) in the total weight solution. Table G shows the ranges of spinneret speeds for the different polymer concentrations and orifice diameters at which fibers were successfully formed. In an aspect, poly(amic acid) solutions required elevated temperature inside of the fiber spinning chamber to produce fibers. Temperatures are denoted in Table G with spinneret speed. As an example, elevated temperatures increased solvent evaporation speed.

TABLE G

| | poly(amic acid) dissolved in solvent system comprising of about 80 wt. % NMP and about 20 wt. % aromatic hydrocarbons | |
|---|---|---|
| Orifice Diameter | 11 wt. % | 15 wt. % |
| 20 G (603 μm) | | 7K @ 68° C. |
| 23 G (337 μm) | | |
| 27 G (210 μm) | 12K-6K @ 70° C. | |
| 30 G (159 μm) | 12K-6K @ 60-70° C. | 2K @ 47° C. |

Example G1

Figure 22A:
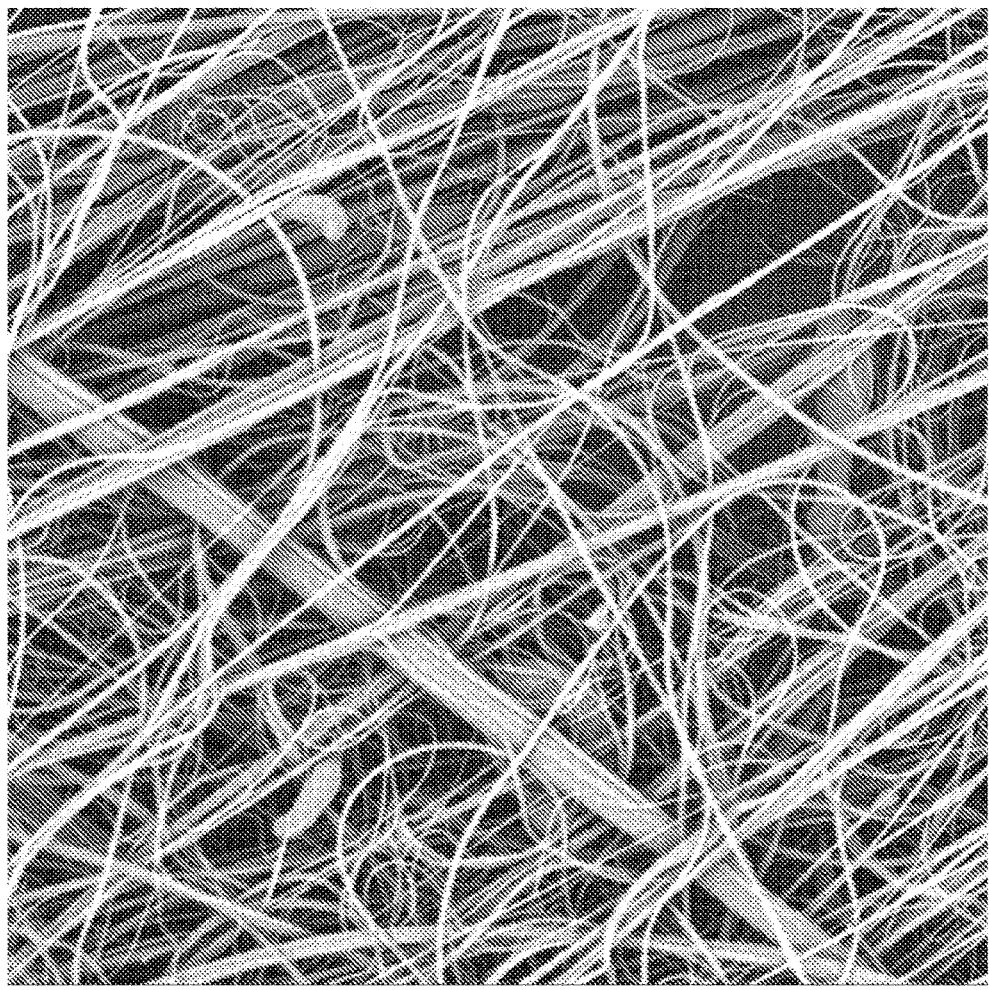
FIG. 22A is a representation of a morphology of poly(amic acid) fiber-based structures.
Figure 22B:
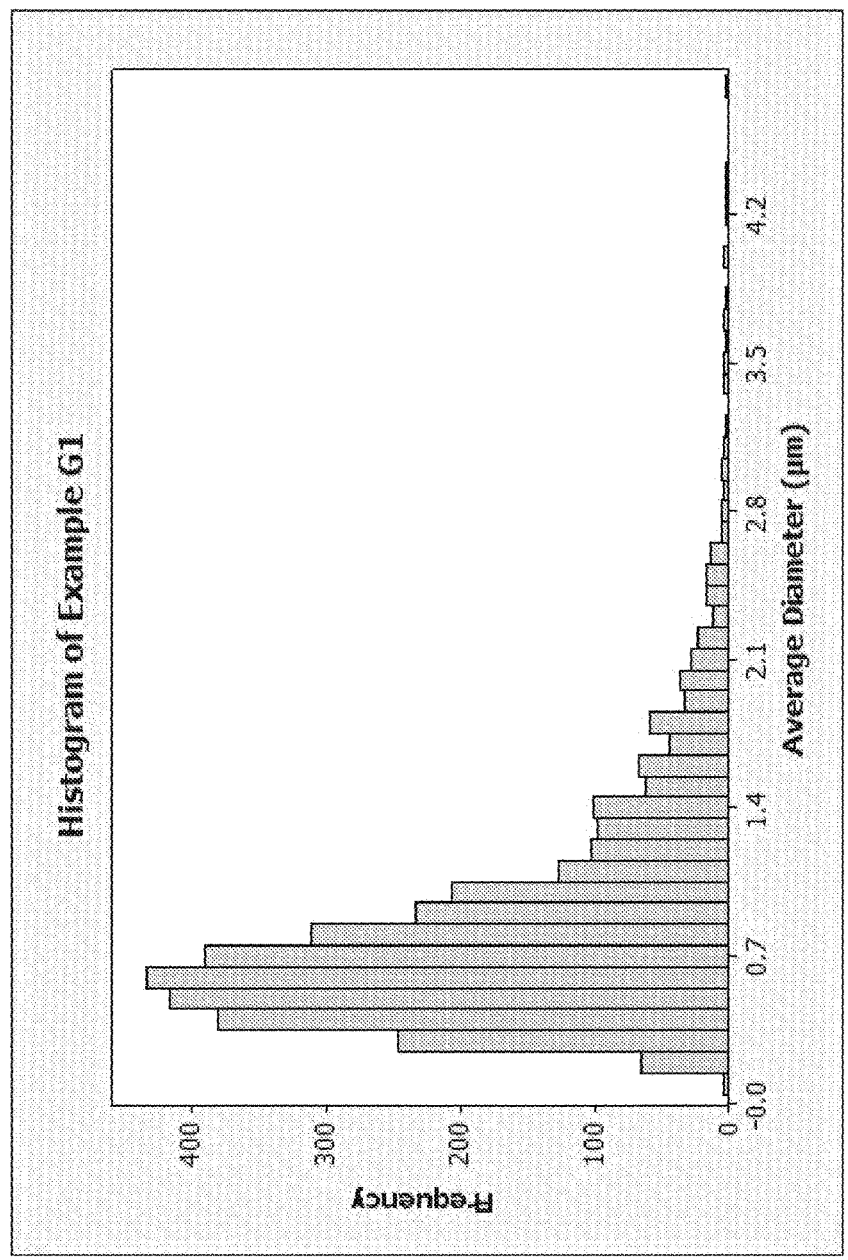
FIG. 22B is a graph of fiber count to fiber diameter of poly(amic acid) fiber-based structures.

As an example, a solution comprising about 11 wt. % poly(amic acid) dissolved in a solvent system comprising about 80 wt. % NMP and about 20 wt. % aromatic hydrocarbons, with a solution viscosity of about 13,225 cP, was spun through an orifice diameter of 159 μm (30 G) at spinneret speed of 10,000 RPM. The environment the spinneret and fiber collection apparatus was enclosed in during the spinning cycle was heated to an elevated temperature of 60° C., this elevated temperature aided in the production of fiber by increasing the rate of solvent evaporation. The example resulted in fiber diameter between about 89.0 nm and about 4.79 μm, with an average fiber diameter of about 865 nm. FIG. 22A illustrates representation of the example's fiber morphology. FIG. 22B illustrates a histogram of the fiber diameter distribution.

Example G2

Figure 23A:
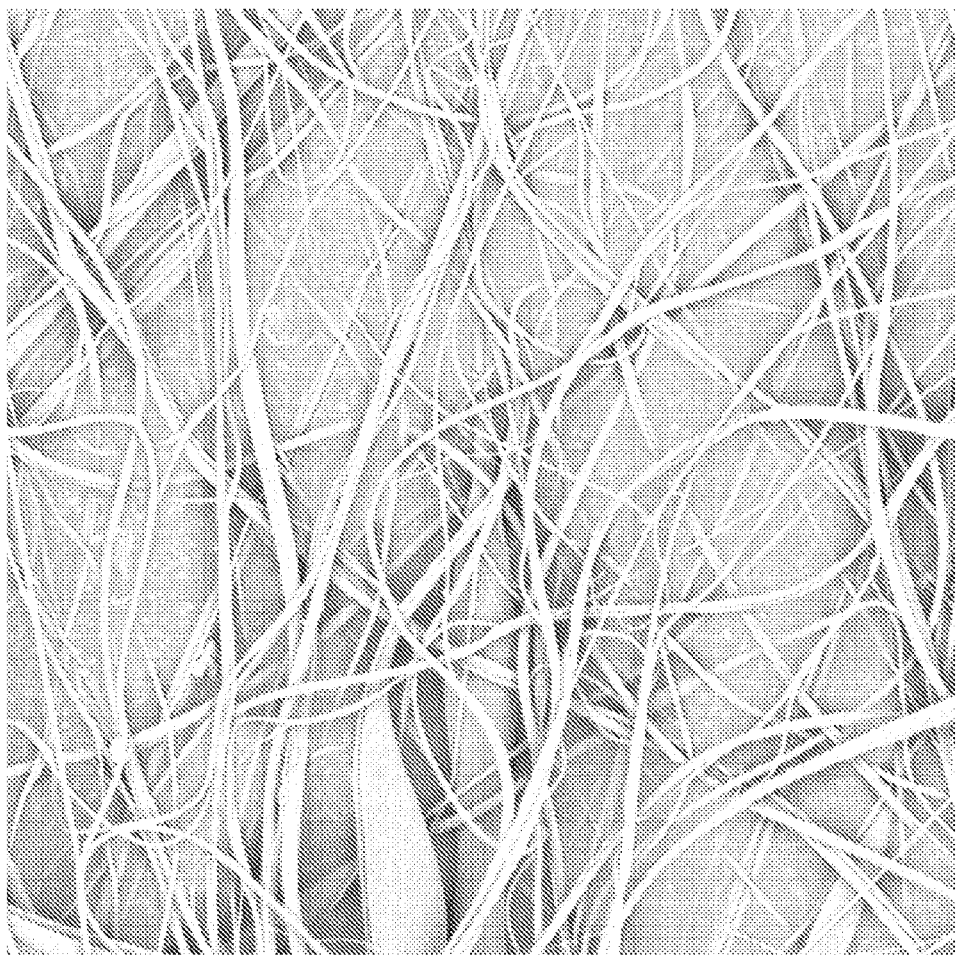
FIG. 23A is a representation of a morphology of poly(amic acid) fiber-based structures.
Figure 23B:
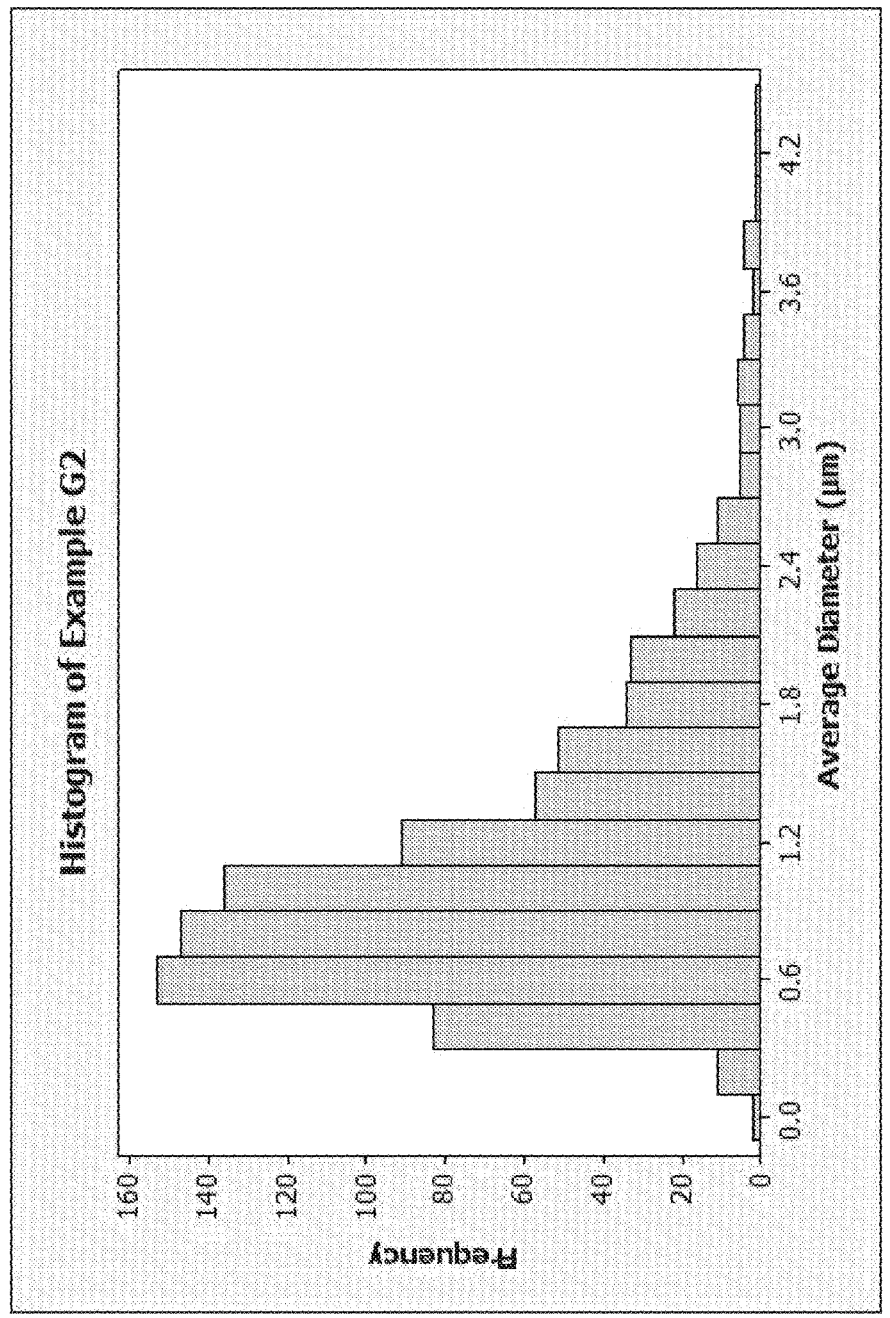
FIG. 23B is a graph of fiber count to fiber diameter of poly(amic acid) fiber-based structures.

As an example, a solution comprising about 11 wt. % poly(amic acid) dissolved in a solvent system comprising about 80 wt. % NMP and about 20 wt. % aromatic hydrocarbons, with a solution viscosity of about 13,225 cP was spun through an orifice diameter of 159 μm (30 G) at spinneret speed of 6,000 RPM. The environment the spinneret and fiber collection apparatus was enclosed in during the spinning cycle was heated to an elevated temperature of 70° C., this elevated temperature aided in the production of fiber by increasing the rate of solvent evaporation. The example resulted in fiber diameter between about 50.7 nm and about 4.34 μm, with an average fiber diameter of about 1.13 μm. FIG. 23A illustrates representation of the example's fiber morphology. FIG. 23B illustrates a histogram of the fiber diameter distribution.

Figure 24A:
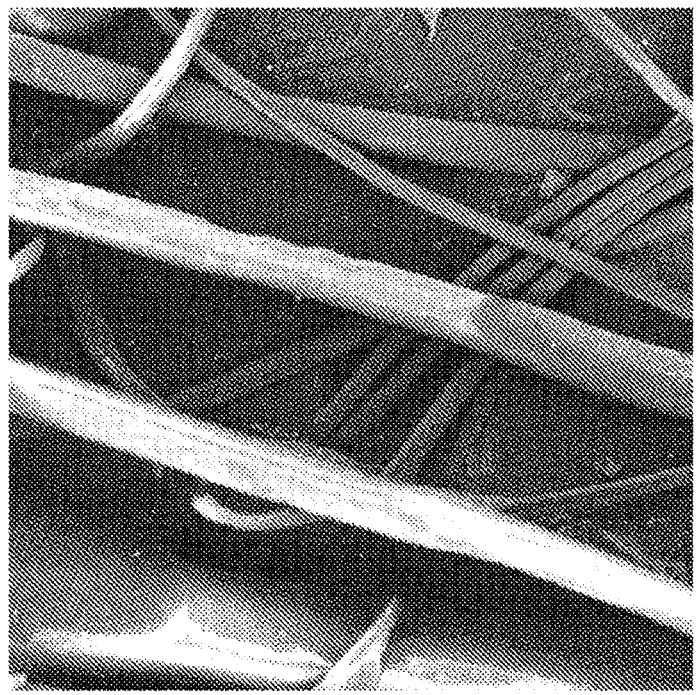
FIG. 24A is a representation of a morphology of ULTEM 9011 fiber-based structures.
Figure 24B:
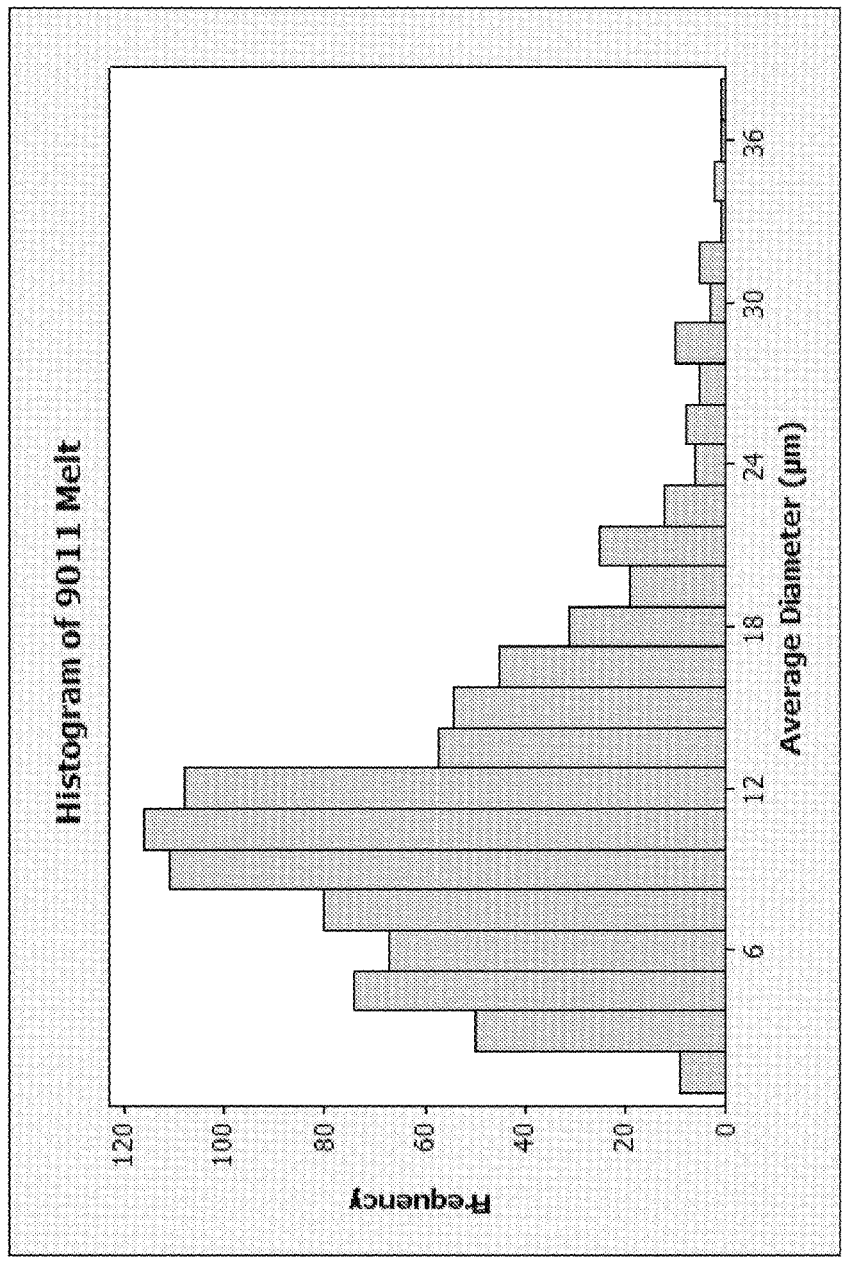
FIG. 24B is a graph of fiber count to fiber diameter of ULTEM 9011 fiber-based structures.

FIG. 24A is a representation of ULTEM 9011 (SABIC) fibers generated using a melt process via force spinning in a modified Fiberio FE type machine. The material was spun at about 450° C., at a spinneret speed of 3500 rpm through 0.5 mm diameter orifices. FIG. 24B is a graph of fiber count to fiber diameter of the sample shown in FIG. 24A.

Electro-Spinning

This disclosure relates to a method for production of fine fibers from a solvent-resistant polyetherimide, i.e., a polyetherimide based on para-phenylene diamine (known as ULTEM CRS 5000 series produced by SABIC), through an electro-spinning process such as an electro-static, solution-based spinning process. Electro-spinning (comprising electro-blowing, melt-blowing, flash spinning or air-electro-spinning) is a technology in which a polymer solution is extruded through fine holes (e.g., one or more needles or nozzles) under an electric field to volatilize or solidify the solvent from the solution, which forms the fibers on the collector surface located at a predetermined distance. Details around the electro-spinning method, setup, processing conditions and applications are widely described in literature, such as for example "Electrospinning Process and Applications of Electrospun Fibers" by Doshi and Reneker (J. Electrostatics, 35, 151-160 (1995)), "Electrospinning of Nanofibers in Textiles" by Haghi (CRC Press, Oct. 31, 2011), "Beaded nanofibers formed during electrospinning" by H. Fong (Polymer, 40, 4585-4592 (1999)) and U.S. Pat. Nos. 6,616,435, 6,713,011, 7,083,854 and 7,134,857. Certain embodiments of the disclosure are directed to methods of making solvent-resistant porous membrane using single solvent or using two or three solvent combination that can dissolve the polymer and make it soluble at room temperature. In an aspect, free-standing, nano-fiber mats of ULTEM series (e.g., ULTEM CRS 5001K) polyetherimides can be produced from such solutions using an electrostatic spinning process, and certain embodiments of the disclosure are directed to show that such mats are very suitable to be applied as separator films in lithium-ion batteries.

Exemplary Testing Procedure

In an aspect, a polyetherimide (e.g., ULTEM CRS 5001K) was dissolved in a solvent or a mixture of solvents at a polymer solid loading ranging from about 5 to about 20 wt %. Solvents used include 2-chloro-phenol, hexafluorisopropanol (HFIP), dichloromethane (DCM), trifluoroacetic acid (TFA), 4-chloro-2-methyl-phenol, 1,1,2,2-tetrachloroethane and NMP. N-cetyltrimethylammonium bromide (CTAB) was used as a salt. All the obtained solutions are stable at room temperature, with the exception of solutions based on ULTEM CRS 5000 series in NMP, which where only stable for a certain amount of time (e.g., several minutes up to several hours, depending on the polymer/solvent concentration and preparation method). The solution viscosity typically varies from 100 to 550 cP depending on the concentration and solvent type. The solutions were prepared by magnetic-stirring the ULTEM CRS 5001K resin in the solvent or mixture overnight to obtain a transparent solution, except for the ULTEM CRS 5001K in NMP, which was prepared by dissolving the ULTEM CRS 5001K in NMP at about 205° C., and the solutions were cooled to about 33° C. The solution was loaded into 3-mL syringes (spinneret ID: 0.45 mm) which were connected to a high voltage system. The electro-spinning was conducted under high voltages in the range of 10-30 kV. The distance between the spinneret and the collector ranges from about 10 to about 30 cm. A grounded, conductive cylinder was used as the collector and the rotation speed varies from 0-1300 RPM. The experiments were conducted at room temperature unless specified otherwise and the humidity varies from about 30 to about 75%. Table H lists the main electro-spinning process parameters of some of the examples shown below.

In an aspect, the fiber morphology was characterized by a FEI Quanta FEG 250 cold field emission scanning electron microscope (SEM) and Oxford EDS. All images were recorded in the secondary electron imaging (SEI) mode, at an accelerating voltage of 3-10 kV.

The fiber diameter was analyzed by Clemex Vision image analysis software. A thousand fibers were chosen randomly from at least 5 individual images for statistical analysis of the fiber diameter and distribution.

Apparent Porosity

Films were cut to a round slice with 19 mm diameter by a die; sample thickness is measured by a spiral micrometer (Mitutoyo) and its weight is measured by an electric balance with ±0.05% variance. The apparent porosity (P) is then calculated by the following formula:

$$P(\%) = \left(1 - \frac{M_m}{V_m \times \rho_s}\right) \times 100$$

where $M_m$ is the mass of the dry membrane, $V_m$ is the volume of the dry membrane, and $\rho_s$ is the density of the solid polymer.

HTMI

TMA is typically used to characterize the HTMI of separators according to the NASA/TM-2010-216099 Test Method. Utilizing TMA, the separator is held under a constant, small load and the degree of deformation (elongation) is measured as a function of temperature. At the temperature where the separator loses mechanical integrity, the elongation increases dramatically. Typically, the shrinkage onset (temperature at about 2% shrinkage), the deformation temperature (temperature at about 5% deformation) and the rupture temperature (the temperature at which the material breaks) are reported. A TA Instruments Q800 DMA was used with a film tension setup. Films of about 10 mm long and about 3 mm wide were tested. The sample is held with a constant 0.02 N load while the temperature is ramped at about 5° C./min up to failure of the sample. The experimental parameters are as follows:

a. Test: Temp Ramp/Controlled Force
b. Preload Force: 0.02 N
c. Start Temperature: about 30° C.
d. Final Temperature: about 300° C. (or rupture of sample)
e. Ramp rate: about 5° C./min MacMullin Number For the separator conductivity test, a 2016 coin cell was used as the test vehicle. Lithium metal slices (pure lithium metal (99.9%) from Wisdom Optoelectronic Technology Co., Ltd.) were used as electrodes. LBC3015B from Shenzhen Capchem Tech was used as the electrolyte. Electrochemical impedance spectroscopy (EIS, VMP2 MultiPotentiostat from BioLogic Science Instruments) was used to test the cell resistance. The specific conductivity is calculated according to Ohmic Law: Separator conductivity=(Film thickness)/(Separator resistance×tested area), wherein film thickness can be measured by a micrometer; separator resistance can be read from the EIS Nyquist plot; and a tested area can be confined by the electrodes (e.g., the diameter is 15.6 mm).

The MacMullin number, based on the work of MacMullin and Muccini (R. B. MacMullin and G. A. Muccini, AIChE J., 2, 393, 1956), is defined as NM=C/C0, where C is the conductivity of the porous media saturated with the electrolyte and C¬0 is the bulk conductivity of the same electrolyte. The obvious advantage of describing separator conductivities in MacMullin numbers is the fact that MacMullin numbers are largely independent of the electrolyte used. The bulk conductivity of the electrolyte (C0) was 8.5±0.5 mS/cm.

Cell Testing

Battery cycling tests were carried out using 2016 coin cells on a VMP battery tester at room temperature. Graphite was used as the anode raw material and was obtained from MTI Co. Lithium Iron Phosphate (LiFePO$_4$, purchased from Phostech Lithium Inc., Canada) was used as the cathode raw material to test the lifetime degradation. LBC3015B from Shenzhen Capchem Tech was used as the electrolyte. Degradation cycles were tested as follows:

a) Constant current charge at 1.5 mA until the voltage hits 3.8V
 b) Constant voltage charge at 3.8V until the current trip to 0.075 mA
 c) Open circuit for 5 minutes
 d) Constant current discharge at −1.5 mA until the voltage hits 2.5V
 e) Open circuit for 5 minutes; repeat the procedure for 100 cycles. Record the discharged capacity. Its ratio to the discharged capacity during the formation cycle is recorded as capacity retention in the unit of percentage.

Electrolyte Wettability

The electrolyte wettability of the separator samples was evaluated by contact angle measurements. Contact angle was measured on Dataphysics OCA according to standard procedure. Each sample was measured at least five times and images were recorded after dispensing the droplet onto the surface, where a mathematical expression was fitted to the shape of the drop and the slope of the tangent to the drop at the liquid-solid-vapor (LSV) interface line was calculated. The contact angle was recorded 2-3 seconds after dispensing the droplet onto the surface, unless stated otherwise.

Pore Size

Pore size and pore size distribution were measured by mercury intrusion porosimetry, using an AutoPore IV 9500 equipment.

Results

TABLE H

Process parameters for making electro-spun ULTEM CRS 5001K separators

| Example | Solvent system | Concentration (wt %) | Feed rate (uL/min) | Voltage (kV) | Temperature (° C.) | Relative Humidity (%) | Average fiber diameter (nm) |
|---|---|---|---|---|---|---|---|
| Ex. 1C | 2-Cl-phenol/HFIP 25/75 | 8% | 2 | 20 | 33 | 41% | 343 ± 121 |
| Ex. 2C | 2-Cl-phenol/HFIP 25/75 | 10% | 2 | 30 | 33 | 40% | 661 ± 170 |
| Ex. 3C | 2-Cl-phenol/HFIP 25/75 + 1 wt % CTAB | 10% | 2 | 20 | 33 | 56% | 416 ± 120 |
| Ex. 4C | 2-Cl-phenol/HFIP 20/80 | 10% | 2 | 30 | 33 | 50% | 1419 ± 568 |
| Ex. 5C | 2-Cl-phenol/HFIP 50/50 | 10% | 1 | 30 | 33 | 35% | 205 ± 75 |
| Ex. 6C | 2-Cl-phenol/DCM/HFIP 40/15/45 | 8% | 5 | 20 | 33 | 38% | 438 ± 106 |
| Ex. 7C | 2-Cl-phenol/DCM/HFIP 25/10/65 | 8% | 5 | 20 | 23 | 72% | 257 ± 52 |
| Ex. 8C | 2-Cl-phenol/DCM/HFIP 25/37.5/37.5 | 8% | 5 | 20 | 23 | 70% | 2042 ± 342 |
| Ex. 9C | 2-Cl-phenol/TFA 50/50 | 8% | 5 | 20 | 23 | 75% | \ |
| Ex. 10C | Chloroform/HFIP 90/10 | 5% | 50 | 20 | 23 | 55% | 1176 ± 430 |
| Ex. 11C | DCM/HFIP 50/50 | 5% | 100 | 20 | 23 | 55% | 165 ± 94 |
| Ex. 12C | 4-chloro-2-methyl-phenol/DCM/HFIP 33.3/33.3/33.3 | 10% | 1 | 30 | 33 | 35% | 197 ± 57 |
| Ex. 13C | 1,1,2,2-tetrachloroethane | 7% | 2 | 30 | 33 | 40% | 107 ± 59 |
| Ex. 14C | NMP | 15% | 5 | 30 | 33 | 55% | 386 ± 126 |
| Ex. 15C | NMP | 10% | 2 | 30 | 33 | 55% | 186 ± 51 |

Example 1C

The ULTEM CRS 5001K was dissolved in the 2-chlorophenol (2-Cl-phenol) and hexafluoroisopropanol (HFIP) mixture at a solid loading of about 8 wt %. The ratio of the two solvents was about 25/75 by weight. The electrospinning conditions: the solution feeding speed was about 2 uL/min; the distance between the spinneret and the collector was about 20 cm; the rotation speed of the collector was about 1300 RPM; the voltage applied was about 20 kV; the experiment was conducted at about 33° C. with a relative humidity of about 41%.

Example 2C

The ULTEM CRS 5001K was dissolved in the 2-chlorophenol (2-Cl-phenol) and HFIP mixture at a solid loading of about 10 wt %. The ratio of the two solvents was about 25/75 by weight. The electro-spinning conditions: the solution feeding speed was about 2 uL/min; the distance between the spinneret and the collector was about 20 cm; the rotation speed of the collector was about 1300 RPM; the voltage applied was about 30 kV; the experiment was conducted at about 33° C. with a relative humidity of around about 40%.

Example 3C

The ULTEM CRS 5001K was dissolved in the 2-chlorophenol (2-Cl-phenol) and HFIP mixture at a solid loading of about 10 wt %. The ratio of the two solvents was about 25/75 by weight. About 1 wt % of cetyl trimethylammonium bromide (CTAB) was added to increase the conductivity of the solution. The electro-spinning conditions: the solution feeding speed was about 2 uL/min; the distance between the spinneret and the collector was about 20 cm; the rotation speed of the collector was about 1300 RPM; the voltage applied was about 20 kV; the experiment was conducted at about 33° C. with a relative humidity of about 56%.

Example 4C

The ULTEM CRS 5001K was dissolved in the 2-chlorophenol (2-Cl-phenol) and HFIP mixture at a solid loading of about 10 wt %. The ratio of the two solvents was about 20/80 by weight. The electro-spinning conditions: the solution feeding speed was 2 uL/min; the distance between the spinneret and the collector was about 20 cm; the rotation speed of the collector was about 1300 RPM; the voltage applied was about 30 kV; the experiment was conducted at about 33° C. with a relative humidity of about 50%.

Example 5C

The ULTEM CRS 5001K was dissolved in the 2-chlorophenol (2-Cl-phenol) and HFIP mixture at a solid loading of about 10 wt %. The ratio of the two solvents was about 50/50 by weight. The electro-spinning conditions: the solution feeding speed was about 1 uL/min; the distance between the spinneret and the collector was about 20 cm; the rotation speed of the collector was about 1300 RPM; the voltage applied was about 30 kV; the experiment was conducted at about 33° C. with a relative humidity of about 35%.

Example 6C

The ULTEM CRS 5001K was dissolved in the 2-chlorophenol (2-Cl-phenol), dichloromethane (DCM) and HFIP mixture at a solid loading of about 8 wt %. The ratio of the three solvents was about 40/15/45 by weight. The electro-spinning conditions: the solution feeding speed was about 5 uL/min; the distance between the spinneret and the collector was about 20 cm; the rotation speed of the collector was about 1300 RPM; the voltage applied was about 20 kV; the experiment was conducted at about 33° C. with a relative humidity of about 38%.

Example 7C

The ULTEM CRS 5001K was dissolved in the 2-chlorophenol (2-Cl-phenol), DCM and HFIP mixture at a solid loading of about 8 wt %. The ratio of the three solvents was about 25/10/65 by weight. The electro-spinning conditions: the solution feeding speed was about 5 uL/min; the distance between the spinneret and the collector was about 20 cm; the rotation speed of the collector was about 1300 RPM; the voltage applied was about 20 kV; the experiment was conducted at about 23° C. with a relative humidity of about 72%.

Example 8C

The ULTEM CRS 5001K was dissolved in the 2-chlorophenol (2-Cl-phenol), DCM and HFIP mixture at a solid loading of about 8 wt %. The ratio of the three solvents was about 25/37.5/37.5 by weight. The electro-spinning conditions: the solution feeding speed was about 5 uL/min; the distance between the spinneret and the collector was about 20 cm; the rotation speed of the collector was about 1300 RPM; the voltage applied was about 20 kV; the experiment was conducted at about 23° C. with a relative humidity of about 70%.

Example 9C

The ULTEM CRS 5001K was dissolved in the 2-chlorophenol (2-Cl-phenol) and trifluoroacetic acid (TFA) mixture at a solid loading of about 8 wt %. The ratio of the two solvents was about 50/50 by weight. The electro-spinning conditions: the solution feeding speed was about 5 uL/min; the distance between the spinneret and the collector was about 20 cm; the rotation speed of the collector was about 1300 RPM; the voltage applied was about 20 kV; the experiment was conducted at about 23° C. with a relative humidity of about 75%.

Example 10C

The ULTEM CRS 5001K was dissolved in the chloroform and hexafluoroisopropanol (HFIP) mixture at a solid loading of about 5 wt %. The ratio of the two solvents was about 90/10 by weight. The electro-spinning conditions: the solution feeding speed was about 50 uL/min; the distance between the spinneret and the collector was around about 15 cm; the rotation speed of the collector was about 1300 RPM; the voltage applied was about 20 kV; the experiment was conducted at about 23° C. with a relative humidity of about 55%.

Example 11C

The ULTEM CRS 5001K was dissolved in dichloromethane (DCM) and HFIP mixture at a solid loading of about 5 wt %. The ratio of the two solvents was about 50/50 by weight. The electro-spinning conditions: the solution feeding speed was about 100 uL/min; the distance between the spinneret and the collector was about 15 cm; the rotation speed of the collector was about 1300 RPM; the voltage applied was about 20 kV; the experiment was conducted at about 23° C. with a relative humidity of around about 55%.

Example 12C

The ULTEM CRS 5001K was dissolved in a 4-chloro-2-methyl-phenol, DCM and HFIP mixture at a solid loading of about 10 wt %. The ratio of the three solvents was about 33/33/33 by weight. The electro-spinning conditions: the solution feeding speed was about 1 uL/min; the distance between the spinneret and the collector was about 20 cm; the rotation speed of the collector was about 1300 RPM; the voltage applied was about 30 kV; the experiment was conducted at about 33° C. with a relative humidity of about 35%.

Example 13C

The ULTEM CRS 5001K was dissolved in 1,1,2,2-tetrachloroethane at a solid loading of about 7 wt %. The electro-spinning conditions: the solution feeding speed was about 2 uL/min; the distance between the spinneret and the collector was around about 20 cm; the rotation speed of the collector was about 1300 RPM; the voltage applied was about 30 kV; the experiment was conducted at about 33° C. with a relative humidity of about 40%.

Example 14C

The ULTEM CRS 5001K was dissolved in boiling NMP (202° C.) with a solid loading of 15 wt % under nitrogen atmosphere. The ULTEM CRS 5001K in NMP solution was cooled down to room temperature and loaded into 3-mL syringes (spinneret ID: 0.45 mm) which was connected to a high voltage system. The electro-spinning was conducted under high voltage of 30 kV. The solution feeding speed was 5 uL/min. The distance between the spinneret and the collector was about 30 cm. A grounded, conductive cylinder was used as the collector. The experiments were conducted at about 33° C. at an environmental relative humidity of about 55%.

Example 15C

The ULTEM CRS 5001K was dissolved in boiling NMP (202° C.) with a solid loading of 10 wt % under nitrogen atmosphere. The ULTEM CRS 5001K in NMP solution was cooled down to room temperature and loaded into 3-mL syringes (spinneret ID: 0.45 mm) which was connected to a high voltage system. The electro-spinning was conducted under high voltage of 30 kV. The solution feeding speed was 2 uL/min. The distance between the spinneret and the collector was about 20 cm. A grounded, conductive cylinder was used as the collector. The experiments were conducted at about 33° C. at an environmental relative humidity of about 55%.

Morphology

Figure 25:
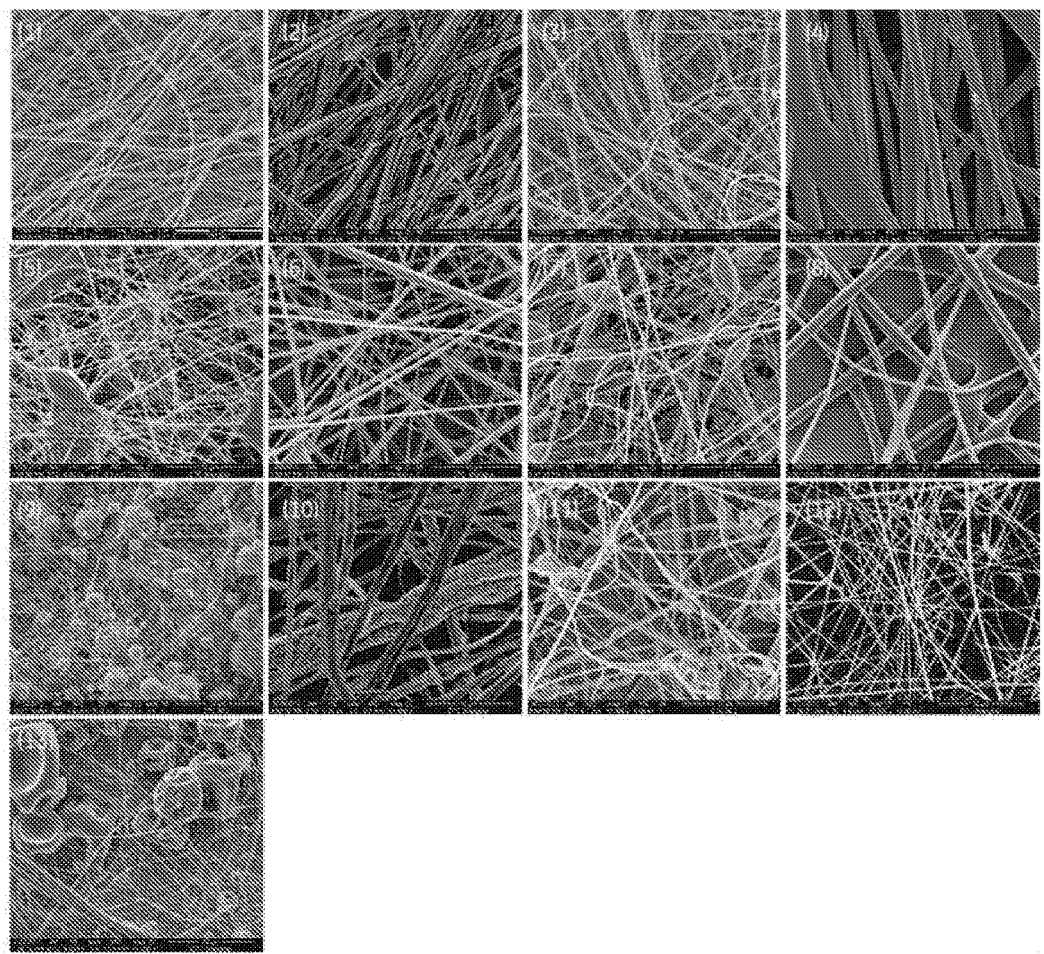
FIG. 25 illustrates scanning electron microscope (SEM) micrographs showing typical fiber morphologies of electro-spun ULTEM CRS 5001K obtained from different solvent systems and electro-spinning conditions.

FIGS. 24-25 illustrate SEM micrographs showing fiber morphologies of the electro-spun ULTEM CRS 5001K obtained from different solvent systems and electro-spinning conditions as presented in Table H (numbers in the figures correlate to the example numbers in Table H). The magnification is about 10 k and 1 k, respectively.

Figure 26:
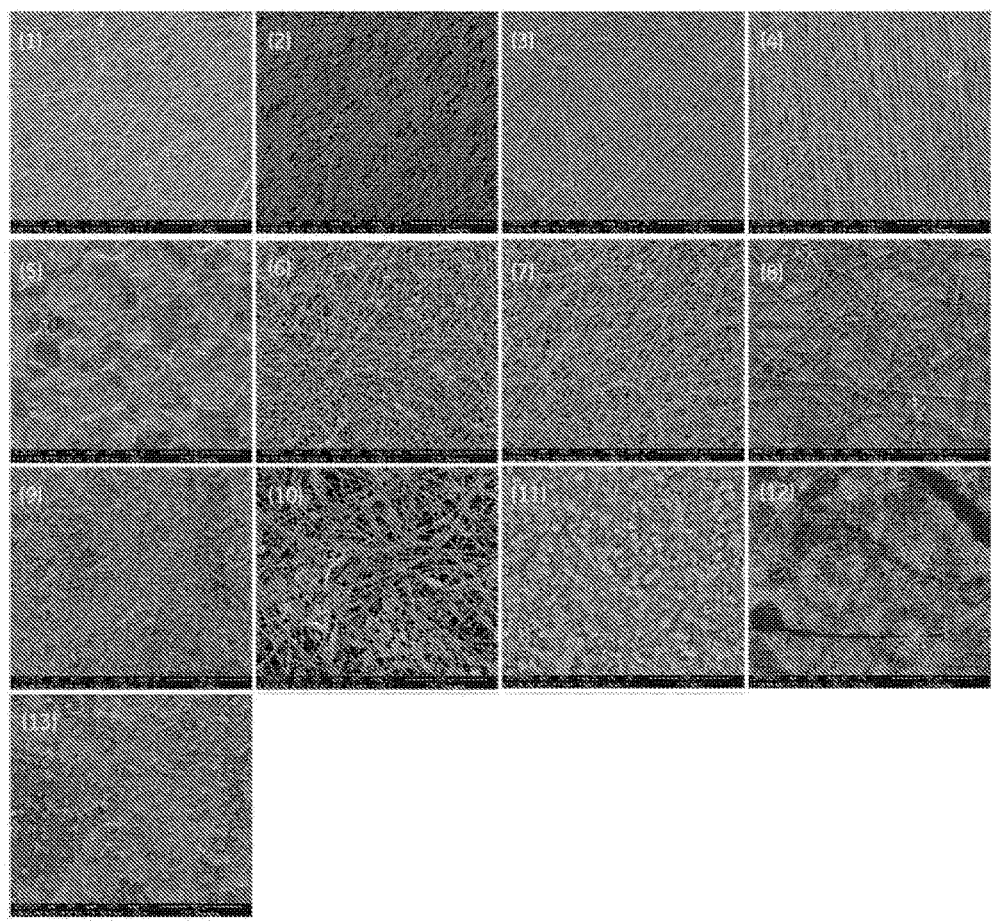
FIG. 26 illustrates SEM micrographs showing typical fiber morphologies of electro-spun ULTEM CRS 5001K obtained from different solvents systems and electro-spinning conditions.

The SEM micrographs illustrated in FIGS. 25-26 (with respectively high (about 10 k) and low (about 1 k) magnifications) show that the fiber diameter and morphologies heavily depend on the chosen solvent system and electro-spinning conditions. Although the ULTEM CRS 5001K can be dissolved in the mixture of 2-Cl-phenol and HFIP in a wide range of solvent ratio (e.g., about 100/0 to about 10/90 by weight), nano-sized fibers with minimal number of defects (defined as e.g., beads, droplets and non-uniform fiber thicknesses) are typically obtained from those solutions with a 2-Cl-phenol content of less than about 40%. At a constant polymer concentration, the spinability increases with increasing the HFIP content, i.e., fewer defects are observed. However, a high HFIP content in the 2-chloro-phenol/HFIP mixture leads to an increase in the fiber diameter. Compare for example Examples 2C, 4C and 5C, which show an average fiber diameter of about 205, 661 and 1419 nm at HFIP contents of about 50, 75 and 80%, respectively. Using the 2-Cl-phenol/HFIP mixture at a 25/75 ratio seems a proper balance, providing good spinability (i.e., no defects and uniform fibers) and a small average fiber diameter of 661 nm. Reducing the polymer concentration to about 8 wt % (Example 1C) also provides good spinability (i.e., no defects and uniform fibers) and further reduces the average fiber diameter to 343 nm. Contrary, the webs spun from a 50/50 2-chloro-phenol/HFIP solution (Example 5C) showed big liquid-like droplets on the nano-fiber web, although the average fiber diameter is relatively small (about 205 nm).

In one aspect, salts soluble in the solution help to improve the conductivity of the solution and, therefore, help to improve the spinability (fewer defects) and reduce the average fiber diameter and its size distribution. Example 3C uses an organic salt (cetyl trimethylammonium bromide, CTAB) as an example that is soluble in the HFIP/2-Cl-phenol solvent mixture at room temperature. Using about 1 wt % of CTAB leads to a significant reduction in the average fiber diameter from about 661 nm (Example 2C) to about 416 nm (Example 3C).

Replacing part of the 2-chloro-phenol by DCM (Example 6C) still provides an ULTEM CRS 5001K solution that is stable at room temperature. However, the number of defects observed in the morphologies increases as compared to the 2-chloro-phenol/HFIP solution (Example 1C). Example 7C shows that increasing the HFIP content in the 2-chloro-phenol/DCM mixture leads to a reduction in average fiber diameter, but also to a significant amount of defects. Further increasing the DCM concentration in the solvent mixture (Example 8C) leads to much thicker fibers as well as more defects.

ULTEM CRS 5001K also forms a room temperature stable solution in a mixture of 2-chloro-phenol/TFA (Example 9C). Since TFA is a very polar solvent, it is expected to increase the conductivity of the solution. Higher conductivity typically helps the electro-spinability of the solution. However, the SEM results show that a significant number of defects (beads) are formed. Due to the high defect rate, no accurate analysis on the average fiber diameter could be performed.

ULTEM CRS 5001K can also be dissolved in DCM or Chloroform mixed with HFIP (Examples 10C and 11C). However, only micro-sized fibers were obtained from the DCM/HFIP solution, and the chloroform/HFIP solutions led to significant number of defects (FIGS. 25-26).

Example 12C shows that nano-fiber webs can be prepared from ULTEM CRS 5001K solutions based on 4-chloro-2-methyl-phenol mixed with DCM and HFIP. The average fiber diameter is only about 197 nm. A disadvantage of using 4-chloro-2-methyl-phenol is its low volatility, which leads to defects due to insufficient solvent evaporation during the electro-spinning process.

ULTEM CRS 5001K can also be dissolved in 1,1,2,2-tetrachloroethane at about room temperature (Example 13C). Although nano-fibers with a very small average diameter are obtained (about 107 nm), they are accompanied by beads.

Figures 27A, 27B:
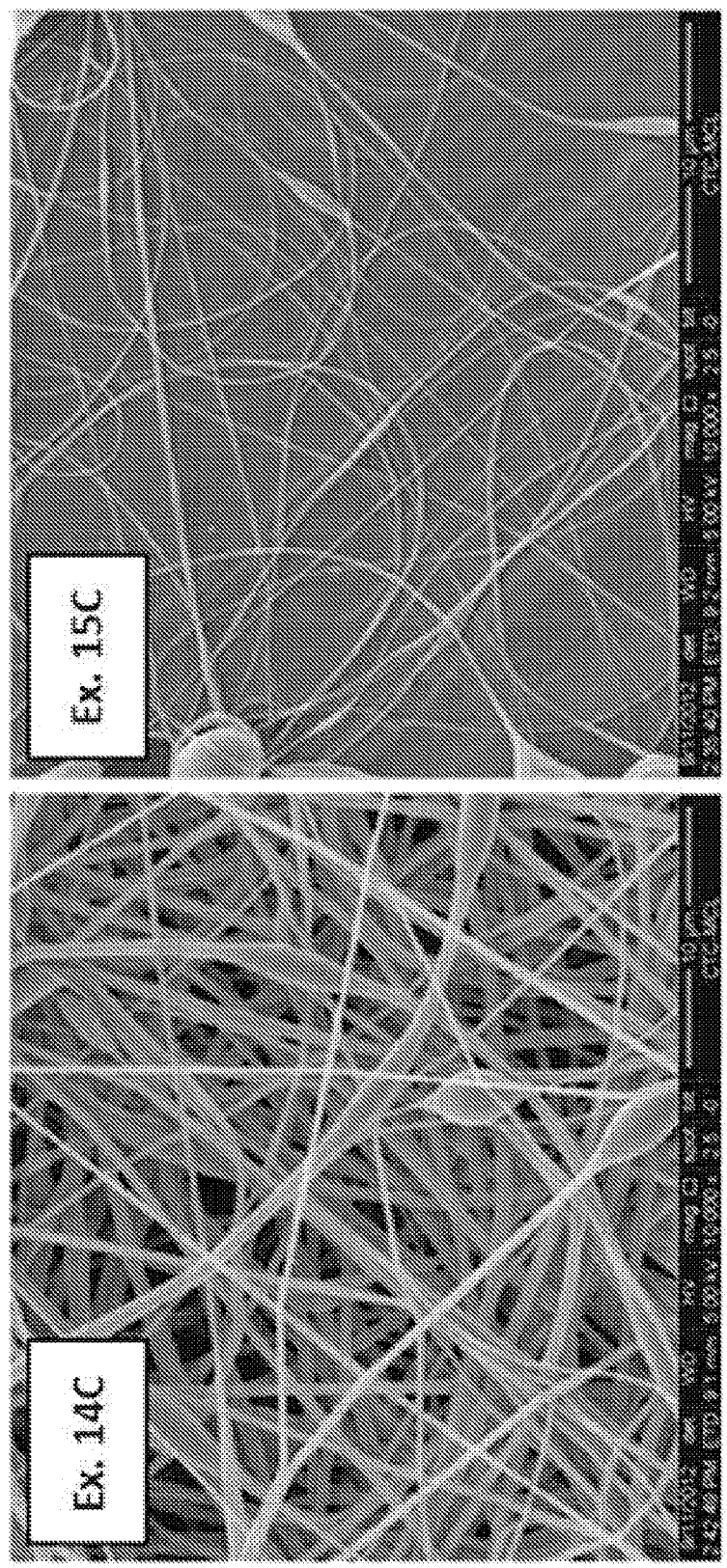
FIG. 27A is an example morphology.
FIG. 27B is an example morphology.

The SEM results of Examples 14C and 15C show that electro-spinning of the ULTEM CRS 5001K in NMP solutions leads to fibrous webs. This proves that even when the polymer solutions show only a limited stability at room temperature, these solutions can still be successfully used to spin ultra-fine fibers are room temperature. The individual fibers have an average fiber diameter of 386±126 (Example 14C) and 186±51 (Example 15C), i.e., the formed fibers are truly nano-fibers. FIG. 27A shows that a real nano-fibrous web can be formed via the Example 14C. FIG. 27B shows only a very thin layer of fibers according to Example 15C, i.e., no real entangled web is formed. However, as is generally known for the electro-spinning process, the thickness of the nano-fibrous, porous webs can easily be tuned by the spinning conditions, such as total spinning time.

The thicknesses, apparent porosities and MacMullin numbers of Examples 1C, 2C and 5C are presented in Table I.

TABLE I

| Example | Thickness (μm) | Apparent porosity (%) | MacMullin |
| --- | --- | --- | --- |
| Example 1C | 44 | 75 | 3 |
| Example 2C | 44 | 73 | 4 |
| Example 5C | 63 | 67 | 6 |

Figure 28:
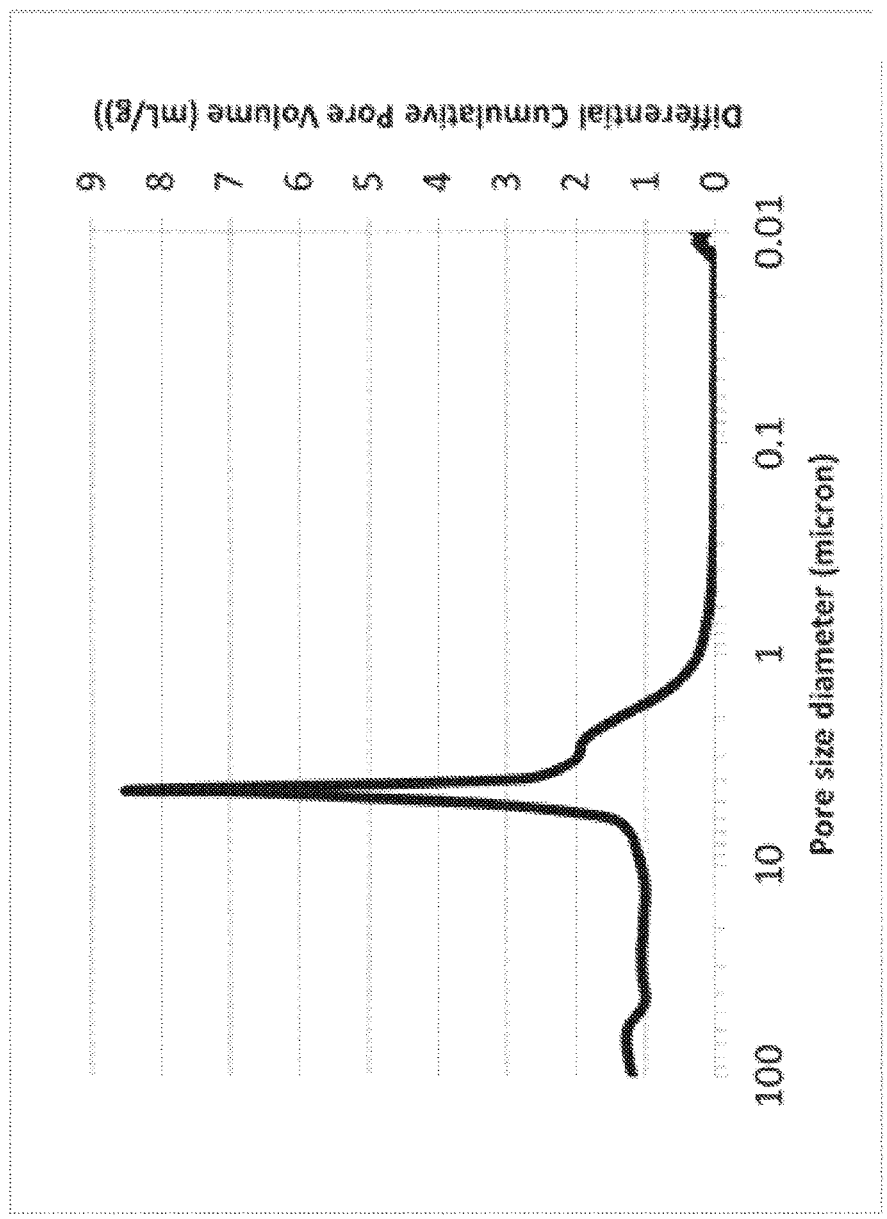
FIG. 28 is a graph of pore size distribution of electro-spun ULTEM CRS 5001K.

The data in Table I shows that the nano-fiber webs of Examples 1C and 2C have a relatively high apparent porosity (about 75%) and a very low MacMullin number (3 or 4). Example 5C shows a little lower apparent porosity and higher MacMullin number, which might be attributed to the presence of defects, leading to a less open pore structure and, consequently, to a higher MacMullin number. Note that the nano-fiber, electro-spun ULTEM CRS 5001K separators have a significant advantage in terms of ionic conductivity over the commercial polyolefin-based separators, which typically have a significantly higher MacMullin number, e.g., Celgard 2400 and Celgard 2500 have a MacMullin number of 16 and 9, respectively (K. K. Patel et al., Journal of Power Sources, 122 (2003), 144-152). FIG. 28 shows the pore size distribution of Example 1C, where the differential cumulative pore volume is plotted against the pore size diameter. This clearly shows the very narrow pore size distribution of the electro-spun ULTEM CRS 5001K separator, with an average pore size of about 4 micron.

Solvent Wettability

Figure 29:
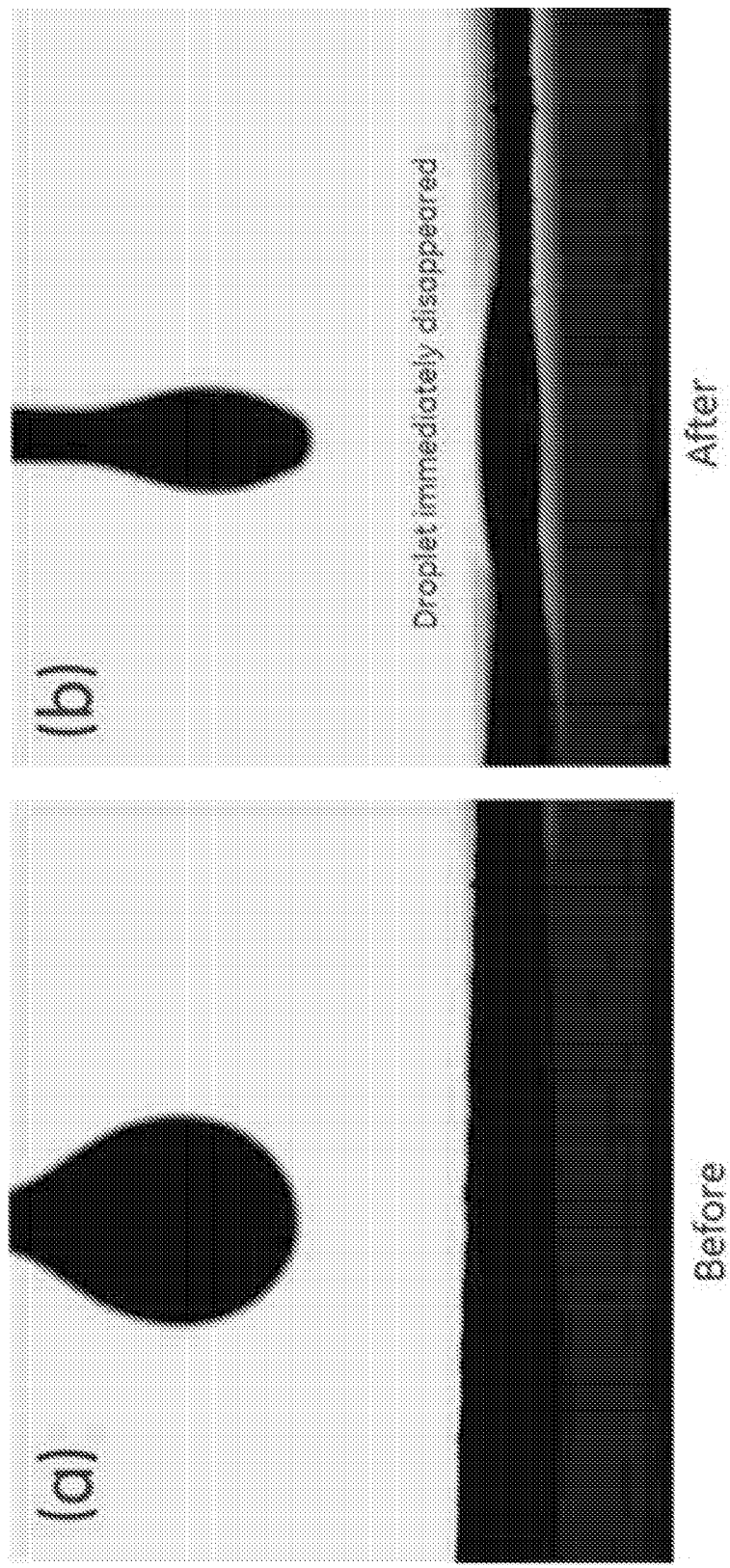
FIG. 29 illustrates images of before (a) and after (b) an electrolyte droplet was placed onto the electro-spun ULTEM CRS 5001K membrane.

FIG. 29 shows the images of before (a) and after (b) an electrolyte droplet was placed onto the electro-spun ULTEM CRS 5001K membrane (Example 1C). The electrolyte liquid was absorbed immediately by the membrane, i.e., within <1 second. The rapid absorption makes it impossible to perform an actual contact angle measurement, but it does show that these membranes have an exceptionally good wettability to the electrolyte. This can partially be ascribed to the intrinsic compatibility of the ULTEM CRS 5001K with the electrolyte solution, which shows an electrolyte contact angle of greater than about 20° after a contact time of 5 seconds, but the contact angle is further reduced by the very open porous structure and the small pore size of the e-spun ULTEM CRS 5001K separator. Note that the nano-fiber, electro-spun ULTEM CRS 5001K separators have a significant advantage in terms of electrolyte wettability over the commercial polyolefin-based separators, which typically have a significantly higher electrolyte contact angle of greater than about 40°.

High Temperature Melt Integrity

Figure 30:
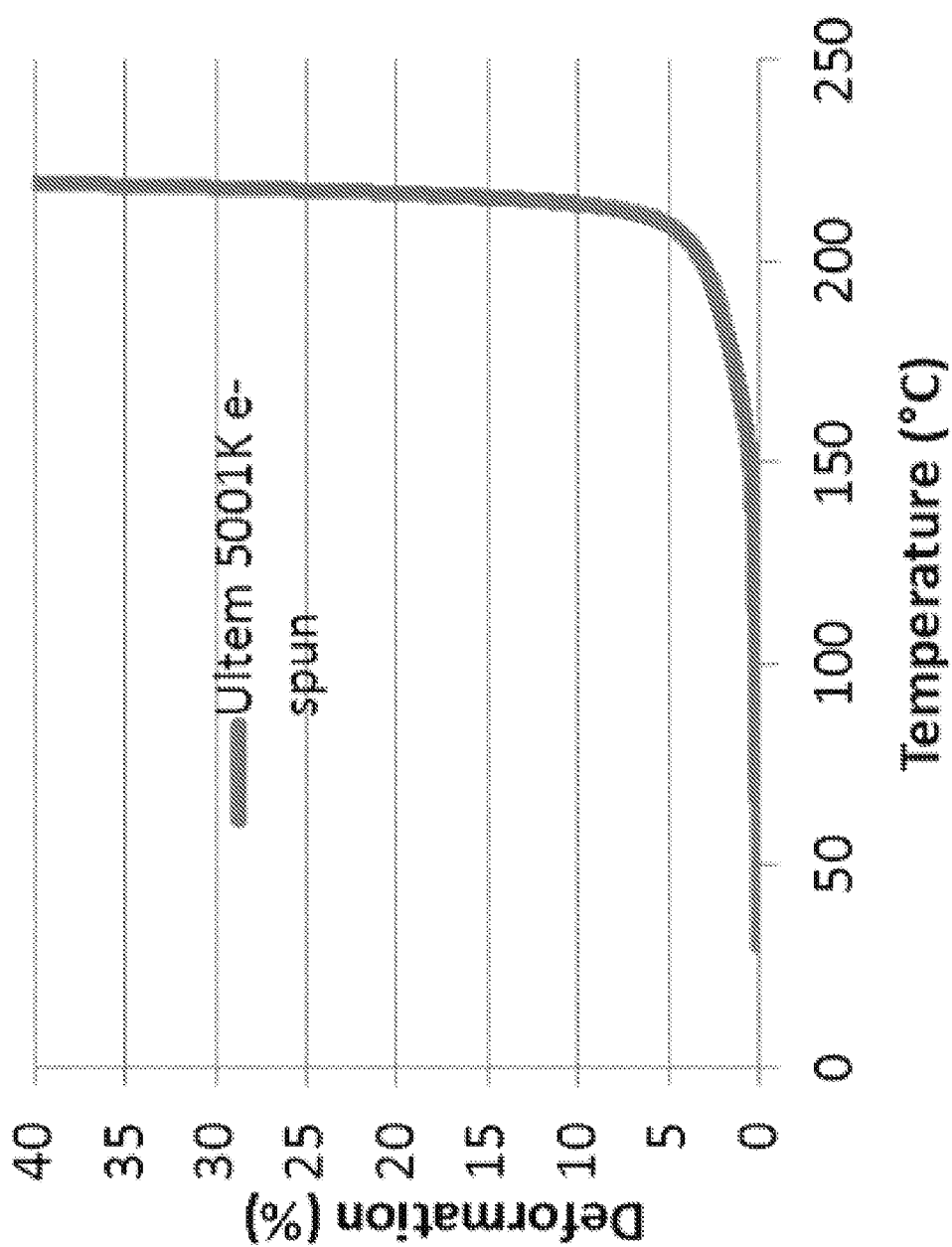
FIG. 30 illustrates thermal mechanical analysis (TMA) curve of electro-spun ULTEM CRS 5001K.

FIG. 30 shows the deformation as a function of temperature measured by TMA of the electro-spun ULTEM CRS 5001, which was obtained by electro-spinning ULTEM CRS 5001K form a solvent mixture consisting of 2-chloro-phenol/HFIP at 25/75 by weight (Example 1C). The membrane shows about 5% deformation at about 210° C., indicating that the membrane has an excellent dimensional stability at high temperature. Note that the nano-fiber, electro-spun ULTEM CRS 5001K separators have a significant advantage in terms of high temperature dimensional stability over the commercial polyolefin-based separators, which typically have a about 5% deformation temperature of greater than about 160° C. As discussed previously, such HTMI performance is key in improving the safety of lithium ion battery cells.

Battery Cycling Performance

Figure 31:
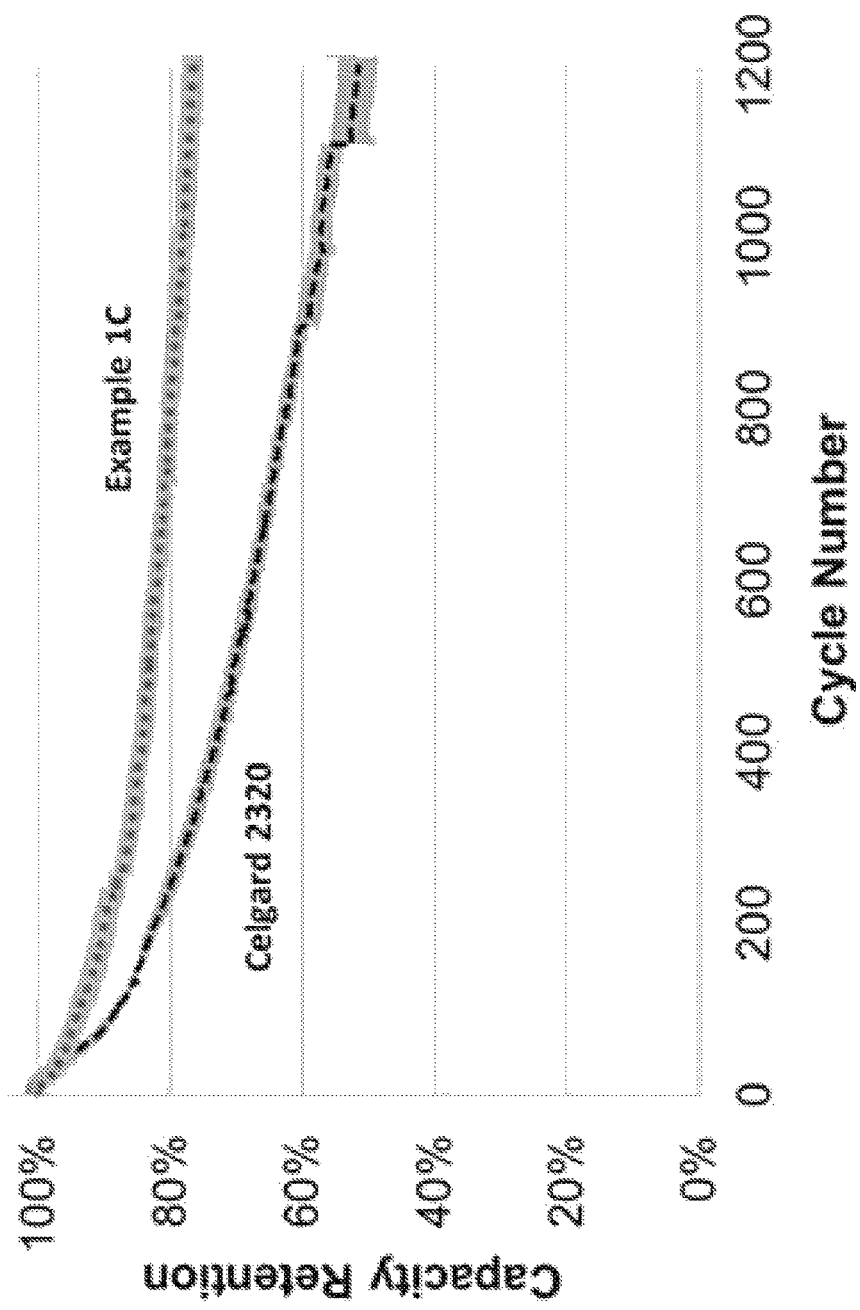
FIG. 31 illustrates cell cycle performance of an electro-spun ULTEM CRS 5001K separator.

FIG. 31 shows the cell cycle performance of electro-spun ULTEM CRS 5001K separator (Example 1C) as compared to a commercial Celgard 2320 separator (thickness about 20 μm, apparent porosity about 39%, MacMullin number 11). Example 1C shows a significantly lower degradation rate (better capacity retention) as compared to the commercial separator.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
   providing a polymer solution comprising a chemical-resistant polymer in a solvent, wherein the chemical-resistant polymer has normalized dry weight of greater than about 90% in 1:1:1 EC:DMC:EMC and 1 mol/L LiPF$_6$;
   spinning the polymer solution into fine fibers by an electro-spinning method; and
   forming a fiber-based structure from the fine fibers, wherein the fiber-based structure does not significantly dissolve in an electrolyte solution comprising 1:1:1 EC:DMC:EMC and 1 mol/L LiPF$_6$, and wherein the fiber-based structure has an electrolyte contact angle with the electrolyte solution of equal to or lower than about 30°,
   wherein a viscosity of the polymer solution varies from 100 to 550 centipoise at room temperature; and
   wherein a loading of the chemical-resistant polymer in the polymer solution ranges from about 5 to about 20 wt %, based on a total weight of the polymer solution.

2. The method of claim 1, wherein the polymer solution comprises a polyetherimide comprising structural units based on para-phenylene diamines.

3. The method of claim 1, wherein the solvent comprises a phenolic solvent, hexafluoroisopropanol, dichlorometheane, trifluoroacetic acid, chloroform, tetrachloroethane, 1,3-dimethyl-2-imidazolidinone, a pyrrolidone-based solvent, or a combination thereof.

4. The method of claim 1, where the chemical resistant polymer has a weight to volume concentration of about 1% to about 20% in the solvent.

5. The method of claim 1, wherein forming the fiber-based structure comprises a drying step, a dry laid process, a thermal treatment, a pressure treatment, or combinations thereof.

6. The method of claim 1, wherein the fiber-based structure has a porosity in the range of about 10% to about 90%.

7. The method of claim 1, wherein the fiber-based structure has a MacMullin number equal to or lower than 10.

8. The method of claim 1, wherein the fiber-based structure has an average pore size in the range of about 0.01 µm to about 20 µm.

9. The method of claim 1, wherein the fiber-based structure has a thickness of about 10 µm to about 200 µm.

10. The method of claim 1, wherein the fiber-based structure comprises fibers with an individual average diameter of about 10 nm to about 50 µm.

11. The method of claim 1, wherein the fiber-based structure shows about 5% deformation at a temperature of equal to or exceeding about 150° C.

12. A method comprising:
providing a polymer solution comprising a chemical-resistant polymer in a solvent, wherein the chemical-resistant polymer has normalized dry weight of greater than about 90% in 1:1:1 EC:DMC:EMC and 1 mol/L LiPF$_6$; and
spinning the polymer solution into fine fibers by an electro-spinning method,
wherein a viscosity of the polymer solution varies from 100 to 550 centipoise at room temperature; and
wherein a loading of the chemical-resistant polymer in the polymer solution ranges from about 5 to about 20 wt %, based on a total weight of the polymer solution.

13. The method of claim 12, wherein the polymer solution comprises a polyetherimide having structural units based on para-phenylene diamines.

14. The method of claim 12, wherein the solvent comprises a phenolic solvent, hexafluoroisopropanol, dichloromethane, trifluoroacetic acid, chloroform, tetrachloroethane, 1,3-dimethyl-2-imidazolidinone, a pyrrolidone-based solvent, or a combination thereof.

15. The method of claim 12, where the chemical resistant polymer has a weight to volume concentration of about 1% to about 20% in the solvent.

16. The method of claim 12, further comprising forming a fiber-based structure from the fine fibers, wherein the fiber-based structure has a porosity in the range of about 10% to about 90% or the fiber-based structure has a MacMullin number equal to or lower than 10.

17. The method of claim 12, further comprising forming a fiber-based structure from the fine fibers, wherein the fiber-based structure shows about 5% deformation at temperatures equal to or exceeding about 150° C.

18. The method of claim 12, further comprising forming a fiber-based structure from the fine fibers, wherein the fiber-based structure has an electrolyte contact angle of equal to or lower than about 30° in 1:1:1 EC:DMC:EMC and 1 mol/L LiPF$_6$.

19. The method of claim 12, wherein the electro-spinning method comprises:
a voltage in a range of 10-30 kilovolts;
use of a spinneret and a collector;
a distance between the spinneret and the collector of about 10 to about 30 centimeters;
rotating the spinneret at a speed varying from 0-1300 revolutions per minute; and
a humidity varying from about 30 to about 75%.

20. The method of claim 1, wherein the electro-spinning method comprises:
a voltage in a range of 10-30 kilovolts;
use of a spinneret and a collector;
a distance between the spinneret and the collector of about 10 to about 30 centimeters;
rotating the spinneret at a speed varying from 0-1300 revolutions per minute; and
a humidity varying from about 30 to about 75%.

* * * * *